(12) United States Patent
Salghetti et al.

(10) Patent No.: US 8,639,617 B2
(45) Date of Patent: Jan. 28, 2014

(54) SYSTEM AND METHOD FOR FORECASTING FREQUENCIES ASSOCIATED TO FUTURE LOSS AND FOR RELATED AUTOMATED OPERATION OF LOSS RESOLVING UNITS

(75) Inventors: Filippo Salghetti, Buchs (CH); Salomon Billeter, Adliswil (CH); Christophe Aebischer, Zurich (CH)

(73) Assignee: Swiss Reinsurance Company, Ltd., Zurich (CH)

( * ) Notice: Subject to any disclaimer, the term of this patent is extended or adjusted under 35 U.S.C. 154(b) by 58 days.

(21) Appl. No.: 13/310,398

(22) Filed: Dec. 2, 2011

(65) Prior Publication Data

US 2012/0143633 A1 Jun. 7, 2012

Related U.S. Application Data

(63) Continuation of application No. PCT/IB2010/055575, filed on Dec. 3, 2010.

(51) Int. Cl.
   *G06Q 40/00* (2012.01)
(52) U.S. Cl.
   USPC .............................................. 705/38; 705/35
(58) Field of Classification Search
   USPC ...................................................... 705/38, 35
   See application file for complete search history.

(56) References Cited

U.S. PATENT DOCUMENTS

2007/0043662 A1* 2/2007 Lancaster ...................... 705/38
2007/0055595 A1* 3/2007 Keyes et al. ................... 705/35

OTHER PUBLICATIONS

Microsoft Computer Dictionary, Fiftht Edition, 2002, p. 128.*
International Search Report mailed Mar. 30, 2011 in PCT/IB10/055575 filed Dec. 3, 2010.
Written Opinion of International Search Report mailed Mar. 30, 2011 in PCT/IB10/055575 filed Dec. 3, 2010.
EPO: Mitteilung des Europäischen Patentamts vom 1. Oct. 2007 über Geschäftsmethoden, Amtsblatt EPA/Official Journal EPO/Journal officiel OEB, Nov. 2007, pp. 592-593.

* cited by examiner

*Primary Examiner* — Charles Kyle
*Assistant Examiner* — Siegfried E Chencinski
(74) *Attorney, Agent, or Firm* — Oblon, Spivak, McClelland, Maier & Neustadt, L.L.P.

(57) ABSTRACT

Forecasting frequencies associated with future loss and loss distributions for individual risks associated with operating units, each which have a measurable liability exposure, is accomplished via independently operated liability risk drivers. The frequencies associated with future loss and loss distributions are also forecasted for an automated operation of a loss resolving unit via a control unit controller. When a loss occurs at a loss unit, measure parameters are measured and transmitted to the control unit controller. The control unit controller dynamically assigns the measure parameters to the liability risk drivers and tunes the operation of the loss resolving unit by resolving the loss via the loss resolving unit.

12 Claims, 29 Drawing Sheets
(24 of 29 Drawing Sheet(s) Filed in Color)

SYSTEM AND METHOD FOR FORECASTING FREQUENCIES ASSOCIATED TO FUTURE LOSS AND FOR RELATED AUTOMATED OPERATION OF LOSS RESOLVING UNITS

FIELD OF THE INVENTION

This present invention relates to systems for forecasting frequencies associated to future loss and loss distributions for individual risks of a plurality of operating units with at least one measurable liability exposure, and for related automated operating of loss resolving units by means of an appropriate control unit controller. Generally, the present invention relates to risk management, and more specifically also to the field of liability risk driven exposures of insured objects. Moreover, this invention relates to systems and methods for developing and assessing assumptions used in designing and pricing financial products, including insurance products.

BACKGROUND OF THE INVENTION

Risk exposure for all kinds of industries occurs in a great variety of aspects, each having their own specific characteristics and complex behavior. The complexity of the behavior of risk exposure driven technical processes often has its background in the interaction with chaotic processes occurring in nature or other artificial environments. Good examples can be found in weather forecast, earthquake and hurricane forecast or controlling of biological processes such as e.g. related to heart diseases or the like. Monitoring, controlling and steering of technical devices or processes interacting with such risk exposure is one of the main challenges of engineering in industry in the 21st century. Dependent or educed systems or processes from products exposed to risks such as e.g. automated pricing tools in insurance technology or forecast systems for natural perils or stock markets, etc. are naturally connected to the same technical problems. Pricing insurance products is additionally difficult because the pricing must be done before the product is sold, but must reflect results that will not be known for some time after the product has been bought and paid for. With tangible products, "the cost of goods sold" is known before the product is sold because the product is developed from raw materials which were acquired before the product was developed. With insurance products, this is not the case. The price of the coverage is set and all those who buy the coverage pay the premium dollars. Subsequently, claims are paid to the unfortunate few who experience a loss. If the amount of claims paid is greater than the amount of premium dollars collected, then the insurance system will make less than their expected profit and may possibly lose money. If the insurance system has been able to predict the amount of claims to be paid and has collected the right amount of premiums, then the system will be profitable.

The price of an insurance product is triggered by the exposure of the insured objects to a specific risk or peril and normally by a set of assumptions related to expected losses, expenses, investments, etc. Generally, the largest amount of money paid out by an insurance system is in the payment of claims for loss. Since the actual amounts will not be known until the future, the insurance system must rely on assumptions about what the losses for which exposure will be. If the actual claims payments are less than or equal to the predicted claims payments, then the product will be profitable. If the actual claims are greater than the predicted claims in the assumptions set in pricing, then the product will not be profitable and the insurance system will lose money. Hence, the ability to set assumptions for the expected losses is critical to the success of the product. The present invention was developed to optimize triggering of liability risk driven exposures in the insurance system technology and to give the technical basics to provide a fully automated pricing device for liability exposure comprising self-adapting and self-optimizing means based upon varying liability risk drivers.

An insurance system must comprise a set of assumptions which reflect the probabilities of occurrence of the loss being insured, the probability of the number of people who will lapse the coverage (that is, stop paying their premiums), and other financial elements such as future developments in expenses, interest rates and taxes. Insurance systems can use historical data on losses to help them to predict what future losses will be. Professionals with experience in mathematics and statistics called actuaries develop tables of losses that incorporate the rate of loss for the group over time into cumulative loss rates. These tables of cumulative loss rates can be used as one of the bases for pricing insurance products.

In pricing a specific product, the system may start with the basic loss tables. Then, based upon judgments concerning the specific nature of the table, the risk to which it is applied, the design of the product, the risk selection techniques applied at the time the policy is issued, and other factors, the insurance system can comprise a set of assumptions for the cumulative loss rates to serve as the foundation for the expected future claims of the product and its risk exposures, respectively. Depending upon the specific insurance product being developed, the historical data and the loss tables do not always correlate well with the specific risks which the policy has to cover. For example, most historical data and/or insurance tables deal with the average probability of loss in an insured set of insured objects. However, some insurance products are directed to subgroups in a set. For example, exposure may drastically vary in these subgroups. For example, insured objects in an urban environment may not show the same liability exposure as such objects in a rural environment, i.e. may be region-dependent. In order to price products for such insured objects, insurance systems must be able to segment the cumulative loss rate from the standard loss tables into cohorts to tease out the loss of those who are objectively less risk exposed within the standard group, and to tune assumptions on these more specific subsets of the population. Segmenting these cumulative loss rates requires that the insurance system has somehow to be able to trigger risk factors for loss which characterize the general insured set of insured objects versus the risk factors which signal the subset with preferred loss. However, most historic data and/or standard loss tables do not take into consideration such separate risk factors. The insurance systems must trigger other sources of data to determine loss rates of specific subsets of insurance objects and/or conditions and the risk factors which are correlated with them. Then, in the process of pricing a product which differentiates price based upon the risk factors, the insurance system must set assumptions as to how these risk factors correlate with the cumulative loss rates in the loss table. Therefore, designing and pricing an insurance product is often an adaptive process which is difficult to achieve by technical means. To arrive at the overall exposure, the insurance system must be able to trigger the appropriate assumptions of loss in which there may be multiple risk factors, each one, individually or in combination with other factors, derived from different simulations, historical data and loss tables.

SUMMARY OF THE INVENTION

It is an object of the invention to provide a liability risk driven system for automated optimization and adaption in signaling generation by triggering risk exposure of insurance objects. In particular, it is an object of the present invention to provide a system which is better able to capture the external and/or internal factors that affect casualty exposure, while keeping the used trigger techniques transparent. Moreover, the system should be better able to capture how and where risk is transferred, which will create a more efficient and correct use of risk and loss drivers in liability insurance technology systems. Furthermore, it is an object of the invention to provide an adaptive pricing tool for insurance products based upon liability exposure, especially for mid-size risks. However, the system is not limited to mid-size risks, but can be easily applied also to small- or large-size risks. It is an object of the invention to develop automatable, alternative approaches for the recognition and evaluation of liability exposure for small- to mid-size facultative risks and in its extension also to large-size risks. These approaches differ from traditional ones in that they rely on underwriting experts to hypothesize the most important characteristics and key factors from the operating environment that impact liability exposure. The system should be self-adapting and refining over time by utilizing data as granular statistical data available in specific markets or from cedent's databases.

According to the present invention, these objects are achieved particularly through the features of the independent claims. In addition, further advantageous embodiments follow from the dependent claims and the description.

According to the present invention, the abovementioned objects are particularly achieved by forecasting frequencies associated to future loss and loss distributions for individual risks of a plurality of operating units with at least one measurable liability exposure by means of independently operated liability risk drivers, and related automated operating of a loss resolving unit by means of a control unit controller, whereas in case of an occurring loss at a loss unit measure parameters are measured and transmitted to the control unit controller and dynamically assigned to the liability risk drivers and whereas the operation of the loss resolving unit is automated tuned by means of the control unit controller resolving the loss by means of the loss resolving unit; whereas measuring devices assigned to the loss units dynamically scan for measure parameters and measurable measure parameters capturing a process dynamic and/or static characteristic of at least one liability risk driver are selected by means of the control unit controller, whereas a set of liability risk drivers is selected by means of a driver selector of the control unit controller parameterizing the liability exposure of the operating unit, whereas a liability exposure signal of the operating unit is generated by means of the control unit controller based upon measuring the selected measure parameters by means of the measuring devices; and whereas the driver selector adapts dynamically the set of liability risk drivers varying the liability risk drivers in relation to the measured liability exposure signal by periodic time response, and the liability risk driven interaction between the loss resolving unit and the operating unit is adjusted based upon the adapted liability exposure signal. As variant, the control unit controller steering liability risk driven interaction between an automated loss resolving unit and a plurality of operating units with at least one measurable liability exposure, in case of an occurring loss at a loss unit induced by an operating unit is activating the loss resolving unit and the loss is automatically resolved by means of the loss resolving unit, whereas measure parameters associated with the liability risk drivers are measured and transmitted to a central processing device of the control unit controller and whereas the operational interaction is adapted by means of the central processing device, in that measuring devices assigned to the loss units are scanned for measure parameters and measurable measure parameters capturing a process dynamic and/or static characteristic of at least one liability risk driver are selected by means of the control unit controller, in that a set of liability risk drivers is selected by means of a driver selector of the control unit controller parameterizing the liability exposure of the operating unit, whereas a liability exposure signal of the operating unit is generated by means of the control unit controller based upon measuring the selected measure parameters by means of the measuring devices, and in that the driver selector adapts dynamically the set of liability risk drivers varying the liability risk drivers in relation to the measured liability exposure signal by periodic time response, and the liability risk driven interaction between the loss resolving unit and the operating unit is adjusted based upon the adapted liability exposure signal. A loss unit can be any kind of device, system or even human being which is exposed to action or interaction by the operating unit, i.e. which is exposed to the risk of being inflicted by a matter of liability by the operating unit. The invention has inter alia the advantage that the control system realized as a dynamic adaptable insurance system can be fully automatically optimized without any other technical or human intervention. In that way, the liability risk driven system automatically optimizes and adapts signaling generation by triggering risk exposure of insurance objects. In particular, the invention has the advantage of being able to capture in a better way the external and/or internal factors that affect casualty exposure, while keeping the used trigger techniques transparent. Moreover, the system is able to dynamically capture and adapt how and where risk is transferred, which will create a more efficient and correct use of risk and loss drivers in the liability insurance technology systems. Furthermore, the invention is able to provide an electronically automated, adaptive pricing tool for insurance products based upon liability exposure, especially for mid-size risks.

In one embodiment variant, measure parameters of at least one of the liability risk drivers of the set are generated based on saved historic data of a data storage, if the measure parameter is not scannable for the operating unit by means of the control unit controller. This embodiment variant has inter alia the advantage that measure parameters which are not scannable or measurable can be accounted for the automated optimization. As a further embodiment variant, the system can comprise a switching module comparing the exposure based upon the liability risk drivers to the effective occurring or measured exposure by switching automatically to liability risk drivers based on saved historic data to minimize a possibly measured deviation of the exposures by dynamically adapting the liability risk drivers based on saved historic data.

In a further embodiment variant, historic exposure and loss data assigned to a geographic region are selected from a dedicated data storage comprising region-specific data, and historic measure parameters are generated corresponding to the selected measure parameters and whereas the generated liability exposure signal is weighted by means of the historic measure parameters. This embodiment variant has inter alia the advantage that the measure parameters and/or liability risk drivers can automatically be weighted in relation to an understood sample of measure data. This embodiment variant allows a further self-adaption of the system.

In another embodiment variant, the measuring devices comprise a trigger module triggering variation of the measure parameters and transmitting detected variations of one or more measure parameters to the control unit controller. This embodiment variant has inter alia the advantage that the system automatically adapts its operation due to occurring changes of measure parameters.

As a further embodiment variant, the control unit controller transmits periodically a request for measure parameter update to the measuring devices to detect dynamically variations of the measure parameters. This embodiment variant has inter alia the same advantage as the preceding ones.

In another embodiment variant, the loss resolving unit unlocks an automated repair node assigned to the loss resolving unit by means of appropriate signal generation and transmission to resolve the loss of the loss unit, if the loss resolving unit is activated by the control unit controller. This embodiment variant has inter alia the advantage that any liability exposure of an operational unit can be fully automatically handled without any interaction by an operator or the like. Furthermore, the embodiment variant has the advantage that also decentralized located urgent repair nodes with a variety of repair flows for dedicated operating units can be fully automatically operated by the system.

In addition to a system, as described above, and a corresponding method, the present invention also relates to a computer program product including computer program code means for controlling one or more processors of a computer system such that the computer system performs the proposed method, in particular, a computer program product including a computer-readable medium containing therein the computer program code means.

BRIEF DESCRIPTION OF THE DRAWINGS

The patent or application file contains at least one drawing executed in color. Copies of this patent or patent application publication with color drawings(s) will be provided by the Office upon request and payment of the necessary fee.

The present invention will be explained in more detail, by way of example, with reference to the drawings in which.

DETAILED DESCRIPTION OF THE PREFERRED EMBODIMENTS

Figure 1:
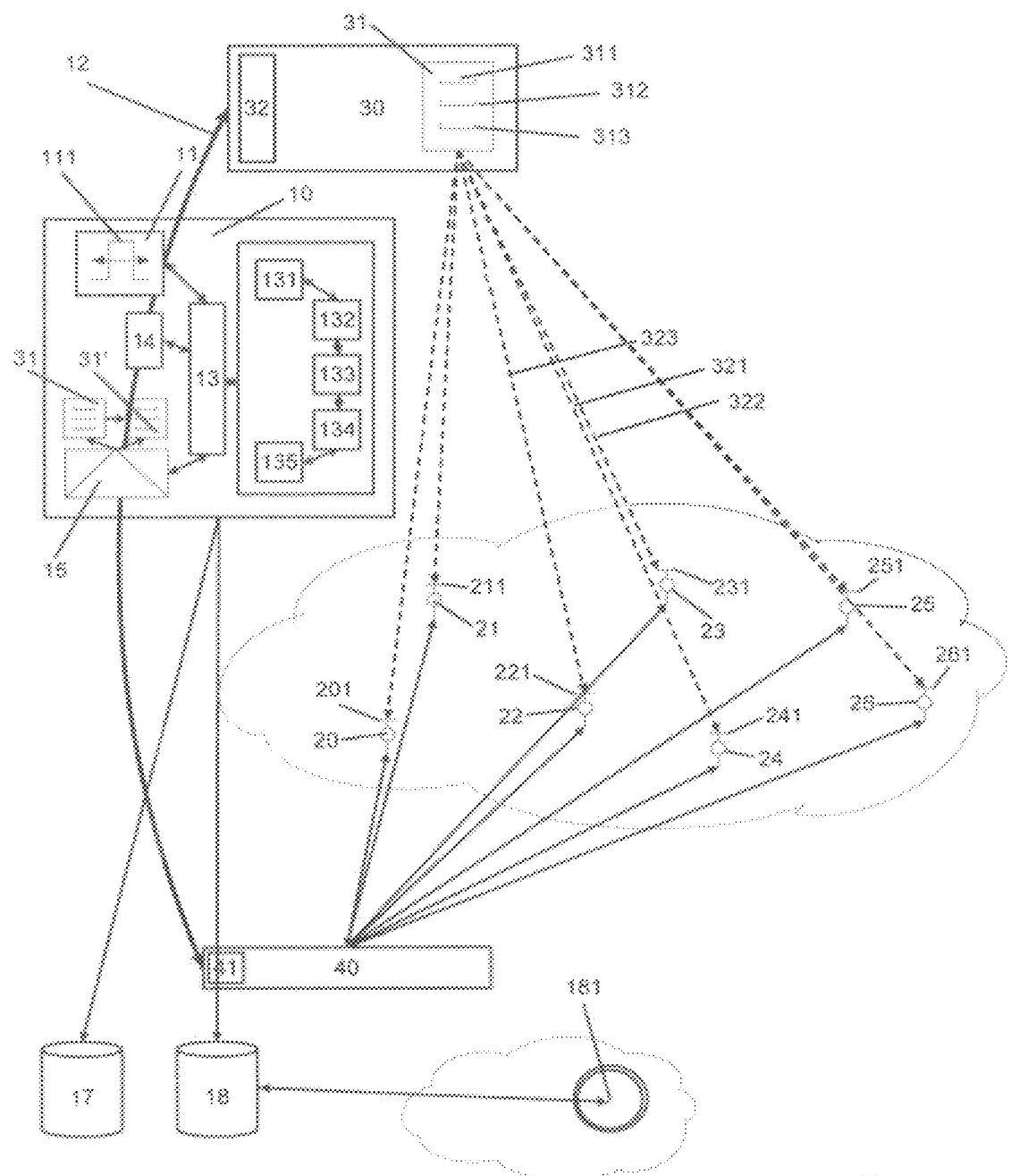
FIG. 1 shows a block diagram illustrating schematically an exemplary system for forecasting frequencies associated to future loss and loss distributions for individual risks of a plurality of operating units 30 with at least one measurable liability exposure 31 by means of independently operated liability risk drivers 311-313, and for related automated operation of a loss resolving unit 40 by means of a control unit controller 10, whereas in case of an occurring loss at a loss unit 20, . . . , 26 measure parameters are measured and transmitted to the control unit controller 10 and dynamically assigned to the liability risk drivers 311-313 and whereas the operation of the loss resolving unit 40 is automated tuned by means of the control unit controller 10 resolving the occurred loss by means of the loss resolving unit 40.

FIG. 1 illustrates schematically an architecture for a possible realization of an embodiment of the system and method for forecasting frequencies associated to future loss and loss distributions for individual risks of a plurality of operating units 30 with at least one measurable liability exposure 31 by means of independently operated liability risk drivers 311-313, and for related automated operation of a loss resolving unit or an automated insurance unit 40 by means of a control unit controller 10. In case of an occurring loss at a loss unit 20, ..., 26 measure parameters are measured and transmitted to the control unit controller 10 and dynamically assigned to the liability risk drivers 311-313. The operation of the loss resolving unit 40 is automated tuned by means of the control unit controller 10 resolving the occurred loss by means of the loss resolving unit 40 respectively the automated insurance unit 40. The system can be realized as a liability risk driven insurance system comprising a control unit controller 10 for steering liability risk driven interaction control system between loss resolving units 40 and operating units 30 with at least one measurable liability exposure 31, i.e. with operating units 30 being exposed to a risk measurable by physical parameters or based on appropriate physical parameters. In FIG. 1 reference numeral 10 refers to the control unit controller. The control unit controller 10 is realized based on underling electronic components, steering codes and interacting interface device, as e.g. signal generation modules, or other module interacting electronically by means of appropriate signal generation between the loss resolving unit 40 and the plurality of operating units 30. The inventive system, in particular in relation to the control unit controller 10 can be realized as independently operating expert system interacting at least between the measuring devices 201, ..., 261, the loss unit 20-26, the operating unit 30 and the loss resolving unit 40 by combining them to one functional, interconnected and component-interacting system. In particular, the expert system functionality becomes apparent by the control unit controller 10, scanning dynamically for measure parameters by means of the measuring devices 201, ..., 261. New measure possibilities at the measuring devices 201, ..., 261 or the loss unit 20-26 are dynamically captured by the control unit controller 10 and the appropriate liability risk driver 311-313 are generated and assigned to the currently measured parameters by the system. The measuring devices 201, ..., 261 can comprise all kind of physical or analytic measure devices, in particular all kind of sensors and data capturing or data filtering devices. The technical set-up of the measuring devices 201, ..., 261 at the loss unit 20-26 have not to be known in advance or statically kept for a certain configuration of the control unit controller 10, but in fact the measuring devices 201, ..., 261 are dynamically scanned and monitored by the control unit controller 10, whereas the control unit controller self-adapts its operational configuration of the current assigned liability risk driver 311-313. In the same way, the structure of the currently used liability risk driver 311-313 is adapted by the control unit controller 10 by generating and assigning the appropriate liability risk driver 311-313 based on the currently scanned measure parameters. The loss resolving unit 40 can comprise any kind of damage recovery modules and/or automated repair nodes, in particular it can be realized as an automated insurance unit, comprising the appropriate means for electronic accounting, billing and other transactions for compensation of losses. The damage recovery modules can also comprise monetary based damage compensation, which is electronically assigned to loss unit 20-26 with a loss caused by an operating unit 30. The loss resolving unit 40 can also comprise dedicated repair nodes comprising automatic or semiautomatic systems to maintain operation or recover loss of the loss units 20, ..., 26 in case of loss. It has to be mentioned that, for many technical applications in the insurance industry, maintenance programs or liability systems are often statutory due to security reasons or protection of the consumer, etc. The operating units 30 can comprise all kinds of operating or field devices, such as for example device controllers, valves, positioners, switches, transmitters (e.g. temperature, pressure and flow rate sensors) or any other technical devices. An automated repair node can comprise a defined repair flow. A repair flow comprises the process flow triggered or initiated by a liability loss of a loss unit 20-26 caused by an operating unit 30, as described above, to repair or replace the loss, the technical fault or malfunction. The repair flow can comprise the use of dedicated automated repair devices, which are controlled by the loss resolving unit 40 or the operating unit 30 or the control unit controller 10. The repair flow can also comprise financial compensation, such as e.g. a direct technical repair or replacement of the loss becomes impossible or the use of dedicated repair devices is not possible due to other reasons. To cover such cases of liabilities, the repair node can also comprise means to initiate data transmission for financial compensation. It can be useful for the repair nodes to comprise or have access to tracking systems of loss on the loss units 20, ..., 26. Normally, operating units 30 are assigned to a user or a firm or are at least representing a user or a firm. However, each operating unit 30 has at least one measurable risk or exposure for arising liability to a loss unit 20-26.

The control unit controller 10 can comprise one or more data processing units, displays and other operating elements such as a keyboard and/or a computer mouse or another pointing device. As illustrated schematically in FIG. 1, the control unit controller 10 as well as the operating units 30 and the loss resolving unit 40 comprise functional modules, such as e.g. the signaling module 11 for signal generation and transmission 111, central processing device 13, signal transmission interface 14/32/41, driver selector 15, data storages 17/18 and/or liability risk drivers 311-313. A person skilled in the art will understand by viewing the specification that these functional modules are realized at least partially as hardware components. However, a person skilled in the art will also understand that the functional modules can be implemented at least in parts by means of dedicated software modules.

Further to FIG. 1, reference numerals 14/32/41 refer to signal transmission interfaces, which can be connected directly or over a data transmission network. Therefore the control unit controller 10 and/or the operating unit 30 and/or the Loss resolving unit 40 and/or the loss units 20-26 and/or the measuring devices 201, ..., 261 can be connected via a network for signal transmission. The network can comprise e.g. a telecommunication network as a wired or wireless network, e.g. the Internet, a GSM-network (Global System for Mobile Communication), an UMTS-network (Universal Mobile Telecommunications System) and/or a WLAN (Wireless Local Region Network), a Public Switched Telephone Network (PSTN) and/or dedicated point-to-point communication lines. The control unit controller 10 and/or the operating unit 30 and/or the loss resolving unit 40 and/or the loss units 20-26 and/or the measuring devices 201, ..., 261 can also comprise a plurality of interfaces to connect to the communication network according to the transmission standard or protocol.

At least one measurable liability exposure 31 is assigned to each of the plurality of operating units 30. Each liability exposure 31 can be represented by means of a liability risk driver 311-313. In FIG. 1, the reference numeral 31 depicts the liability exposure of the "real world", while the reference numeral 31' stands for the liability exposure based on the risk drivers 311-313 generated by the control unit controller 10. The liability risk drivers 311-313 are hardware and/or software based functional modules interacting electronically with the signal generation of the control unit controller 10. The control unit controller 10 comprises means to activate the loss resolving unit 40 in case of an occurring loss at a loss unit 20, . . . , 26 induced by an operating unit 30 and the loss resolving unit 40 comprises automated damage recover means to resolve the loss. Measure parameters associated with the liability risk drivers 311-313 are measured and transmitted to a central processing device 13 of the control unit controller 10 and the operational interaction is adapted by means of the central processing device 13. The control unit controller 10 comprises a trigger module to scan measuring devices 201, . . . , 261 assigned to the loss units 20, . . . , 26 for measure parameters and to select measurable measure parameters capturing or partly capturing a process dynamic and/or static characteristic of at least one liability risk driver 311-313 by means of the control unit controller 10.

Figure 3:
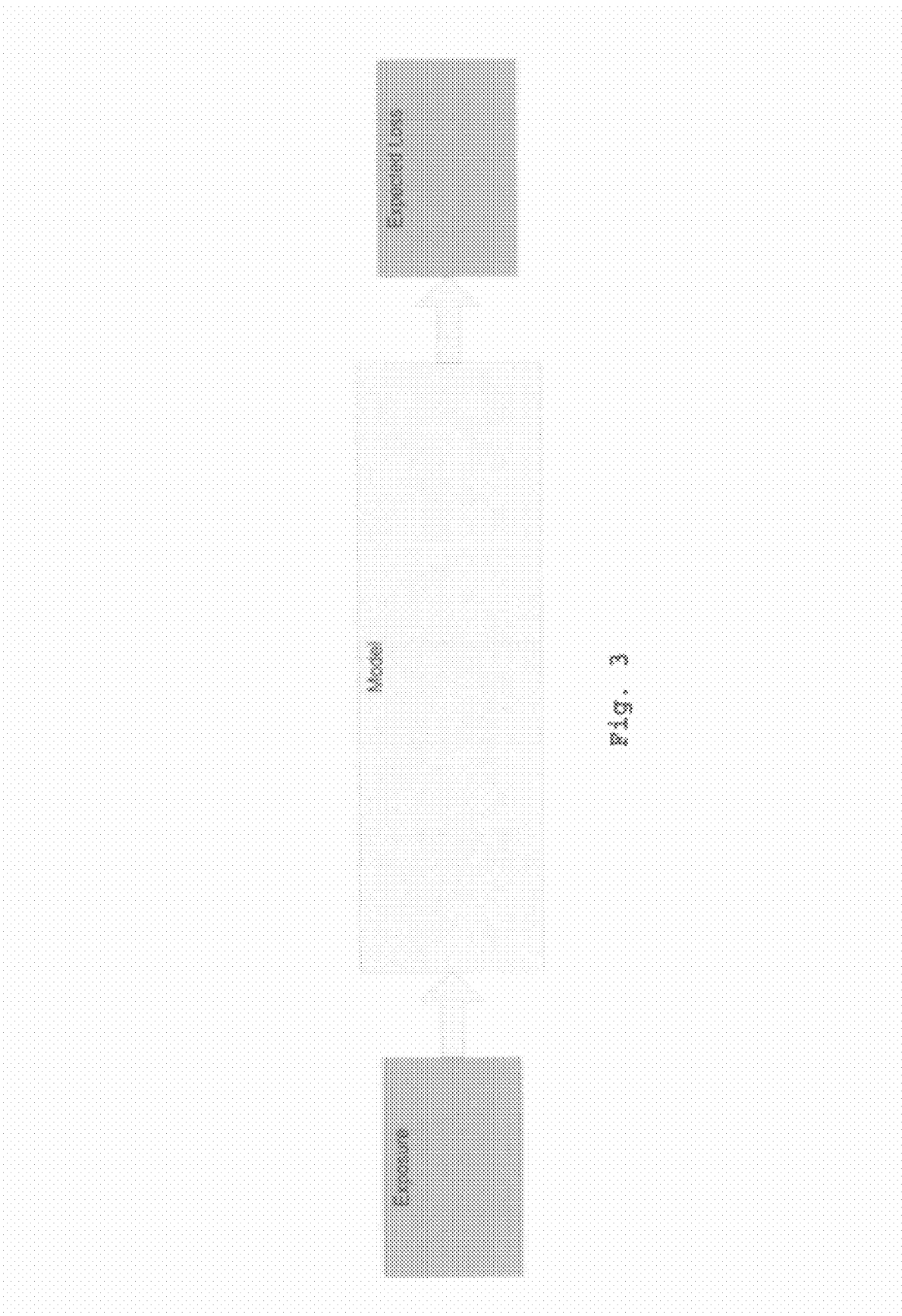
FIG. 3 shows a block diagram illustrating schematically the relationship between exposure and loss. In an exemplary allocation of risk drivers by the system, selected risk drivers are allocated to functional modules. The indicator quantification of the selected risk drivers is achieved by tracing measurable quantities representing the risk driver and detecting how to measure or estimate the quantity. Additionally an influence quantification of the selected risk drivers can be achieved by determining model parameters for example from market values and fitting remaining parameters (without measurable quantities representing the risk driver) to historic exposure and loss data.
Figure 4:
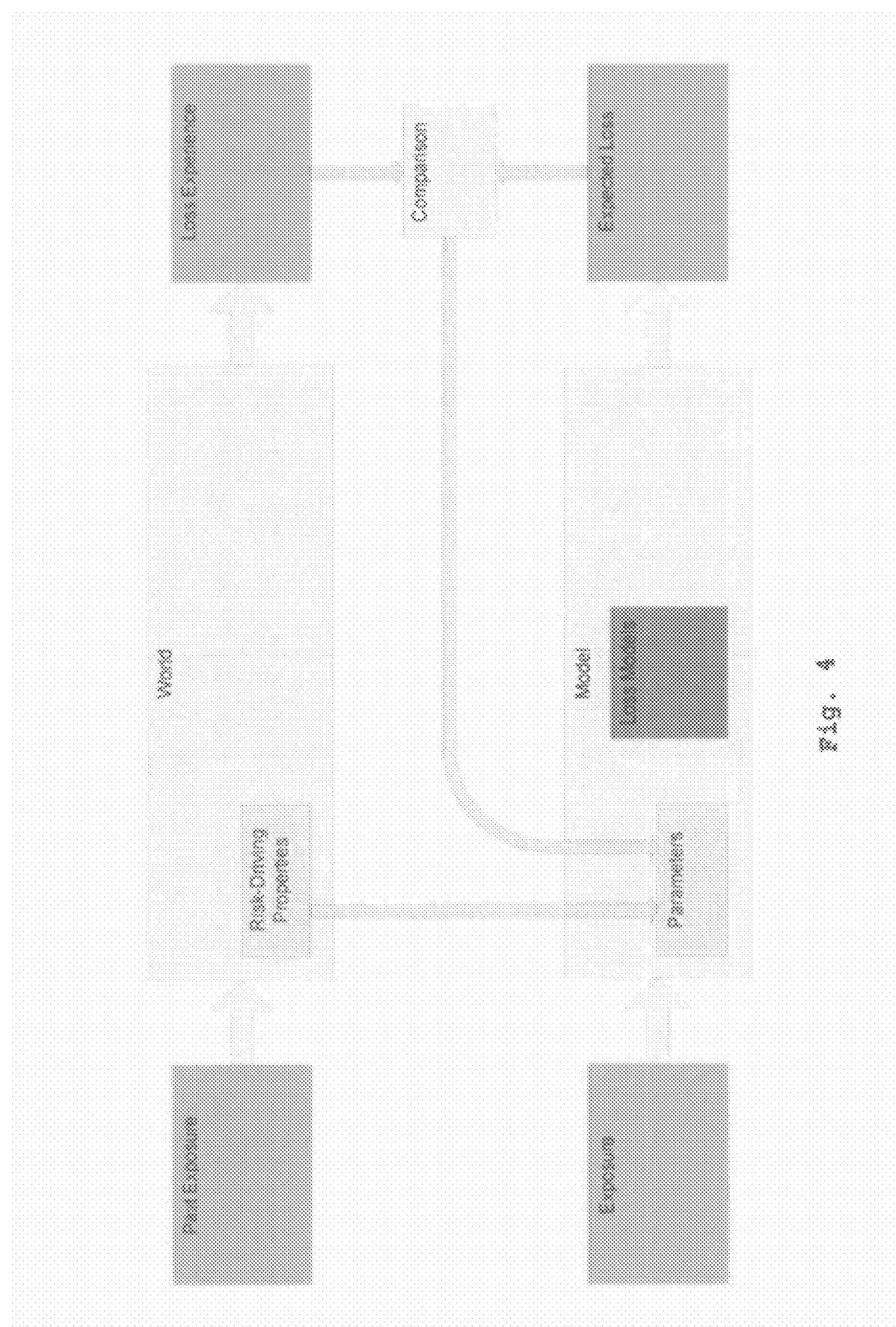
FIG. 4 shows a block diagram illustrating schematically an exemplary dynamic expansion and further calibration of the used risk drivers by means of the system, whereas the used set of risk drivers mirror the structure of the outside world. The loss history is used to further calibrate the model parameters by means of the system. Starting from a simple set, the system gradually extends it.

FIG. 3 shows schematically the relationship between exposure and expected loss. FIG. 4 further shows a diagram illustrating an exemplary allocation of risk drivers by the system and the driver selector 15. Selected risk drivers are allocated to functional modules. The indicator quantification of the selected risk drivers is achieved by tracing measurable quantities representing the risk driver and detecting how to measure or estimate the quantity. Additionally, an influence quantification of the selected risk drivers can be achieved by determining model parameters for example from market values and fitting remaining parameters (without measurable quantities representing the risk driver) to historic exposure and loss data. Thus, for operation, the system requires a number of parameters. Some measure parameters which cannot be measured directly, such as cost of living in various countries, can be obtained from other sources. Other parameters such as the base severity of a scenario class can only be obtained by comparing model predictions with past loss experience. As FIG. 4 shows, at least one loss experience has to be compared with a system prediction for each parameter not obtained from other sources (risk driving properties of the real world). To achieve this, loss experience can be split e.g. by location (country) and/or underlying risk (risk object/activity and peril) and/or loss components. Module based extensions to the system can e.g. allow a generation of the expected loss after insurance risk transfer. Starting from the simple system structure, such modular extensions are easy to implement. The determination of the risk capital requirements using event-set based simulations is possible without the need for additional parameters.

Figure 5:
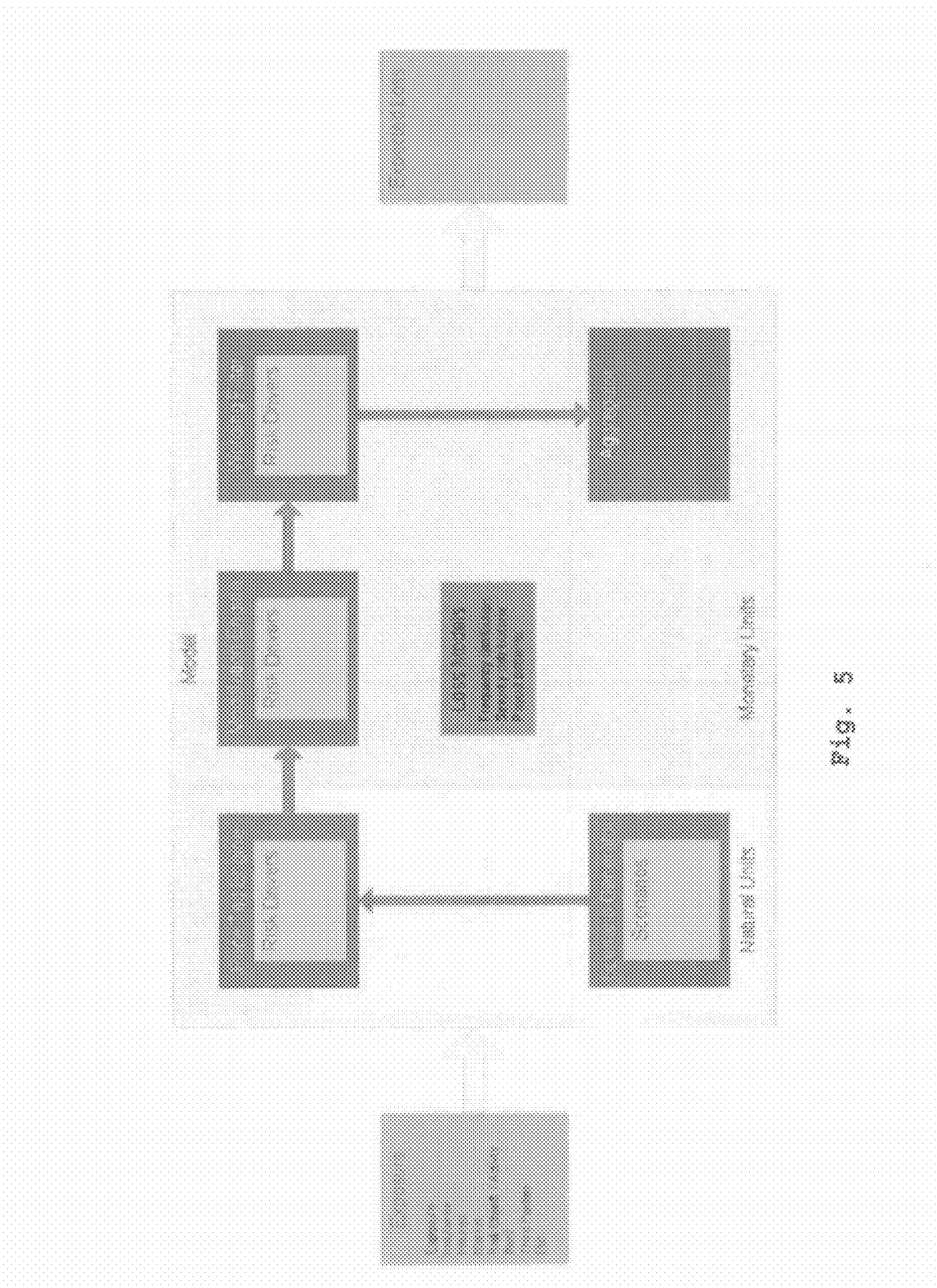
FIG. 5 shows a block diagram illustrating schematically an exemplary operation performed by means of the modules of the system. Each loss model is based on a scenario and has one frequency and several severity components. The linking between cause and effect and decomposition of the risk into components is performed by means of the system by identifying and triggering the perils (cause of potential loss), the risk objects or activities (cause of potential loss) and/or the scenario classes (effect of potential loss). Additional identification can be achieved based upon the affected parties (line of business) and/or locations (country). After identification and decomposition a frequency distribution (mean), several severity components (mean, standard dev.) and assigned volume are characterized by means of the system. Finally, the links are established by means of the system between cause, effect, and the cost of a potential loss, as well as between the risk drivers.
Figure 6:
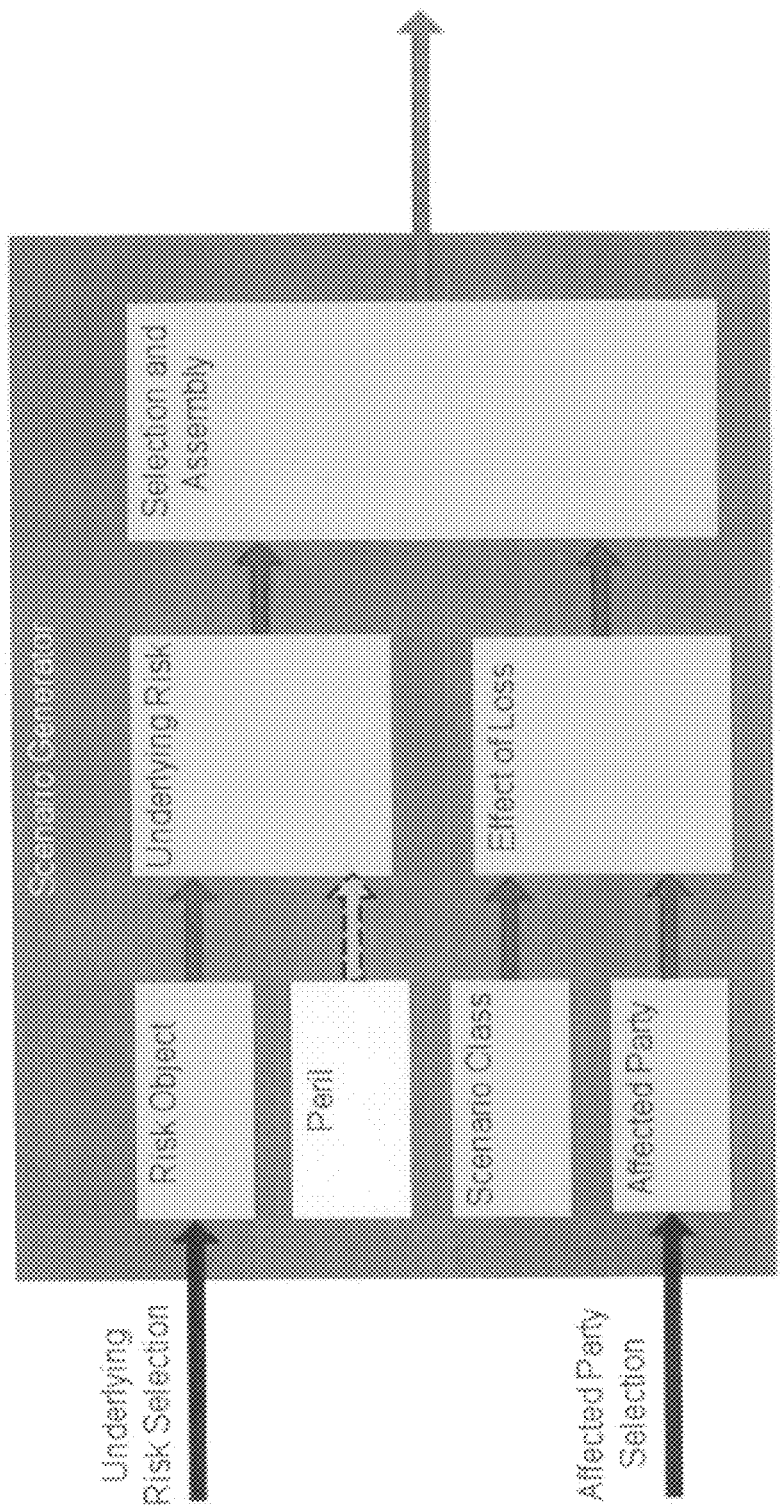
FIG. 6 shows a block diagram illustrating schematically an exemplary structure of the scenario generator 131. The diagram illustrates the modules containing appropriate functional components, whereas the modules mirror the modeled operational realization.

For the technical realization of the system the functional units of the control unit controller 10 can be broken down into manageable modules, as FIG. 5 shows. In this embodiment variant, the system comprises a scenario generator 131, a price tag engine 132, a modulation engine 133, a plurality of loss scenarios (loss models), a wording filter 134 and an aggregator (see FIG. 5). The operation of the modules can for example be chained to reflect the sequence (1) cause of a potential loss, effect of the potential loss (scenario generator 131), (2) cost of the effect of a potential loss (price tag engine 132), (3) influence of various factors on the loss cost (modulation engine 133), (4) insurance coverage of the potential loss (wording filter 134), (5) total expected loss (aggregator 135). Thus, this substructure would contain five modules, which are assigned to each other by a loss scenario representation by means of the control unit controller 10. Each of the 5 components accommodates a number of risk drivers 311-313 and takes the input information from the loss scenario and the exposure. The loss scenarios are modified and passed to the next module. Through this structure, each module is assigned to a specific set of questions. According to FIG. 5, the scenario generator 131 can be assigned to the conceptual objects: (i) What are the causes of a potential loss?, (ii) What are the effects of the potential loss? and (iii) Who is affected?; the price tag engine 132 to (i) How much does the consequence of the potential loss cost? (ii) What is the exposure to the consequence of the potential loss?; the modulation engine 133 to (i) Which factors related to the insured influence a loss frequency or severity? (ii) Which factors related to the economic, legal or societal, environment influence a loss frequency or severity?; the wording filter 134 to (i) Which part of the loss is covered by the insurance?; and the aggregator 135 to (ii) What is the total expected loss corresponding to the exposure?. FIG. 6 illustrates schematically a possible structure of the scenario generator 131 in more detail.

In the inventive system, the liability risk driver structure is based on scenarios. Loss scenarios are the system variables of the control unit controller 10 which connect the liability risk drivers 311-313 to form a functional structure. In the following, the relationship between the components of the control unit controller 10 of the embodiment variant introduced above and the loss scenarios are established. A scenario is a specific setup and flow within a series of events or occurrences. Therefore, a scenario or the describing data and function of the scenario comprises the answers to the questions "what could cause a loss" and "what would be the effect of the potential loss" with the answers to the questions "where could it happen" and "who could be affected". Time dimensions are explicitly comprised in the control unit controller 10. A scenario can be regarded as the entity identified by the categories peril, risk object/activity, loss mechanism, type of affected party, and location. The scenarios are the classes of potential losses, and individual losses are their instances. The technical purpose of creating scenarios is at least threefold: (1) Scenarios allow an intuitive breakdown of a risk landscape; (2) Scenarios make it possible to decompose the risk into components on which risk drivers act independently; and (3) Scenarios allow the simulation of single loss sets based on event sets, which allows an estimation of risk accumulation. A scenario can be identified by the following categories: (i) Peril: part of the cause of potential loss. (ii) Risk activity or risk object: part of the cause of potential loss. (iii) Scenario class (loss mechanism): effect of potential loss. Additionally, the following categories can be reasonable to decompose the risk into system components of the control unit controller 10 on which risk drivers 311-313 act independently: (iv) Third party liability: defined by the loss resolving unit 40 line of business (either Product Liability or Commercial General Liability), (v) Location of potential loss: a country, in case of product liability, the market the product is sold to, in case of commercial general liability, the place of production. In this embodiment variant, the parameter values "unknown" or "generic" can not only be accepted by the mentioned components of the control unit controller 10, but can be important values of each category. For example, there is a background scenario responsible for all uncorrelated high-frequency/low-severity losses for each type of affected loss units 20-26 or operating units 30. The background scenario is identified by an unknown peril, an unknown risk activity or risk object, an unknown mechanism, but a known type of affected party. In this embodiment variant, the loss scenario is not normalized but rather created out of a normalized representation in the scenario generator 131. The subsequent financial loss is implicitly a part of each component of the control unit controller 10, for example the financial loss according to bodily injury. It is clear that the location of the potential loss may differ from the location of the loss resolving unit 40, the insured, and the permanent location of the third party based upon a specific embodiment variant. As an example, for a specific embodiment variant, it can be assumed that different locations for the export market, for product liability and the place of production for commercial general liability. Additionally, the frequency of losses may have to be generated out of the frequency of events and the distribution of the number of losses per event. The structure of the control unit controller 10 makes it possible to easily incorporate such assumptions in the operation of the system.

For each relevant scenario, there are one or several loss models. These loss models can be called loss scenarios and are common to all the components 131-135 of the control unit controller 10. The components 131-135 can have the following operational interaction: 1. The scenario generator 131 (source): Based on the exposure information in the model input, the scenario generator 131 generates scenarios. For each generated scenario, a loss model is generated. 2. The risk drivers engines: The risk drivers engines change the representations of these loss models or some values thereof. 3. The aggregator 135 (destination): The destination of the loss models is the aggregator 135 which calculates an expected loss. The scenarios can explicitly comprise time introduced as a dimension whereas the loss scenarios become a dependency of time t. Very-low severity losses are frequent but neither relevant to the loss resolving unit 40 because of a deductible or self-insured retention nor getting reported as a consequence thereof. Therefore, a common excess point as a monetary amount is part of all loss models. In a preferred embodiment variant, the common excess point is 0, however there is a credibility threshold. Since the relationship of the frequency distribution to the exposure volume is non-linear, and the volume needs to be split between different scenarios, different markets, etc., the frequency distributions are volume-independent. The scenario generator 131 generates the effect of the exposure value. In one embodiment variant, the aggregator 135 can take into account the actual exposure for each scenario.

Furthermore, each loss scenario and therefore each loss model normally has exactly one frequency distribution function assigned. As taken into account by scenario generator 131, several losses may be caused by the same event. The events are independent (dependencies can be explicitly comprised in the control unit controller 10 using a feedback loop between the risk driver engines). Therefore, the loss scenario frequency distribution is a Poisson distribution characterized by the first moment. The indictors of all external risk drivers depend on time. However, their values are all selected according to the anticipated in-force period of the contract parameter to be rated by the system. This corresponds to a pure accident-year-based trending. In another embodiment variant, the system is intended for long-tail lines of business, the structure of the liability risk driver system can be designed with explicit treatment of the temporal development of losses in mind. The temporal development is split into three phases: the scenario development depending on the characteristics of the potential losses, the claim development depending on the characteristics of the operating environment of the potential losses, and finally the payout process depending on the characteristics of the potential claimants and their operating environment. As another embodiment variant, however, the frequency distribution can relate to a predefined reference volume throughout the structure of the invention. Because the relationship between volume and loss frequency cannot be assumed to be linear for the entire range of volume, the true volume is only allocated to the different scenarios during the aggregation into one single loss model.

In the system's frequency calculation framework, the frequency $\lambda_{ikl,\lambda}$ of a potential loss associated with a scenario ikl,$\lambda$ (i: cause of potential loss, kl: effect of potential loss, occurring in location $\lambda$) is:

$$\lambda_{ikl,\lambda} = f_{ikl} \frac{R_{i\lambda,l}}{R_0},$$

where $=R_{i\lambda,l}=Rp_ip_{i\alpha,j}$ is the revenue by product/activity/earned (in case of 1 equal products) or produced (in case of/equal premises) and $f_{ikl}=F_i a_{i,kl}$ is the frequency of scenario ikl per unit of reference volume in industry segment i. In this embodiment variant the parameters used are R total revenue, $p_i$ exposure (volume) split by industry segment i, $p_{i\lambda,l}$ exposure (volume) split in industry segment i by location (country) $\lambda$ for affected party/(products or premises), Furthermore, the parameters used are $F_i$ base frequency, i.e. the number potential events per year and unit of reference volume in industry segment i, $a_{i,kl}$ assignment percentage of effect kl to cause i, i.e. the fraction of potential events with effect kl in all potential events with cause and $R_0$ reference revenue (e.g. 100 million Euros/year). The framework in this liability risk driver system implies a linear dependence between the company turnover (or revenue) and the loss frequency.

In another embodiment variant of the system, the frequency generation is based upon the fact that the observed frequency of products- and general-liability losses is subproportional to the revenue (turnover) and rather follows a square root with a slowly changing prefactor:

$$F \propto \ln^2(R) R^{0.5},$$

where F is the loss frequency, and b and $\beta$ are empirical constants valid for revenues e.g. between 1 million Euros to 1 billion Euros. To satisfy this requirement of this embodiment variant, the frequency $\lambda_{iklm,\lambda}$ of a potential loss associated with the scenario ilkm (il: cause of potential loss, km: effect of potential loss) occurring in location $\lambda$, is:

$$\lambda_{iklm,\lambda} = f_{ilkm} \phi_{i\lambda,j},$$

where $f_{iklm} = F_{il} a_{il,km}$ is the frequency of all scenarios ilkm for one unit of LRD volume, $\phi_{i\lambda,l} = \Phi p_i p_{i\lambda,l}$ is the revenue-split-dependent volume factor, $\Phi = a\ln^\beta(R_{log}\,v) v^b$ is the total volume factor (size correction for relative volume v), and $$a = \frac{1}{\ln^\beta(R_{log})}$$

is a prefactor. The implemented variables of the embodiment variant are v relative volume (the liability risk driver volume V measured in liability risk driver units), $p_i$ exposure (volume) split by industry segment i, $p_{i\lambda,l}$ exposure (volume) split in industry segment i by location (country) $\lambda$ for affected party l (products or premises). The following further parameters used are $F_{il}$ base frequency, i.e. the number of potential events per year and unit of reference volume in industry segment i for affected party l, $a_{il,km}$ assignment percentage of effect km to cause il, i.e. the fraction of potential events with effect km in all potential events with cause il. b is the empirical revenue power and can be set e.g. to 0.5. β is the empirical log power, which can be set e.g. to 2 and $R_{log}$ as log coefficient can e.g. be set to $10^8$.

For the generation of the relative volume v, the following parameters are implemented: $R_0$ as revenue constant (e.g. 100 million Euros/year), $r_λ(t)$ relative reference revenue for location (country) λ at time (year) t. It is important to note that despite the different look of the generation relations in the two embodiment variants, the frequencies of the second embodiment variant of the liability risk driver system are equal to the frequencies generated with the first embodiment variant using corresponding parameters, if the company revenue parameter is equal to the reference revenue parameter, and if the base frequencies are independent of the affected party.

Each scenario and therefore each loss model can have several loss components. A severity distribution function characterizes the severity of each loss component of each loss model. The split of the loss burden into several components is essential for the separation into: (i) The consequence of a loss (e.g. an injured person) which does not depend on factors such as medical costs. The consequence of a loss is expressed in natural units (e.g. number of injured persons). (ii) The cost of the consequence of a loss (e.g. the money spent on the recovery of an injured person) which depends on the underlying risk. Moreover, especially in the long-tail business, the loss components have fundamentally different time developments. By means of the additional modules of the control unit controller 10, it can be possible to allocate the expected loss burden to some loss components for a predefined set of concrete scenarios which were chosen to be exemplary for a representative set of possible scenarios leading to product liability or commercial general liability claims. The information obtained in the manner described above is sufficient to generate the parameters for the loss components for each scenario. The following table gives an example of components in relation to their natural unit and severity. However, in a preferred embodiment variant, cost parameters can be comprised as a further component.

| Component | Subcomponent | Natural Units | Natural Severity | Notes |
|---|---|---|---|---|
| Bodily Injury | Reversible Injury Disability Death | Persons | Count | |
| Property Damage | Material Damage | Person equivalents | Count | Standard buildings, standard consumer products, etc. |
| | Subsequent Financial Loss | Person equivalents | Count | Business interruption, etc. |
| Pure Financial Loss | | Person equivalents | Count | |

As an embodiment variant, the control unit controller 10 can use such a table as a starting point. It is not and does not have to be completed for operation, but is completed and adapted automatically by the control unit controller 10 during operation. For example, an average building is clearly insufficient as a natural unit since an average building, like any other average good of a given type, is not a naturally given unit, and the ratios between the cost e.g. of buildings, vehicles, consumer goods and agricultural produce are not market-independent, etc. However, the different scales prevent the components 131-135 of the control unit controller 10 from splitting of the property damage loss burden in terms of a count of natural units into as different types of property such as small consumer goods and skyscrapers. This conditioning problem can e.g. be solved by defining the property damage unit by its cost. The effective components of property damage are added later by the system. Any inconsistencies that arise, such as e.g. that each subcomponent of bodily injury implicitly contains a subsequent financial loss component whose time development is different from the time development of the costs arising from the bodily injury directly, which needs to be addressed by other systems separately, are overcome by the control unit controller 10 during optimization.

In the embodiment variant, the loss component severities are represented in different units at different places of the liability risk drivers 311-313: (a) Natural units: After leaving the scenario generator 131, the severity of a loss given a scenario is expressed in natural units, e.g. number of injured people. In order to facilitate differentiation, the severity of a loss component expressed in natural units is called a scenario loss consequence component. (b) Monetary based units: After leaving the price tag engine 132, each loss component of each scenario is characterized by its own severity distribution in terms of monetary amounts. Such a severity is called herein a scenario loss severity component. Although the overall severity often has known properties such as a monotonically decreasing probability density function (above a certain observation point a Pareto distribution), the functional form of the distribution function of a single scenario loss severity component of a single scenario is not generally known. Instead, by means of the control unit controller 10 a scenario loss severity component is characterized by its mean value and the standard deviation, assuming a log-normal distribution. However, this need not strictly be the case for all embodiment variants, since the characterization can also be given by the mean value and the coefficient of variation rather than the mean value and the standard deviation. In a preferred embodiment variant, the realization is contribution dependent on the loss mechanism and/or contribution dependent on the location. In an embodiment variant, like the scenario loss consequence components $N_{jα}$ and severity components $S_{jαλ}$, for the generation of the uncertainty of loss severities by means of the price tag engine/determiner 132 of the liability risk driver system the economic compensations $C_{jλ}$ for damages of type j (loss components, e.g., irreversibly injured or dead people) at location (country) λ are characterized by their respective mean values $c_{jλ}^{(1)}=C_{jλ}$ characterizing their size and the variation coefficients (ratios between standard deviation and mean) $γ_{jλ}^{(2)}=c_{jλ}^{(2)}/c_{jλ}^{(1)}$ characterizing their relative uncertainty. However, as another embodiment variant, the following changes can be made to improve the accuracy especially in the prediction of the expected loss in single industry segments where only a small number of scenarios is available: (i) The variation coefficients of the loss consequence components $v_{jα}^{(20)}$ are no longer constants of the system but depend on the loss component j and the loss mechanism m(α) of scenario α. (ii) The variation coefficients of the economic compensations $γ_{jλ}^{(2)}$ no longer depend only on the location (country) λ but also on the loss component j. They take precedence over the model-wide default $γ^{(2)}$. (iii) The risk driver is realized by means of liability laws accounting for the award predictability and increases the uncertainty accordingly. The modulator $f_{jαλ}^{ra1}$ may or may not depend on the loss component. As noted above, the formula for combination of the variation coefficients depends on the distribution functions of N and C. Since they are not known, the variation coefficients are added (based on a series expansion around the mean values). For each loss component j of each scenario loss model α at location (country) λ, the uncertainty is calculated: (i) The scenario generator 131 determines the uncertainty of the loss consequence: $v_{j\alpha\lambda}^{(2)} = v_{jm(\alpha)}^{(2)}$, (ii) the price tag engine 132 determines the uncertainty of the economic compensation for one natural unit:

$$\gamma_{j\alpha\lambda}^{(2)} = \begin{cases} \gamma_{j\lambda}^{(2)} & \text{if defined} \\ \gamma^{(2)} & \text{otherwise,} \end{cases}$$

the price tag engine 132 combines the two uncertainties to generate the uncertainty of the economic compensation for the potential loss: $\sigma_{j\alpha\lambda}^{(2)} = v_{j\alpha\lambda}^{(2)} + \gamma_{j\alpha\lambda}^{(2)}$, (iii) the modulation engine 133 increases the uncertainty $\sigma_{j\alpha\lambda}^{(2),\,mod} = f_{j\alpha\lambda}^{ral} \sigma_{j\alpha\lambda}^{(2)}$ to obtain the uncertainty of the severity of the potential loss $\sigma_{j\alpha\lambda}^{(2),\,mod}$. In yet another embodiment variant, the ratios between the standard deviation and the mean can be set as a fixed model-wide parameter. Because the conversion between natural and monetary units occurs component-wise, a log-normal distribution can be used in this embodiment variant both for natural units and monetary amounts. On the other hand, any non-multiplicative operations will make it necessary to use also other distributions. The following table shows an exemplary loss scenario generated by means of the control unit controller 10, which is represented by the following components:

In the embodiment variants, the loss scenario loss is not normalized but rather created out of a normalized representation in the scenario generator 131. The subsequent financial loss is implicitly a part of each component of bodily injury. The location of the potential loss may differ from the location of the loss resolving unit 40, the insured, and the permanent location of the third party. For the embodiment variant, this can be assumed e.g. for the export market for products liability and/or the place of production for commercial general liability. It might be reasonable that the frequency of losses is generated out of the frequency of events and the distribution of the number of losses per event.

Exposure of information data can be one of the input parameters of the liability risk drivers 311-313. Concerning the exemplary structure of FIG. 5, exposure information data is used in the following components of the control unit controller 10: (i) Scenario generator 131: Only scenarios with corresponding exposure are created in the scenario generator 131. (ii) Aggregator 135: The volume splitter can be realized e.g. as a part of the aggregator 135. The exposure can be represented by the total volume and eventual breakdowns, which comprise: (i) Time (year), (ii) Total volume (can be monetary amount data), (iii) Volume breakdown by underlying risk (risk object/activity, affected party, location of potential loss), and (iv) The risk driving properties represent the insured object and finally the insurance wording. In some embodiment variants, it is reasonable to break down the total exposure into components by several categories of the underlying risk by means of a given sequence of the system. The exposure breakdown data are usually normalized by the sys-

| Bodily injury | | | | | | Property damage | | |
|---|---|---|---|---|---|---|---|---|
| Reversible injury | | Irreversible injury | | Death | | Material damage | Subsequent financial loss | Pure financial loss | Cost |
| BI | SFL | BI | SFL | BI | SFL | Non-movable   Movable | | |

The table below shows another embodiment variant as an exemplary loss scenario generated by means of the control unit controller 10. In this embodiment variant, the loss scenario is represented by the following components:

| Role | Component | Characterized by |
|---|---|---|
| Underlying Risk | Risk Object/ Activity Affected Party Location of Potential Loss | |
| Exposure | Assigned Volume | Amount |
| Frequency | Frequency of Potential Loss | Mean |
| Consequence | Scenario Class | |
| | Death | Mean, st. dev. |
| | Disability | Mean, st. dev. |
| | Rev. Injury | Mean, st. dev. |
| | Material Damage | Mean, st. dev. |
| | Subsequent Financial Loss | Mean, st. dev. |
| | Pure Financial Loss | Mean, st. dev. | tem. The loss units 20-26 may be qualified by a number of predefined risk driving properties. Availability of these properties to the control unit controller 10 generally results in smaller loss frequencies and severities. Analogously, the insurance wording may be qualified by a number of risk driving properties. The availability of these properties also generally results in smaller loss frequencies and severities.

According to FIG. 5, the scenario generator 131 can be assigned to the following conceptual objects: (i) What are the causes of a potential loss?; (ii) What are the effects of the potential loss?; (iii) Who is affected? FIG. 6 shows schematically a possible realization of the structure of the scenario generator 131 in more detail. The scenario generator 131 generates loss scenarios relevant for the output by selecting underlying risks (potential causes of loss: combinations of peril and risk object/activity), mechanisms (potential effects of a loss) and line of business coverage (products or commercial general liability) and combining them into loss scenarios with the severity distribution expressed in natural units. Scenario selection criteria of the scenario generator 131 can comprise risk object and/or type of party affected and line of business. The loss scenarios are represented in natural units. As one embodiment variant, the following liability risk driver 311-313 (LRD) identified and selected by means of the driver selector 15 can e.g. be used in the scenario generator 131.

| LRD Cluster | LRD Member | LRD Quantity |
|---|---|---|
| Insured Product Portfolio | Type of Products Produced | Base frequency and severity |

In this example, the insured product portfolio represents the risk inherent to the product sold by the insured operational unit 30. The type of product defines the type of products manufactured by the insured. As input quantity source to the scenario generator 131, scenario base frequencies for reference volume, reference volume and scenario base severities can be used as input parameters. As output of the scenario generator 131, the scenario generator 131 acts on the following on loss model components, which are 1. Reversible/minor injury, 2. Disability/irreversible injury, 3. Death, 4. Property damage, and 5. Business interruption. Each underlying risk (for the time being industry segment only) may trigger one or more scenario classes, each having its own base severity. The scenario generator 131 further comprises a processing module to generate the frequency of loss scenario and the severity in natural units of the single loss components. In a preferred embodiment variant, the measure parameters are realized in the abovementioned liability risk driver 311-313 in that the observed frequency of products- and general-liability losses is subproportional to the revenue (turnover). Therefore, in a preferred embodiment variant, it follows the square root with a slowly changing prefactor $F \propto \ln^2(R) R^{0.5}$, where F is the loss frequency, and b and β are empirical constants valid for revenues e.g. between 1 million Euros to 1 billion Euros. To satisfy this requirement of the liability risk system, the frequency $\lambda_{ilkm,\lambda}$ of a potential loss associated with the scenario ilkm (il: cause of potential loss, km: effect of potential loss) occurring in location λ is:

$$\lambda_{ilkm,\lambda} = f_{ilkm} \phi_{i\lambda;l}$$

where $f_{ilkm} = F_{il} a_{il,km}$ is the frequency of all scenarios ilkm for one unit of LRD volume, $\phi_{i\lambda;l} = \Phi p_i p_{i\lambda;l}$ is the revenue-split-dependent volume factor, $\Phi = a \ln^\beta(R_{log} v) v^b$ is the total volume factor (size correction for relative volume v), and $$a = \frac{1}{\ln^\beta(R_{log})}$$

is a prefactor. The variables used are v relative volume (the liability risk driver volume V measured in liability risk driver units), $p_i$ exposure (volume) split by industry segment i, $p_{i\lambda;l}$ exposure (volume) split in industry segment i by location (country) λ for affected party l (products or premises). The parameters used are $F_{il}$ base frequency, i.e. the number of potential events per year and unit of reference volume in industry segment i for affected party l, $a_{il,km}$ assignment percentage of effect km to cause il, i.e. the fraction of potential events with effect km in all potential events with cause il, b empirical revenue power (e.g. 0.5), β empirical log power (e.g. 2), $R_{log}$ log coefficient (e.g. $10^8$). For the generation of the relative volume v, the following parameters used are $R_0$ revenue constant (e.g. 100 million Euros/year) and $r_\lambda(t)$ relative reference revenue for location (country) λ, at time (year) t.

In another embodiment variant, the measure parameters are related in the abovementioned liability risk driver 311-313 according to:

$$f_{ik} = F_i a_{ik}; \quad s_{kj} = S_k p_{kj}; \quad \sum_k a_{ik} = 1; \quad \sum_j p_{kj} = 1$$

whereas $F_i$ is the base frequency of industry segment i of loss scenario loss ik, $f_{ik}$ is the frequency of loss scenario ik (output), $S_k$ is the base severity of scenario class k, $a_{ik}$ is the assignment percentage of scenario class k to risk object i, $p_{kj}$ is the percentage of severity component j in natural units of scenario class k, and $s_{jk}$ is the severity in natural units of loss component j of scenario class k (output). FIG. 6 shows an embodiment of the scenario selection and assembly cascade being based on the illustrated components. In the example, the underlying risk is identified by the risk object (type of products) and an unknown peril. Out of all possible combinations of cause of loss i (underlying risk), effect of loss k (scenario class), and type of party affected l (line of business), only the ones are selected with (i) underlying risk i (ii) line of business l matching the exposure information and (iii) scenario class k having non-zero assignment percentages $a_{ik}$. The formulae for the formation of the scenario loss consequence component mean values and the scenario frequency mean values are given with risk driver l.

Figure 7:
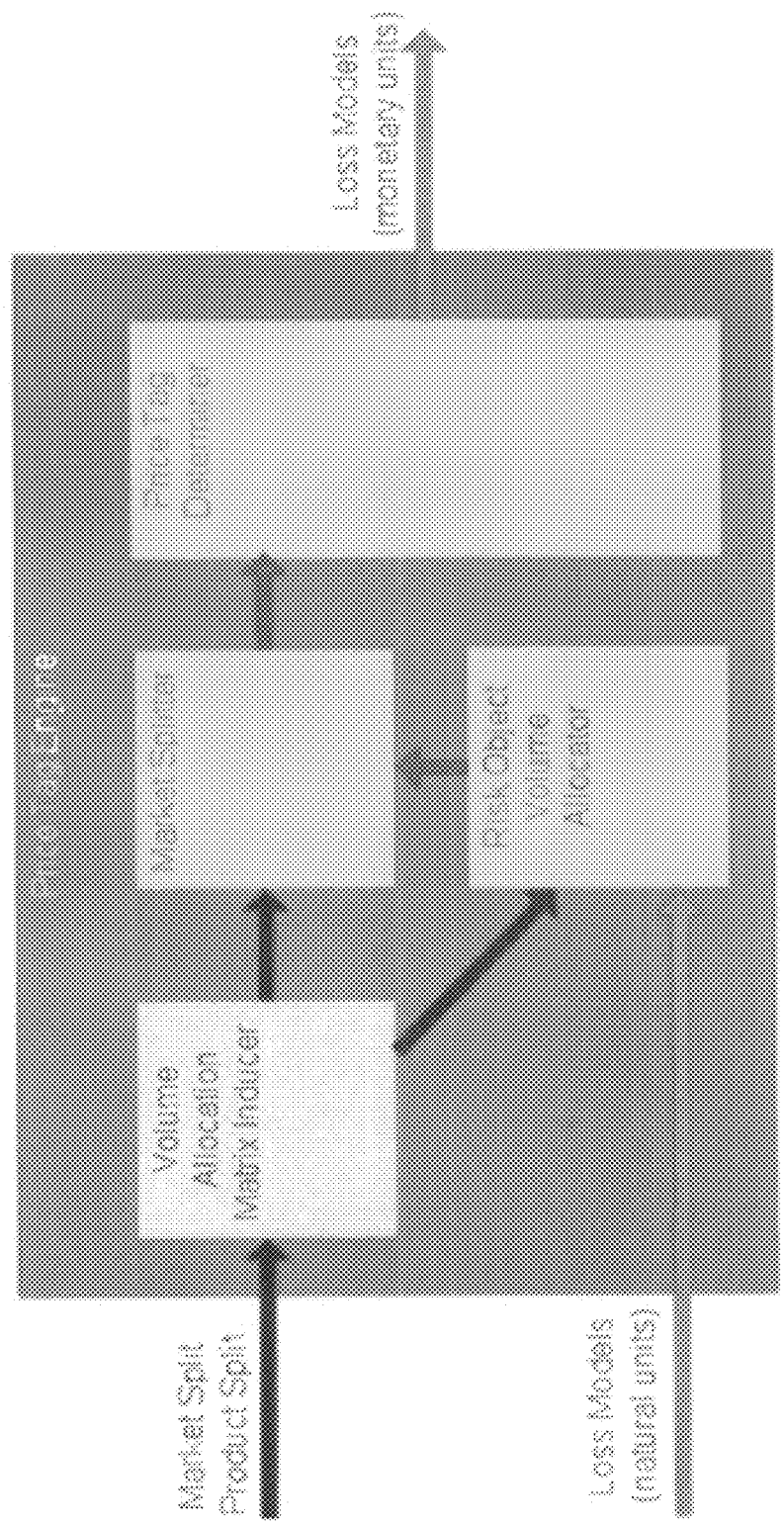
FIG. 7 shows a block diagram illustrating schematically an exemplary structure of the price tag engine 132. The diagram illustrates the modules containing appropriate functional components, whereas the modules mirror the modeled operational realization.

According to FIG. 5, the price tag engine 132 can be assigned to the following conceptual objects: How much does the consequence of the potential loss cost? and What is the exposure to the consequence of the potential loss? It comprises conversion means for converting the severity of the scenario loss models from natural units to monetary units by using liability risk drivers. FIG. 7 shows schematically a possible realization of the structure of the price tag engine 132 in more detail. The price tag engine 132 converts the severity of the scenario loss models from natural units to monetary units by means of using liability risk drivers 311-313. The price tag engine 132 generates the loss cost from the loss consequence, e.g. the loss cost of injured people from the number of injured people. Loss scenarios in natural severity units can be transformed into loss scenarios in monetary units using market values such as cost of living, wages, etc. The exposure (volume) is allocated to the loss scenarios by the price tag engine 132 according to the split over the underlying risks. Depending on exposure (volume) market split, more than one loss scenario may be generated for one input loss scenario by the price tag engine 132. The price tag engine 132 input and output parameters are (a) loss scenarios as described above with input parameters representing in natural units and output parameters representing in monetary units; (b) exposure risk drivers included in this module with exposure (volume) parameters by country and exposure (volume) parameters by underlying risk. The price tag engine 132 comprises at least the functional steps of: (i) The allocation of exposure (volume) to the different incoming loss scenarios according to the exposure split by underlying risk. As an example embodiment, the input parameters can be represented in natural units, whereas the output parameters can be represented in monetary units by the price tag engine 132. (ii) If incoming loss scenarios have exposure (volume) in different locations (e.g. countries), the price tag engine 132 creates identical loss scenarios for each location and allocates exposure (volume) accordingly. (iii) Determine the expected cost of each loss component of each loss scenario. In the example, the following liability risk drivers 311-313 (LRD) are identified and selected by the driver selector 15 to be used in the price tag engine 132.

| LRD Cluster | LRD Member | LRD Quantity |
|---|---|---|
| Economical Environment | Cost of Living | Values from Data Sources |
| Economical Environment | Cost of Living | Medical Cost |

In the example, the following additional liability risk drivers 311-313 are selected to make the price tag engine 132 work:

| LRD Cluster | LRD Member | LRD Quantity |
|---|---|---|
| Economical Environment | | Median Wage |
| Economical Environment | Pain and Suffering | |

The additional risk drivers 311-313 are combined with the cost of living components to a total expected loss cost for each loss component as specified with risk driver referenced as "Cost of Living". In this case, the economic environment represents the risk related to the economic environment in which a product is sold or manufactured. The cost of living liability risk driver, chosen by the control unit controller 10 as an representation of economical environment, compares a basket of non-durable and durable goods in different countries to allow benchmarking when paying claims. The measure parameter selected by the control unit controller 10 to measure this risk driver is a city based index calibrated e.g. at 100 for New York containing a basket of products corresponding to the average consumption of a European family. If a country cannot be measured, the control unit controller 10 can e.g. use the average of countries in the same zone. The lowest city index will be used in the case where a country can be represented by more than one city. As an embodiment variant, it can be assumed that the total cost loss amount of a certain loss component a comprises measure parameters such as e.g. pain and suffering, healthcare costs, and loss of earnings cost components plus additional cost components related to the cost of living risk driver. In order to establish a relationship between the cost of living measured by appropriate measure parameters and the effective cost components related to them, we look for factors scaling cost of living into cost components. Since cost of living is country-specific, in a first step it can be e.g. reasonable to assume that the scaling factors are country-independent. In this example, for each loss component α, the parameters can e.g. be connected based upon the following system of relations by means of the control unit controller 10:

$$\begin{cases} C_1^\alpha = \left(\sum_j w_j^\alpha \cdot c_{1,j}\right) + w_P^\alpha P_1 + w_E^\alpha E_1 + w_H^\alpha H_1 \\ C_2^\alpha = \left(\sum_j w_j^\alpha \cdot c_{2,j}\right) + w_P^\alpha P_2 + w_E^\alpha E_2 + w_H^\alpha H_2 \\ \ldots \\ C_l^\alpha = \left(\sum_j w_j^\alpha \cdot c_{l,j}\right) + w_P^\alpha P_1 + w_E^\alpha E_1 + w_H^\alpha H_1 \\ \ldots \\ C_n^\alpha = \left(\sum_j w_j^\alpha \cdot c_{n,j}\right) + w_P^\alpha P_n + w_E^\alpha E_n + w_H^\alpha H_n \end{cases}$$

whereas α=loss component (reversible/minor injury, disability/irreversible injury, death), $C_l^\alpha$=total costs for loss component α in country l (l=1, 2, ..., n), $C_{l,j}$=cost of the group of goods j (j=1, 2, ..., m) in country l, $P_l$=pain and suffering costs in country l, $E_l$=loss of earning costs in country l, and $H_l$=healthcare costs in country l. The set of scaling factors $w^\alpha$ for each loss component α is determined by solving the system of relations). Total costs $C_l^\alpha$ per loss component α and country l are provided by the claims department. The costs $c_{l,j}$ for each group of goods j and country l representative of the cost of living can be extracted from appropriate data samples. Costs for pain and suffering, healthcare, and loss of earnings per country l can be derived e.g. from data available in the prior art. FIG. 7 shows an example of how the price tag engine 132 can be broken down e.g. into the functional components "volume allocation matrix inducer", "market splitter", "risk object volume allocator" and "price tag determiner". The components are interacting based upon the measure parameters. It is clear that in order to realize the volume allocation matrix inducer, an exposure (volume) split from the already known information data is needed. The functional components are not independent in the price tag engine 132. The sequence cannot simply be altered. The market splitter needs the exposure (volume) allocated to the incoming loss scenarios based on risk object/activity split. The price tag determiner needs a location in order to determine the price of a loss consequence.

For the realization of the risk object volume allocator according to FIG. 7, the exposure (volume) is distributed over the loss scenarios according to volume breakdown by risk object/activity. Any scenarios sharing the risk object/activity are given the full amount allocated to the risk object/activity. The allocation is based upon the relation:

$$V_{ik} = V p_i \nabla V k$$

whereas V is the total exposure (volume), $V_{ik}$ is the volume allocated to incoming scenario ik, $p_j$ is the percentage of volume by risk object/activity i, i is the risk object/activity, and k is the type of affected party.

For the realization of the market splitter according to FIG. 7, the location of each loss scenario is determined using the volume location breakdown. If loss scenarios have exposure (volume) in different locations (countries), identical loss scenarios for each location are created, and the exposure (volume) is distributed accordingly. The determination by means of the market splitter is based upon the relation:

$$V_{ikl} = V_{ik} p_{il}$$

whereas $V_{ik}$ is the volume allocated to incoming scenario ik, $p_i$ is the percentage of the volume allocated to risk object/activity i by location l, $V_{ikl}$ is the volume allocated to outgoing scenario ikl, and l is the location.

In one embodiment variant, the frequency generation framework sets the frequency $\lambda_{ikl,\lambda}$ of a potential loss associated with a scenario ikl,λ (i: cause of potential loss, kl: effect of potential loss, occurring in location λ) as:

$$\lambda_{ikl,\lambda} = f_{ikl} \frac{R_{i\lambda,l}}{R_0},$$

where $R_{i\lambda,l} = RP_i p_{i\lambda;l}$ was the revenue by product/activity i earned (in case of l equal products) or produced (in case of l equal premises), $f_{ikl} = F_i a_{i,kl}$ was the frequency of scenario ikl per unit of reference volume in industry segment i. The variables used are: R total revenue, $p_i$ exposure (volume) split by industry segment i, and $p_{i\lambda;l}$ exposure (volume) split in industry segment i by location (country) λ for affected party l (products or premises). The further parameters used are: $F_i$ base frequency, i.e. the number of potential events per year and unit of reference volume in industry segment i, $a_{i,kl}$ assignment percentage of effect kl to cause i, i.e. the fraction of potential events with effect kl in all potential events with cause i, and $R_0$ reference revenue (e.g. 100 million Euros/year). This generation framework in the liability risk driver system implies a linear dependence between the company turnover (or revenue) and the loss frequency.

Note, however, that the measured and observed frequency of products- and general-liability losses is subproportional to the revenue (turnover). Therefore, in a preferred embodiment variant, it can be realized to follow a square root with a slowly changing prefactor:

$$F \propto \ln^2(R) R^{0.5},$$

where F is the loss frequency, and b and β are empirical constants valid for revenues e.g. between 1 million Euros to 1 billion Euros. To satisfy this requirement by means of the liability risk driver system, the frequency $\lambda_{iklm,\lambda}$ of a potential loss associated with the scenario iklm (il: cause of potential loss, km: effect of potential loss) occurring in location λ is:

$$\lambda_{iklm,\lambda} = f_{iklm} \phi_{i\lambda;l},$$

where $f_{ilkm} = F_{il} a_{il,km}$ is the frequency of all scenarios ilkm for one unit of liability risk driver volume, $\phi_{i\lambda;l} = \Phi p_i p_{i\lambda;l}$ is the revenue-split-dependent volume factor, $\Phi = a\ln^\beta(R_{log}\, v)v^b$ size correction for relative volume v, and $$a = \frac{1}{\ln^\beta(R_{log})}$$

is a prefactor. The variables used are: V relative volume (the liability risk driver volume V measured in liability risk driver units, $p_i$ exposure (volume) split by industry segment i, and $p_{i\lambda;l}$ exposure (volume) split in industry segment i by location (country) λ for affected party l (products or premises). The further parameters used are: $F_{il}$ base frequency, i.e. the number of potential events per year and unit of reference volume in industry segment i for affected party l, $a_{il,km}$ assignment percentage of effect km to cause il, i.e. the fraction of potential events with effect km in all potential events with cause il, b empirical revenue power (e.g. 0.5), β empirical log power (e.g. 2), and $R_{log}$ log coefficient (e.g. $10^8$). For the generation of the relative volume v, the following parameters can be used: $R_0$ revenue constant (e.g. 100 million Euros/year), and $r_\lambda(t)$ relative reference revenue for location (country) λ at time (year) t.

For the realization of the price tag determiner according to FIG. 7, the expected cost of each loss component is determined for each outgoing loss scenario using e.g. the above-mentioned risk driver 311-313 referenced as Cost of Living. Therefore the total expected cost $C_l^\alpha$ of loss component α in location l is determined using risk driver Cost of Living. It is used to convert the mean scenario loss consequence component to a mean scenario loss severity component. The determination by means of the price tag determiner is based upon the relation:

$$S_{ikl}^\alpha = C_l^\alpha s_{ikl}^\alpha$$

whereas $C_l^\alpha$ is the expected cost of α one natural unit of loss component α in location l, $s_{ikl}^\alpha$ is the mean loss consequence component α of outgoing scenario ikl (natural units), and $S_{ikl}^\alpha$ is the mean loss severity component α of outgoing scenario ikl (monetary units). Note that the above relation holds for any severity distribution but implies the expected cost $C_l^\alpha$ to be certain (all moments higher than the mean are zero). As an embodiment variant, the natural units of the property damage and financial loss components can e.g. be tied to the natural units of the bodily injury components by the expected loss cost. Therefore the total expected cost $C_l^\alpha$ of all natural property damage and financial loss components α can be defined by (weights are unweighted average percentages of number of affected people over all scenarios) for this example, giving e.g. a relation:

$$C_l^\alpha = 0.07 C_l^{Death} + 0.87 C_l^{Injury} + 0.06 C_l^{Disability}$$

However, since this is bound to disappear, the relation is set in a preferred embodiment variant to $$C_{PE,\lambda} = 0.05 C_{Death,\lambda} + 0.88 C_{Injury,\lambda} + 0.07 C_{Disablity,\lambda}$$

The collected answers to the scenario questionnaires are kept as it is, but before consolidating the answers, all answers given in monetary figures are divided by the monetary amounts corresponding to the monetary value of a defined quantity of the considered category of affected goods in the market where the answer has been given.

Figure 8:
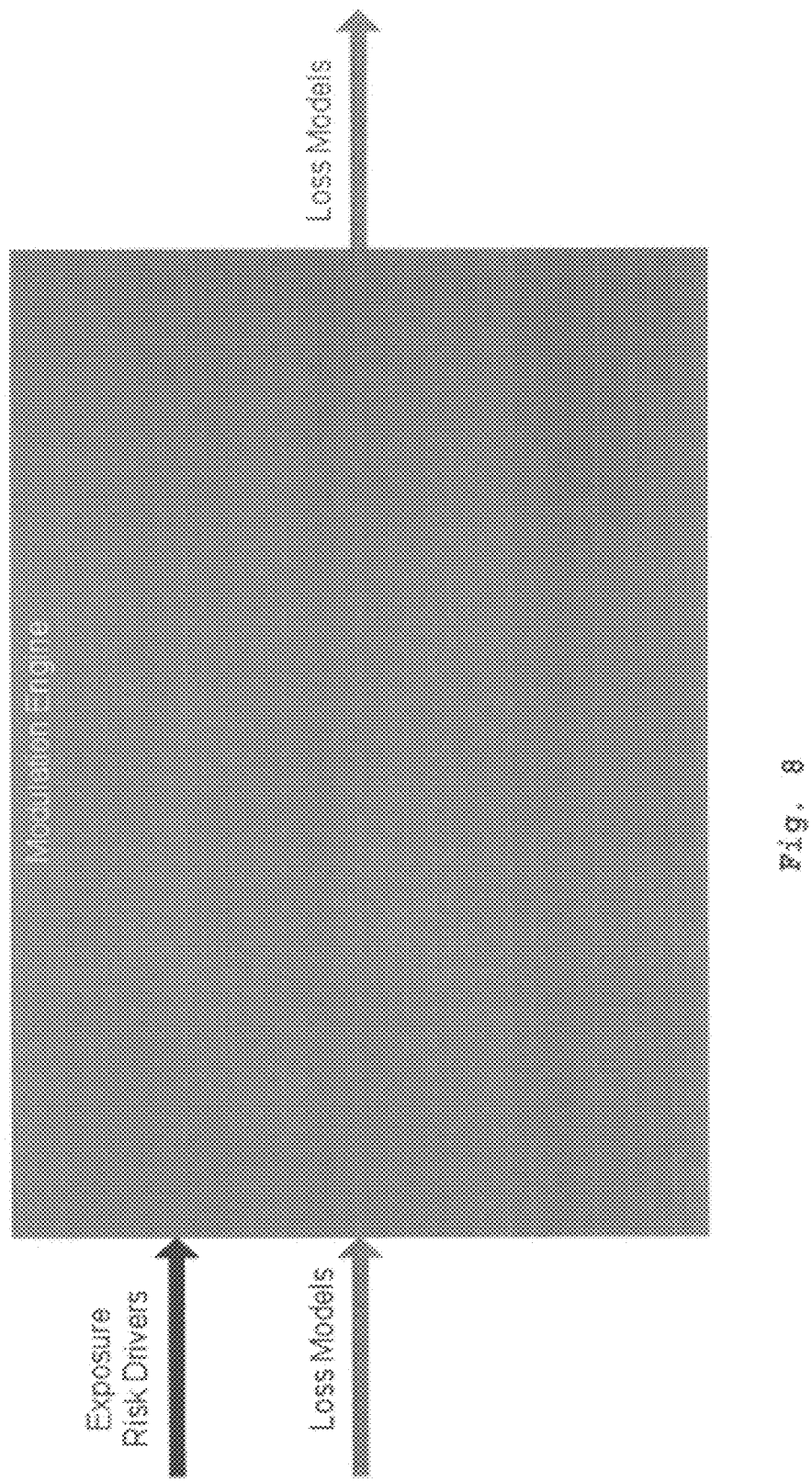
FIG. 8 shows a block diagram illustrating schematically an exemplary structure of the modulation engine 133. The diagram illustrates the modules containing appropriate functional components, whereas the modules mirror the modeled operational realization.

According to FIG. 5, the modulation engine 133 can be assigned to the conceptual objects (a) Which factors related to the insured influence a loss frequency or severity?, and (b) Which factors related to the economic, legal or societal environment influence a loss frequency or severity? FIG. 8 shows schematically a possible realization of the modulation engine 133 with the corresponding input and output parameters. The modulation engine 133 is realized to alter (modulate) the loss scenario frequency and/or severity components according to the influence of liability risk drivers 311-313. The input and output parameters of the modulation engine 133 are: (a) The loss scenarios. Both input and output loss scenarios can be represented in monetary units; (b) Exposure risk drivers comprised by the modulation engine 133 are e.g. insured properties: turnover by employee and insured portfolio as e.g. nanotechnology; and (c) Other risk drivers comprised by the modulation engine 133. As mentioned, the modulation engine 133 alters the loss scenario frequency and/or severity components according to the influence of liability risk drivers 311-313.

The way risk drivers 311-313 influence the loss frequency or severity in the modulation engine 133 requires the risk drivers 311-313 in the modulation engine 133 to be handled as intensive quantities. In one embodiment variant, with increasing level of knowledge about the risk driver 311-313 influence, some of the risk drivers 311-313 in the modulation engine 133 might be moved to the scenario generator 131. For example, the following liability risk drivers 311-313 (LRD)

might be selected by the driver selector 15 for use in the modulation engine 133 during operation. Note that the measure parameters traced by the system should be measurable.

| LRD Cluster | LRD Member | LRD Quantity |
|---|---|---|
| Legal Practice/ Environment | Frequency of Class Actions | Plaintiff group eligibility, recent law updates, business eligibility, contingent fees |
| Legal Practice/ Environment | Types of Liability (e.g. strict, negligence) | Percentage of turnover realized in business to business sales |
| Laws/Regulations | Number of Consumer Protection Laws | Data table |
| Risk Mitigation | Loss Prevention | Nine sub-factors representing aspects of insured's risk mitigation measures |
| Insured Operations | Human Factor | Turnover by employee |
| New Hazards | Nanotechnology | Innovation factor |

The driver selector 15 selects the risk drivers 311-313 according to the measure parameters. In the following, the abovementioned risk drivers 311-313 selected for the modulation engine 133 by the driver selector 15 are discussed. The risk driver 311-313 referenced as "frequency of class action" risk driver is assigned to whether a legal system allows mass tort litigation through a class action system or not. It reflects a risk environment related to the region/country. The quantity traced and selected to measure this risk driver 311-313 is in this embodiment example a combination of 4 (four) sub-factors, each of which represents one aspect of the legal system in relation to class actions. The measure parameter is region/country-specific and is the result of a legal analysis of the four sub-factors: (1) plaintiff group eligibility (indicates whether class actions are allowed in the country or not), (2) recent law up-dates (indicates the trend in legislation/litigation in the country), (3) business eligibility (indicates whether class action litigation can apply to all areas or is limited to certain businesses), and contingent fees (indicates whether the lawyer remuneration system is an incentive for more class actions). Each sub-factor can be additionally adapted to consider further needs or attributes, e.g. set to the value 0.9 (favorable, e.g. for 10% risk discount), 1 (neutral, no discount or loading), 1.11 (adverse, 11% risk increase) depending on the answer to the question. This makes it possible to achieve a balance between discounts and loadings (0.9×1.11=1 while 0.9×1.1=0.99). The sub-factor a. can e.g. be set to the power of 3 to reflect the relative importance of this sub-factor compared to the others. The sub-factor b. (trend) e.g. cannot be favorable when sub-factor a. is already on favorable. The other sub-factors of the example are independent from a. and b. and can take the three values. The sub-factors are multiplied by one another to obtain an overall class action factor (CAF). The control unit controller 10 always traces for measure parameters to adapt the values and sub-factors to make them even more objectively measurable and comparable. This is not possible with the prior art systems. The following table shows an example of the impact parameters of the "frequency of class action" risk driver 311-313 on loss frequency and severity for the various loss components (legend: 3=strong impact; 2=medium impact; 1=weak impact).

Figure 24:
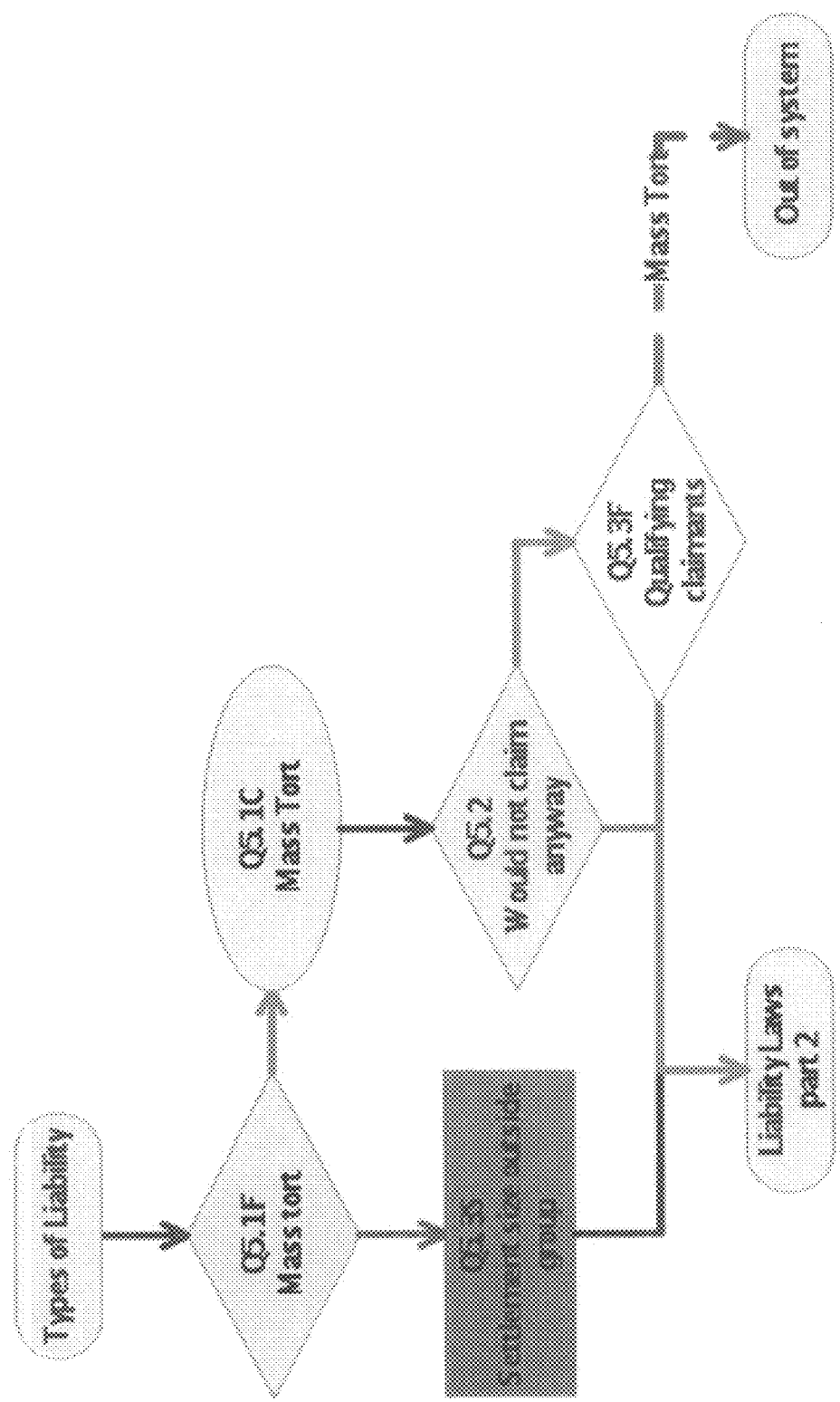
FIGS. 24 and 25 show a preferred embodiment variant of the active and inactive risk driver Likelihood of Mass Litigation by the path diagram.

A preferred embodiment variant to the above-described example is illustrated by the path diagram of the active risk driver Likelihood of Mass Litigation, as given by FIG. 24.

Figure 25:
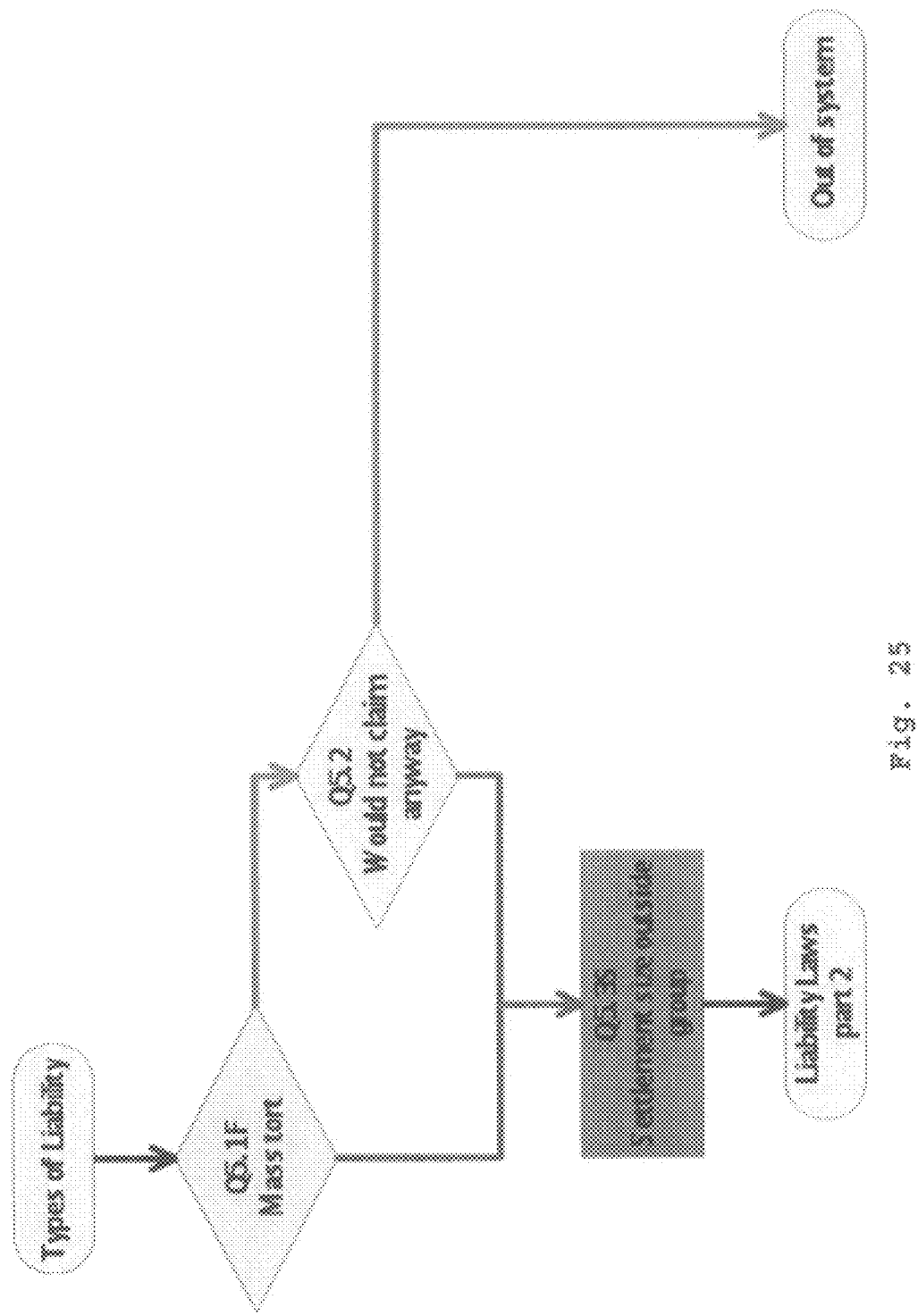

FIG. 25 shows a further path diagram illustrating the inactive risk driver Likelihood of Mass Litigation.

| | | Product Liability | | General Liability | |
|---|---|---|---|---|---|
| | | Freq. | Sev. | Freq. | Sev. |
| Frequency of class actions | 1. Reversible/Minor Injury | 1.5 | 3.0 | 1.1 | 2.7 |
| | 2. Disability/Irreversible Injury | 1.5 | 3.0 | 1.1 | 2.7 |
| | 3. Death | 1.5 | 3.0 | 1.1 | 2.7 |
| | 4. Property Damage | 1.2 | 2.3 | 1.0 | 2.3 |
| | 5. Business Interruption | 1.2 | 2.3 | 1.0 | 2.3 |

The impact on frequency and severity is simply the class action factor magnified or diminished according to the impact table above. The risk driver 311-313 is based upon the relation:

$$\tilde{f}_i = f_i \cdot (CA_k)^{\chi_{R,A,G}}$$

$$\tilde{s}_{i,j} = s_{i,j} \cdot (CA_k)^{\chi_{R,A,G}}$$

whereas $CA_k$ is the class action factor for the considered country k, $f_i$ is the frequency of scenario loss model i, $s_{i,j}$ is the severity of loss component j, and $\chi_{R,A,G}$ is the influence exponent on the various loss components (strong, medium, weak impact). The values for $\chi_{R,A,G}$ are empirical values to magnify or diminish the impact on the loss components. As an embodiment variant, e.g. $\chi_{R,A,G}=2$ for strong, $\chi_{R,A,G}=1$ for medium, and $\chi_{R,A,G}=0.5$ for weak. These values can e.g. be used for a voting procedure. In another embodiment variant, the values can be set to $\chi_{R,A,G}=1/3$ for strong, $\chi_{R,A,G}=2/3$ for medium, and $\chi_{R,A,G}=1$.

The next risk driver 311-313 is referenced herein as "type of liability" risk driver according to the above table. The type of this liability risk driver 311-313 can e.g. refer to the legal mechanisms in causation theory (strict or negligence). Strict liability means that the claimant only needs to prove the damage and the causation to establish liability. (S)he does not have to prove that the defendant was negligent. The defendant in turn has limited discharge possibilities. There is often a cap to strict liability (example: Pharmaceuticals in Germany, road accidents, pet owners, . . . ). Negligence means that the claimant has to prove the damage, the causation and the negligence of the plaintiff (or his unlawfulness). The defendant is not per se liable. There is almost never a cap to this liability (example: premises liability . . . ). In this example, the measure parameter chosen to measure the "type of liability" risk driver 311-313 is the percentage of the turnover realized in business to business (B2B). This quantity may under certain circumstances not represent accurately the strict liability/negligence aspect. The cases identified where this matter is not the case are: (1) retail/wholesale (in this case the products sold are all B2C but the insured can exculpate himself on the grounds that he did not manufacture the products himself). (2) final products sold to wholesale (in this case the products sold are all B2B but the insured can be sued directly). Thus, the quantity source for the input measure parameter is e.g. (a) the "percentage of turnover" realized in business to business (B2B) retail, or the corresponding opposite parameter "percentage of turnover" realized in business to customer (B2C) retail. (b) Percentage of intermediaries respectively direct recourse. Action on loss model components are the output of this risk driver 311-313. The following table shows the impact of the risk driver 311-313 "type of liability" on loss frequency and severity for the various loss components (legend: 3=impact; 2=impact; 1=impact).

|  |  | Product Liability | | General Liability | |
|---|---|---|---|---|---|
|  |  | Freq | Sev | Freq | Sev |
| Types of liability (e.g. strict liability, negligence) | 1. Reversible/Minor Injury | 2.9 | 2.2 | 2.8 | 2.1 |
|  | 2. Disability/Irreversible Injury | 2.5 | 2.1 | 2.5 | 2.1 |
|  | 3. Death | 2.4 | 2.1 | 2.3 | 2.0 |
|  | 4. Property Damage | 2.3 | 2.1 | 2.3 | 2.1 |
|  | 5. Business Interruption | 2.2 | 2.1 | 2.2 | 2.1 |

Figure 26:
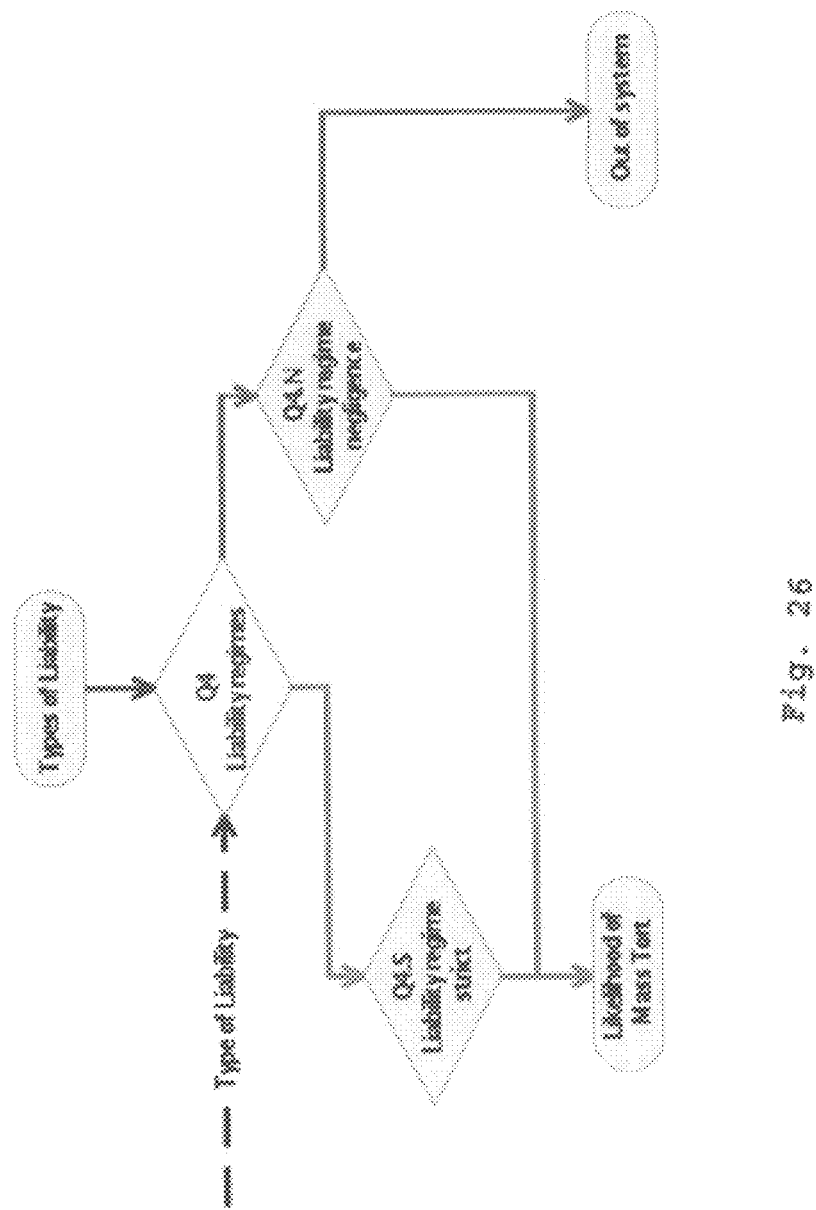
FIGS. 26 and 27 show a preferred embodiment variant of the active and inactive risk driver Types of Liability by the path diagram.
Figure 27:
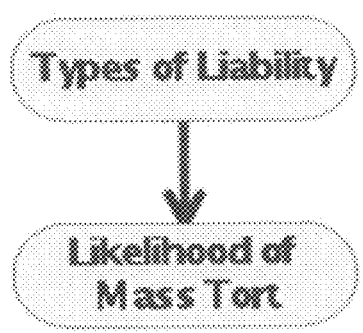

In one embodiment variant, the "type of liability" risk driver 311-313 is based upon the relation b2b=100%–b2c and $$f_i = f_i \cdot [b2b \cdot (1-dr) \cdot d_{b2b} + b2b \cdot dr \cdot l_{b2c} + (1-b2b) \cdot Int \cdot d_{b2b} + (1-b2b) \cdot (1-Int) \cdot l_{b2c}]^{\chi_{R,A,G}}$$

$$s_{i,j} = s_{i,j} \cdot [b2b \cdot (1-dr) \cdot d_{b2b} + b2b \cdot dr \cdot l_{b2c} + (1-b2b) \cdot Int \cdot d_{b2b} + (1-b2b) \cdot (1-Int) \cdot l_{b2c}]^{\chi_{R,A,G}}$$

whereas $f_i$ is the frequency of scenario loss model i, $s_{i,j}$ is the severity of loss component j, $d_{b2b}$ is the discount for b2b part of the business, $l_{b2c}$ is the loading for b2c part of the business, $b2b \in [0;100\%]$ is the turnover percentage of b2b, $b2c \in [0;100\%]$ is the turnover percentage of b2c, $dr \in [0; 100\%]$ is the percentage of direct recourse for b2b business, $Int \in [0;100\%]$ is the percentage of intermediaries for b2c business, and $\chi_{R,A,G}$ is the influence exponent on the various loss components (strong, medium, weak impact). However, a preferred embodiment variant to the above-described embodiment variant is illustrated by the path diagram of the active risk driver Types of Liability as illustrated in FIG. 26. FIG. 27 shows a further path diagram illustrating the inactive risk driver Types of Liability.

Figure 28:
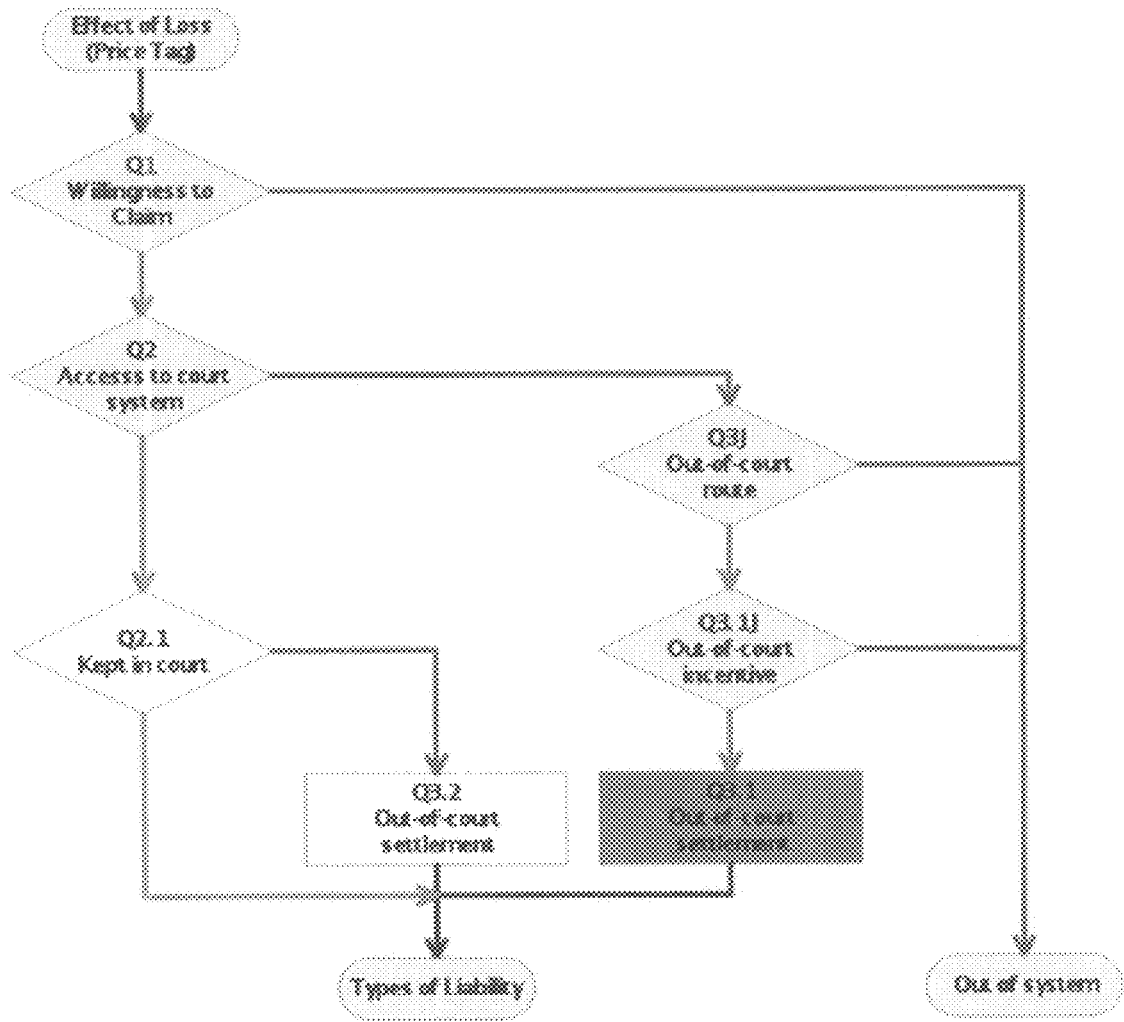
FIGS. 28 and 29 show a first preferred embodiment variant of the active and inactive risk driver Liability Laws by the path diagram.
Figure 29:
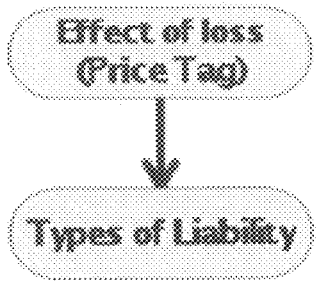
Figure 30:
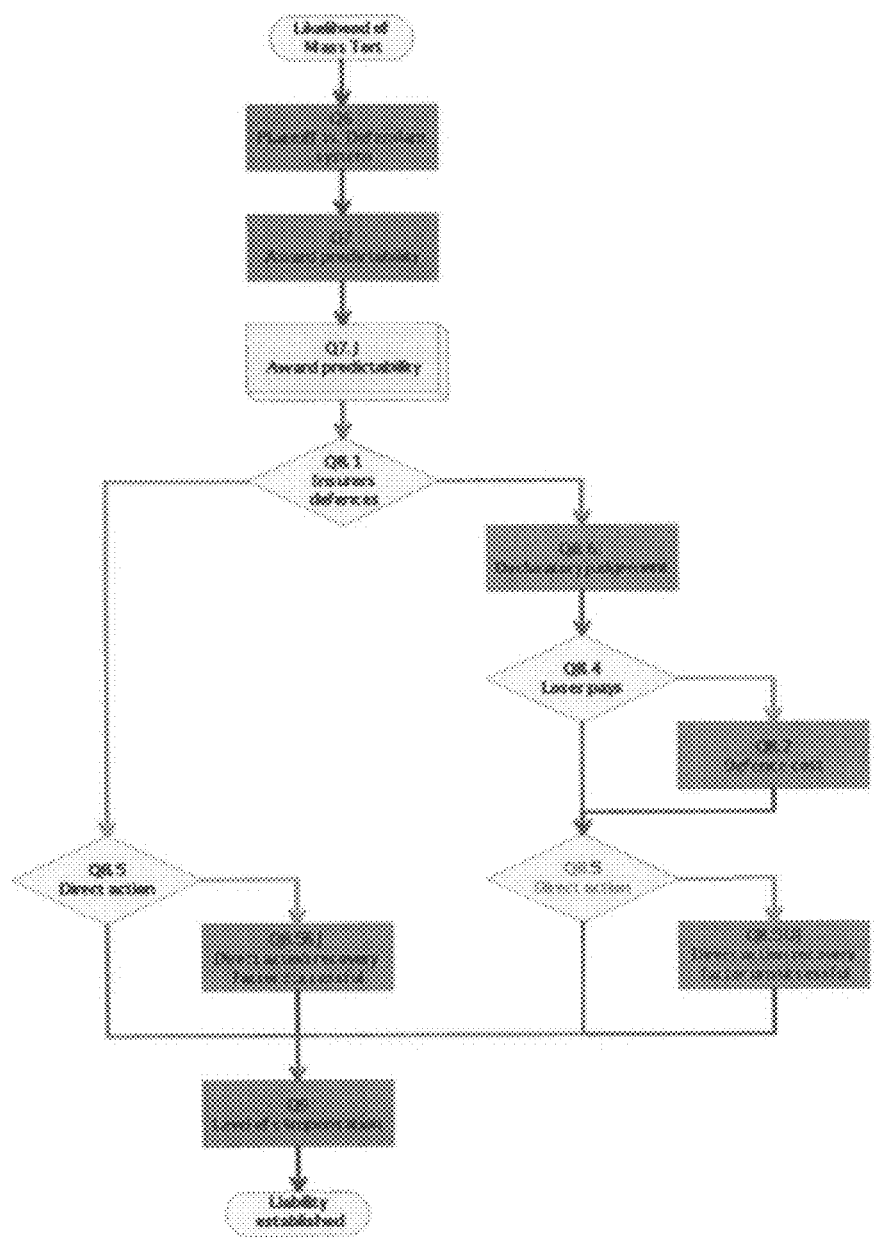
FIGS. 30 and 31 show a second preferred embodiment variant of the active and inactive risk driver Liability Laws by the path diagram.
Figure 31:
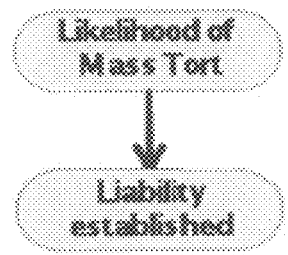

The third selected risk driver 311-313 for the modulation engine 133 is referenced as "consumer protection laws" risk driver 311-313. As an embodiment variant of this example risk driver, 'Laws/Regulations' are the legal grounds on which liability arises as a liability risk driver 311-313 (LRD) cluster and as opposed to the LRD cluster 'Legal practice' which is the way laws are applied in a country (i.e. the circumstances applied in settling a claim). The liability risk driver "consumer protection laws" represents the extent to which a legal system protects the consumer. The mere number of consumer protection laws was considered not to be representative of a legal system because it does not express anything concerning the content of the law, which in turn is much more relevant. The measure parameter chosen to measure this risk driver 311-313 is a multiplying factor per country based on specified rules. The implemented rules make it possible to measure the values and create a bunch of objective and measurable criteria that will be combined to produce an adjusted quantity. As input quantity source, i.e. the source of the selected measure parameters, class action factors are measured. However, there are two preferred embodiment variants to the embodiment variant above. A first preferred embodiment variant to the above-described embodiment variant is illustrated by the path diagram of the active risk driver Liability Laws as given in FIG. 28. FIG. 29 shows a further path diagram of the inactive risk driver Liability Laws to this embodiment variant. A second preferred embodiment variant to the above-described embodiment variant is illustrated by the path diagram of the active risk driver Liability Laws as given in FIG. 30. FIG. 31 shows a further path diagram of the inactive risk driver Liability Laws to this embodiment variant.

The following table shows the impact of the risk driver "consumer protection law" 311-313 on loss frequency and severity for the various loss components (legend: 3=strong impact; 2=medium impact; 1=weak impact).

|  |  | Product Liability | | General Liability | |
|---|---|---|---|---|---|
|  |  | Freq | Sev | Freq | Sev |
| Number of consumer protection laws | 1. Reversible/Minor Injury | 2.9 | 2.4 | 2.1 | 1.5 |
|  | 2. Disability/Irreversible Injury | 2.6 | 2.4 | 1.8 | 1.5 |
|  | 3. Death | 2.4 | 2.3 | 1.6 | 1.4 |
|  | 4. Property Damage | 2.3 | 2.1 | 1.7 | 1.4 |
|  | 5. Business Interruption | 2.1 | 2.1 | 1.4 | 1.4 |

In the example, it can be assumed that the impact on frequency and severity is simply the country factor magnified or diminished according to the impact table above. The risk driver "consumer protection law" 311-313 generates the dependencies based upon the measure parameters as:

$$\tilde{f}_i = f_i \cdot (L_k)^{\chi_{R,A,G}}$$

$$\tilde{s}_{i,j} = s_{i,j} \cdot (L_k)^{\chi_{R,A,G}}$$

whereas $L_k$ is the law factor for the country k, $f_i$ is the frequency of scenario loss model l, $s_{i,j}$ is the severity of loss component j, and $\chi_{R,A,G}$ is the influence exponent on the various loss components (strong, medium, weak impact). For the measure parameters, the values for $\chi_{R,A,G}$ are empirical values to magnify or diminish the impact on the loss components. $\chi_{R,A,G}=2$ for strong, $\chi_{R,A,G}=1$ for medium, $\chi_{R,A,G}=0.5$ for weak.

The risk driver 311-313 referenced above as "loss prevention" defines which measures the insured has in place to reduce the frequency and severity of his third party liability claims. The measure parameter chosen by the driver selector 15 to measure this risk driver 311-313 is in this example a combination of 9 (nine) sub-factors, each of which represents one aspect of the insured's risk identification and mitigation measures. For example, each sub-factor can have the value 0.9 (10% risk discount), 1 (neutral), 1.11 (11% risk increase) depending on its assessment by the underwriter. The assessment is meant to be objective in so far as certain controls and/or processes need to be in place to qualify for a more favorable score. The sub-factors are multiplied by one another to obtain an overall loss prevention factor. Therefore the overall loss prevention factor can e.g. assume values in the range from $(0.9)^9=0.39$ to $(1.1)^9=2.56$ i.e. $L \in [0.39, 2.56]$. In the example, it is assumed that each of the nine sub-factors is equally weighted within the basket. The input parameters of the modulation engine 133 are in this case measured regarding the following sub-factors (1) Risk manager, (2) Business continuity management, (3) Recall plan (only for product), (4) Certification, (5) Contract screening, (6) Safety/Security training, (7) Complaints management, (8) Follow-up on incidents, and (9) Environment control, audits.

Actions on loss model components are the output of the risk driver 311-313. The following table shows the impact of the risk driver "loss prevention" 311-313 on loss frequency and severity for the various loss components selected by the driver selector 15 (legend: 3=strong impact; 2=medium impact; 1=weak impact).

|  |  | Product Liability | | General Liability | |
|---|---|---|---|---|---|
|  |  | Freq. | Sev. | Freq. | Sev. |
| Loss prevention | 1. Reversible/Minor Injury | 2.9 | 2.1 | 2.9 | 2.6 |
|  | 2. Disability/Irreversible Injury | 2.6 | 2.1 | 2.4 | 2.5 |
|  | 3. Death | 2.5 | 1.9 | 2.4 | 2.0 |
|  | 4. Property Damage | 2.5 | 2.1 | 2.7 | 2.3 |
|  | 5. Business Interruption | 2.4 | 1.6 | 2.5 | 2.3 |

In the example given, it can be assumed that the impact on frequency and severity is simply the prevention factor magnified or diminished according to the impact table above. The risk driver "loss prevention" 311-313 generates the dependencies based upon the measure parameters as:

$$\tilde{f}_i = f_i \cdot (L)^{\chi_{R,A,G}}$$

$$\tilde{s}_{i,k} = s_{i,j} \cdot (L)^{\chi_{R,A,G}}$$

whereas L is the loss prevention factor for the considered risk, $f_i$ is the frequency of the loss scenario i, $s_{i,j}$ is the severity of loss component j, and $\chi_{R,A,G}$ is the influence exponent on the various loss components (strong, medium, weak impact). The measure parameter values for $\chi_{R,A,G}$ are empirical values to magnify or diminish the impact on the loss components. As a preferred embodiment variant, the assumptions are set so that the frequency and the severity are simply multiplied by the prevention factor magnified or diminished according to the impact table. The pre-processing generation of the score is illustrated in the following embodiment example:

| Evaluation | Score | Score Definition |
|---|---|---|
| Tier 1 | | |
| Product Certification | Average | 3 | Score average can be reached if main certificates are in place. |
| Environment Certification | Good | 4 | Score good can be reached if all certificates (e.g. ISO 14001, EMAS or equivalent) are in place and more than one cycle since the first certification. |
| Intermediary result | | 3 | |
| Tier 2 | | | |
| Business continuity management | Yes | 1 | Updated contingency planning and emergency response plans are in place, approved and tested regularly. |
| Recall plan (only for product) | Yes | 1 | There is a recall plan with regular updates and trainings (e.g. mock-up recall). Products are traceable from the moment they leave the factory down to the final consumer. |
| Contract screening | Yes | 1 | Existence of standard contracts, centralized legal department, regular update of standards. |
| Safety/Security training | No | −1 | No systematic communication on safety/security and no corresponding programs are implemented. |
| Complaints management | n/a | 0 | Complaints handling; Statistical analysis of claims and avoidance strategy or procedures can be found. |
| Follow-up on incidents | Yes | 1 | All incidents, near-misses, losses, claims are investigated by root cause analysis. Prevention of further similar cases by implementation of new procedures, guidelines, standards and follow-up procedures. |
| Intermediary result | | 3 | |
| Overall result | | 4 | |

Figure 32:
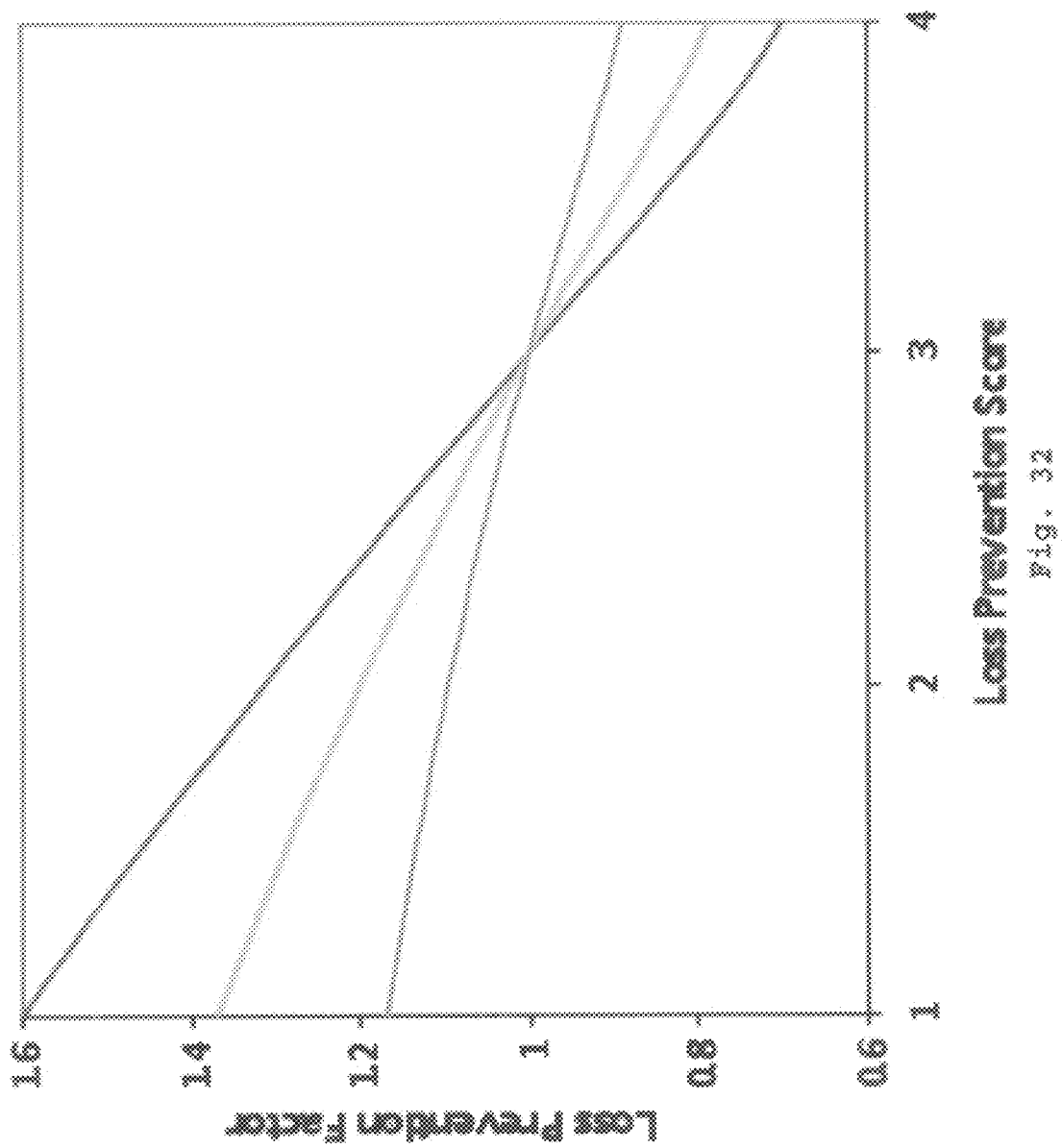
FIG. 32 shows a diagram illustrating the effect of the Loss Prevention score on frequency and severity (assuming $r_f$=0.7, $r_u=1.6$). The red, yellow and green curves represent the cases of strong, medium and weak impact.

FIG. 32 illustrates the effect of the Loss Prevention score on frequency and severity (assuming $r_l=0.7$, $r_u=1.6$). The red, yellow and green curves represent the cases of strong, medium, and weak impact (see Loss Prevention impact table above). The values of $r_l$ and $r_r$ are determined from the expert estimates on the maximum discount and loading on the expected loss as described in the parametrization document. The details on the quantification and generating relations can be given as $L_s$ is the loss prevention score for the considered risk before normalization (i.e. $\in [1;4]$), L is the loss prevention factor for the considered risk (i.e. $\in [r_l;r_u]$), $C^{PL}$ is the product certification score, $C^{GL}$ is the environment certification score, $C_n$, is the subscores (tier 2), $f_i$ is the frequency of scenario loss model l, $s_{i,j}$ is the severity of loss component j, l is the type of affected party of scenario loss model l, $r_l$ is the lower limit of the standard influence range on frequency and severity, $r_u$ is the upper limit of the standard influence range on frequency and severity, and $\chi_{R,A,G}$ is the influence exponent on the various loss components (strong, medium, weak impact). During the preconditioning phase, the loss prevention score LS can be generated from the appropriate certification score, $$L_S = 4 \quad \text{if } C^{(l)} = 4 \text{ and } \sum_n C_n \geq 3$$

$$L_S = 3 \quad \text{if } C^{(l)} \leq 3 \text{ and } \sum_n C_n \geq 3$$

$$L_S = \min(C^{(l)}, 3) \quad \text{else}$$

where C(I) is the appropriate main score, $$C^{(l)} = C^{PL} \text{ if } l = PL$$

$$C^{(l)} = C^{GL} \text{ if } l = GL$$

For the value generation process, L represents the loss prevention factor and is a function of the loss prevention score, $L_S \in [1;4]$.

$$L: [1;4] \rightarrow [r_l; r_u]$$

$$L_S \rightarrow L = 1 + \frac{r_l - r_u}{2} x + \frac{r_l + r_u - 2}{2} x^2$$

$$\text{where} \quad x = 1 - \frac{\ln(5 - L_S)}{\ln 2}$$

The function L is designed to have no effect on frequency and severity if the loss prevention score equals 3, and to satisfy the constraints on the value range, given by the parameters $r_l$ and $r_u$ in case of $\chi_{R,A,G}=1$. The effect on frequency and severity can be given by the following generation formula.

$$\tilde{f}_i = f_i \cdot (L)^{\chi_{R,A,G}}$$

$$\tilde{s}_{i,j} = s_{i,j} \cdot (L)^{\chi_{R,A,G}}$$

The risk driver 311-313 referenced above as "insured operations/human factor" reflects how much the operations are influenced by human beings (as opposed to machines). The measure parameter chosen by the control unit controller 10 to measure this risk driver 311-313 is the automation factor, which can be measured as turnover by employee. This measure parameter gives an indication of the level of automation in the product development process of the insured. In this example, the assumption is that average automation factors per industry are available. With this assumption, the risk can be graded by the control unit controller 10 depending on the industry that was chosen and on where it is compared with its industry benchmark. As input quantity source for this risk driver, the number of employees and turnover are properties of the insured and are therefore selected by the system. Actions on loss model components are the output of the risk driver 311-311. The table below shows the impact of the risk driver "human factor" 311-313 on loss frequency and severity for the various loss components (legend: 3=strong impact; 2=medium impact; 1=weak impact).

| Risk Driver | Loss Category | F | S | F | S |
|---|---|---|---|---|---|
| Human Factor | 1. Reversible/Minor Injury | 2.7 | 2.5 | 2.7 | 2.6 |
| Human Factor | 2. Disability/Irreversible Injury | 2.7 | 2.4 | 2.8 | 2.5 |
| Human Factor | 3. Death | 2.7 | 2.3 | 2.8 | 2.4 |
| Human Factor | 4. Property Damage | 2.7 | 2.7 | 2.7 | 2.7 |
| Human Factor | 5. Business Interruption | 2.5 | 2.6 | 2.5 | 2.7 |

When the automation factor increases with respect to the average value for the specific industry segment, it is assumed in this embodiment variant that the degree of automation of the insured operating unit 30 is the same and less employees are doing the same amount of work. Therefore the control unit controller 10 assumes an increase in errors due to human factor and the human factor is >1. A further increase in the automation factor implies an increase of the automation and therefore a decrease in error due to human factor and the human factor is <1. In the same way, when the automation factor decreases with respect to the average value for the specific industry segment it can be assumed that the degree of automation of the insured operating unit 30 is the same and more employees are doing the same amount of work. Therefore, it is assumed that there is a decrease in errors due to human factor and the human factor is <1. A further decrease in the automation factor implies a decrease of the automation and therefore an increase in error due to human factor and the human factor is >1. The risk driver "insured operations/human factor" 311-313 generates the dependencies based upon the measure parameters as:

$$\tilde{f}_i = f_i \cdot H_k$$

$$\tilde{s}_{i,j} = s_{i,j} \cdot H_k$$

whereas t is the automation factor, $t_k$ is the industry-specific reference automation factor of industry segment k, $f_i$ is the frequency of scenario loss model i, and $s_{i,j}$ is the severity of loss component j. Further with $$H_k = \frac{1}{\left(\frac{t}{t_k - t_k d}\right)^{\beta_1}} \text{ and}$$

$$\beta_1 = h_{R,A,G} \pi \frac{(1-d)}{d} \text{ for } 0 < t < tk(1-d) \quad \text{(low values)}$$

$$H_k = 1 + h_{R,A,G} \cdot sen\left(\pi \frac{t - t_k}{t_k d}\right) \text{ for } tk(1-d) \leq t \leq tk(1+d) \quad \text{(mid values)}$$

$$H_k = \frac{1}{\left(\frac{t - t_k}{t_k d}\right)^{\beta_2}} \text{ and}$$

$$\beta_2 = h_{R,A,G} \pi \text{ for } t > tk(1+d) \quad \text{(high values)}$$

Figure 12:
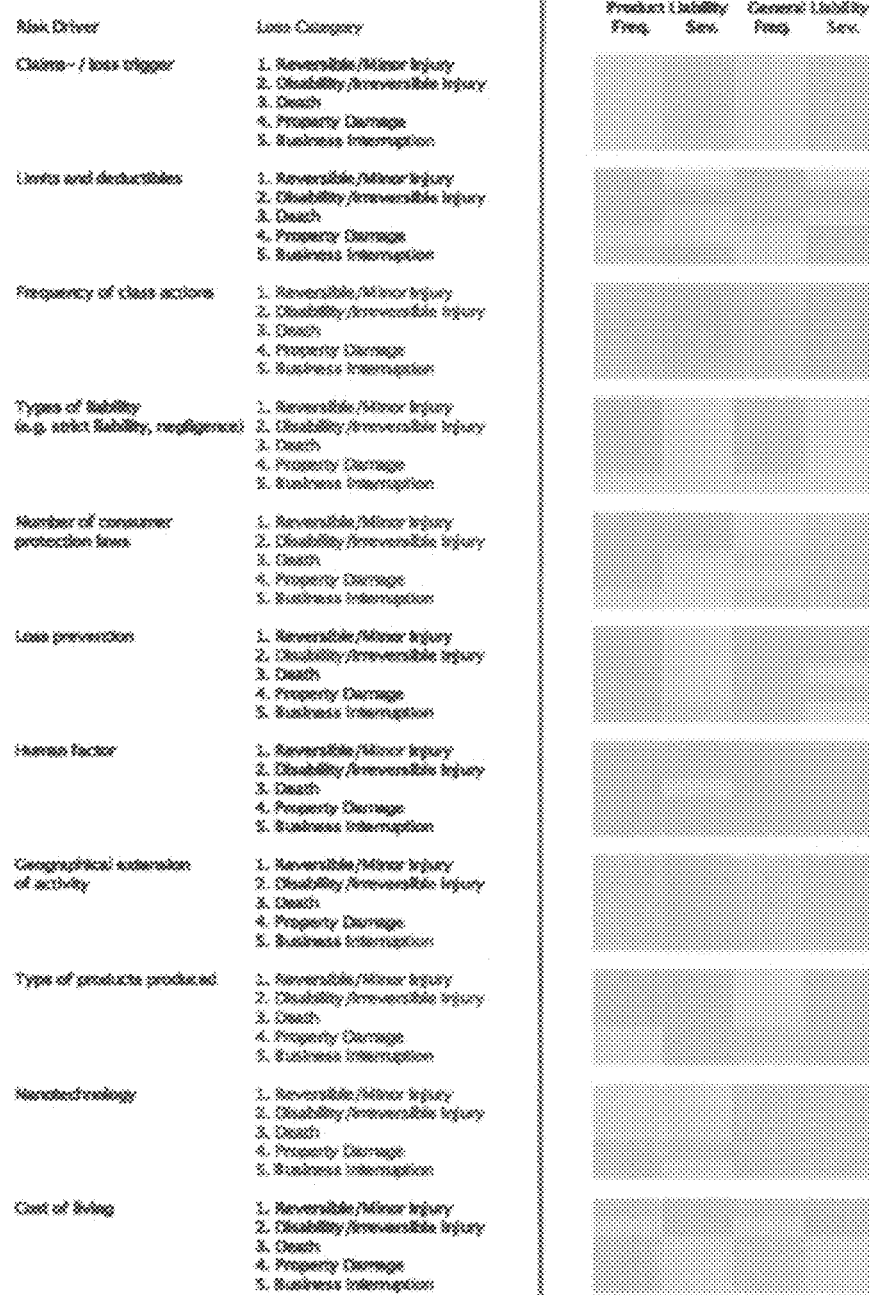
FIG. 12 shows a block diagram illustrating schematically another exemplary recognition of risk drivers and clustering of risk drivers analogous to FIG. 2. Clusters are prioritized by the system and a first quantification of the impact of the risk drivers is performed based on their detected loss frequency and severity. The first preliminary recognition is generated to give the impact on loss frequency and severity of the most important traceable risk drivers for a given set of loss types. The number of top risk drivers is set in this example to 11 by the system. This risk driver set is used in this case to start the dynamic adaption and/or optimization.
Figure 13:
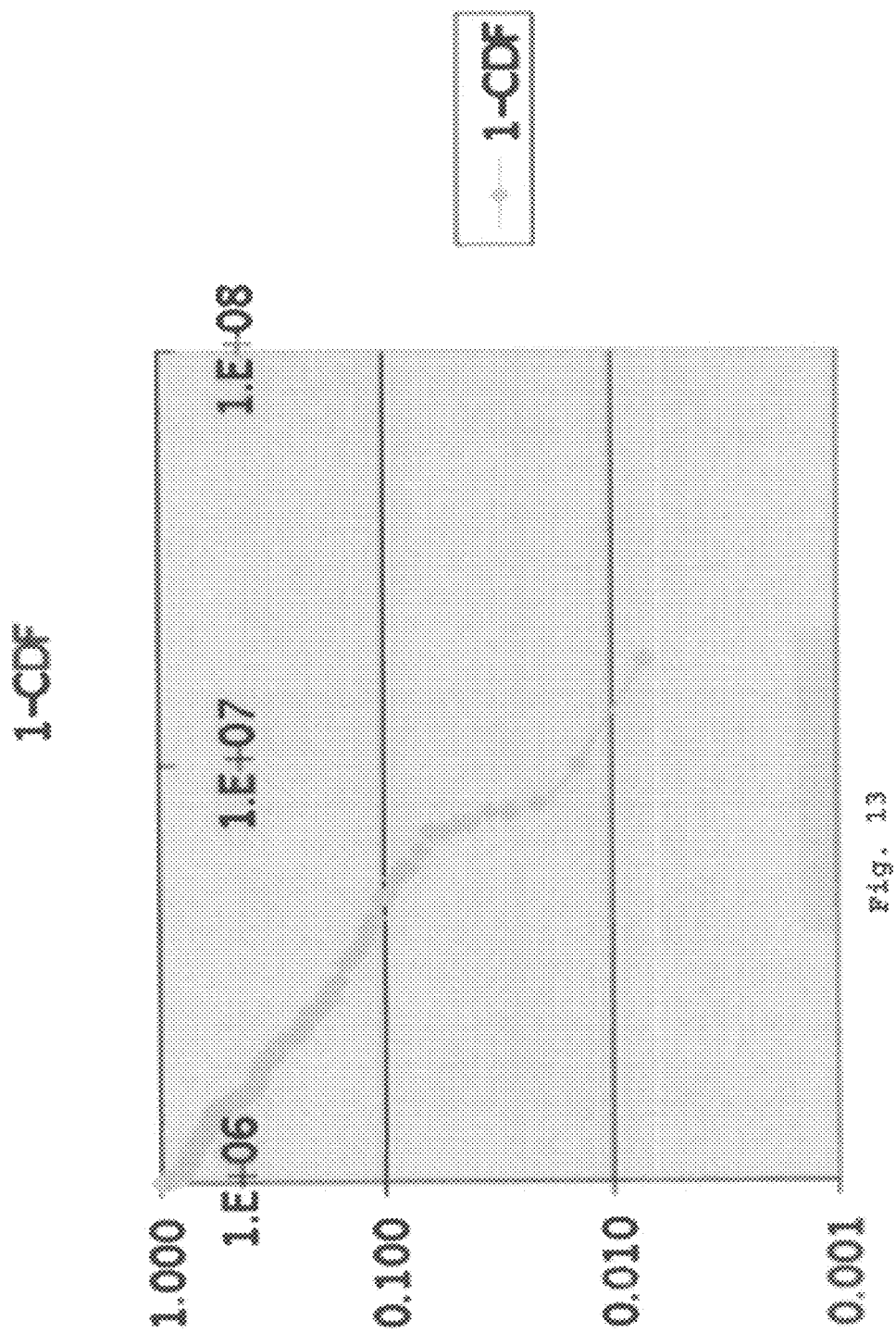
FIG. 13 shows a diagram illustrating schematically a loss severity distribution whereas the loss amount is shown along the x-axis versus 1—loss probability along the y-axis. For the severity distribution tail the Pareto distribution shows a linear behavior. The loss severity distribution can be used by the system to eliminate systematics within the loss history and/or loss data.

The relation used to quantify the human factor $H_k$ is shown in FIG. 12. Note that the function makes use of the two parameters d and $h_{R,A,G}$ with the following meaning: d=interval of values for the automation factor within which a discount >1 and <1 is given, respectively for greater and smaller values of the automation factor (i.e. in the interval $[t_k(1-d), t_k(1+d)]$). $h_{R,A,G}$=highest amount of discount given within the interval $[t_k(1-d), t_k(1+d)]$. We can preliminary assign $h_{R,A,G}$=20%, 10%, and 5% for red, amber and green. FIG. 12 shows a curve with $t_k$=1, d=20%, $h_{R,A,G}$=20% (i.e. red). The three colors represent $D_k(t)$ for the ranges 1), 2) and 3), i.e. for low, mid and high values of t.

Finally, the risk driver 311-313 referenced above as "new hazards/nanotechnology" represents the risk inherent to products based on new scientific developments for which some risks might have not yet materialized. Nanotechnology was chosen herein as an example for new hazards and how the control unit controller 10 measures it by means of the measure parameters. The measure parameter selected by the control unit controller 10 to measure this risk driver 311-313 is the innovation factor. The innovation factor can be given as investment amount divided by turnover. The measure of the innovation factor goes beyond the measure of the nanotechnology risk driver 311-313 per se and it is more a measure of the new hazards cluster. Further granularity for specific hazards in the quantification is reached during operation of the control unit controller 10, by triggering for additional measure parameters and more exact measuring of available measure parameters such as, e.g., investment in nanotechnology amount divided by turnover are available. As quantity source for the input measure parameters, the control unit controller 10 selects in this embodiment variant the investment amount and turnover as properties of the insured operating unit 30. In the embodiment variant, the average on all industries of the innovation factor is e.g. 4% (expected value). In a first step the control unit controller 10 can generate the impact on loss frequency and severity with respect to this reference point. However, certain industries such as pharmaceuticals, chemicals and IT invest more money in innovation. These are those with a higher technology risk. Therefore, in a second step, the 4% average value can be corrected for each industry segment level k according to, e.g., a correction factor $c_k$. The impact on loss frequency and severity should be re-modeled making use of the increased information at the higher degree of granularity. In this embodiment variant, it is simply assumed that all $c_k$=1 for all k.

Actions on loss model components are the output of the risk driver 311-313. The table below shows the impact of the risk driver "nanotechnology" 311-313 on loss frequency and severity for the various loss components (legend: 3=strong impact; 2=medium impact; 1=weak impact).

|  |  | PL | | GL | |
| --- | --- | --- | --- | --- | --- |
| Risk Driver | Loss Component | Freq | Sev | Freq | Sev |
| Nano- technology | 1. Reversible/Minor Injury | 2.1 | 2.1 | 1.6 | 1.6 |
|  | 2. Disability/Irreversible Injury | 2.1 | 2.1 | 1.6 | 1.6 |
|  | 3. Death | 2.1 | 2.1 | 1.6 | 1.6 |
|  | 4. Property Damage | 1.6 | 1.6 | 1.6 | 1.6 |
|  | 5. Business Interruption | 1.6 | 1.6 | 1.6 | 1.6 |

In the embodiment variant, an exponential dependency of the frequency and of the severity on the innovation factor is assumed. Dependency is assumed to be the same. Parameters of the exponential function can e.g. be determined assuming no impact for values of innovation factor <=4% and an increase of 50% in loss frequency and severity for innovation factor=30% (the latter value is regarded as an upper limit for the innovation factor, even if there is no limit for the possible values that the innovation factor may assume).

Figure 14:
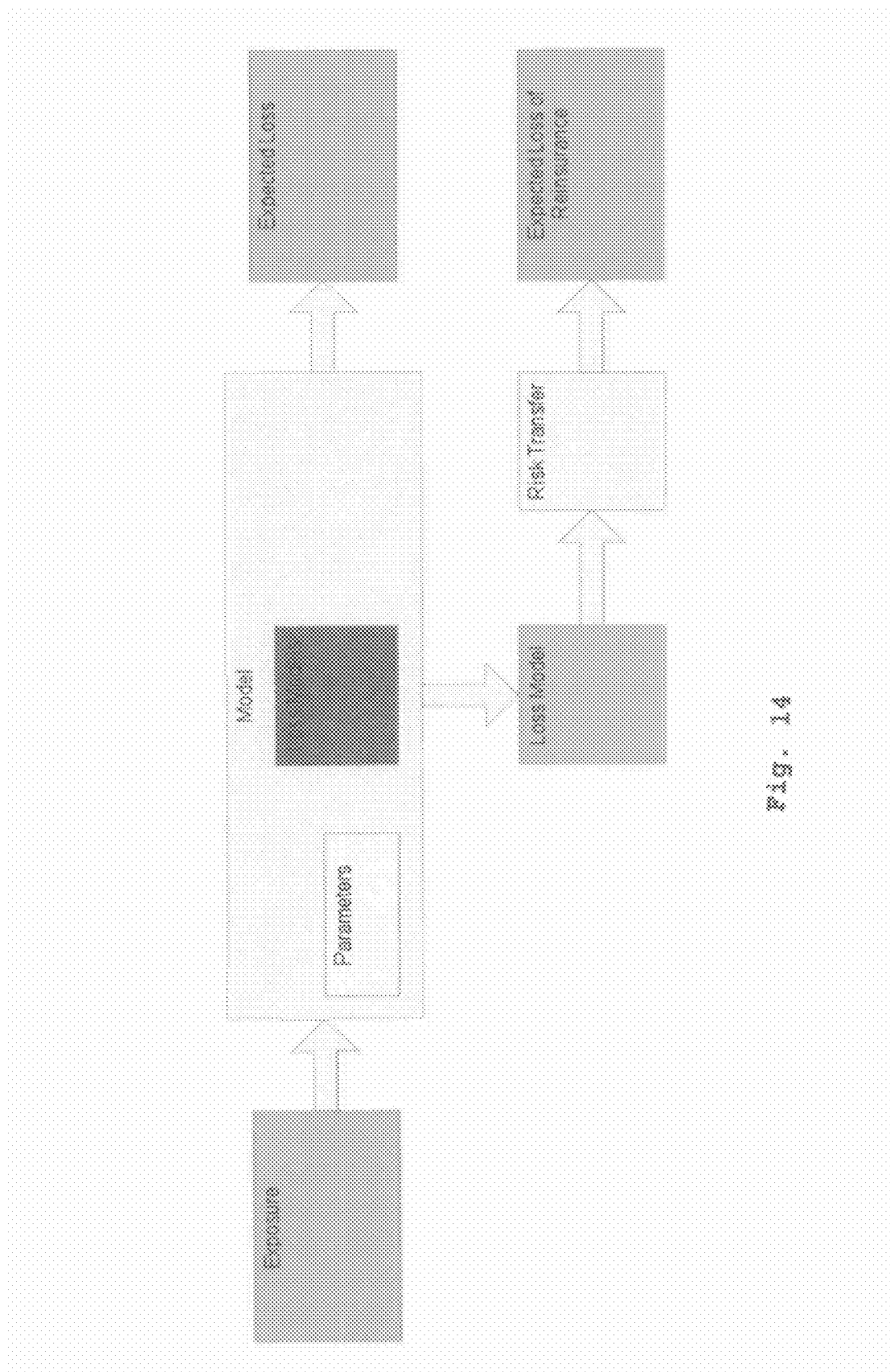
FIG. 14 shows a diagram illustrating schematically the implementation of short-term extension modules to the system allowing a generation of the expected loss after reinsurance risk transfer. On a longer term, for instance, the generation of the risk capital requirements using event-set based simulations could be possible without the need for additional parameters or a module redesign.
Figure 15:
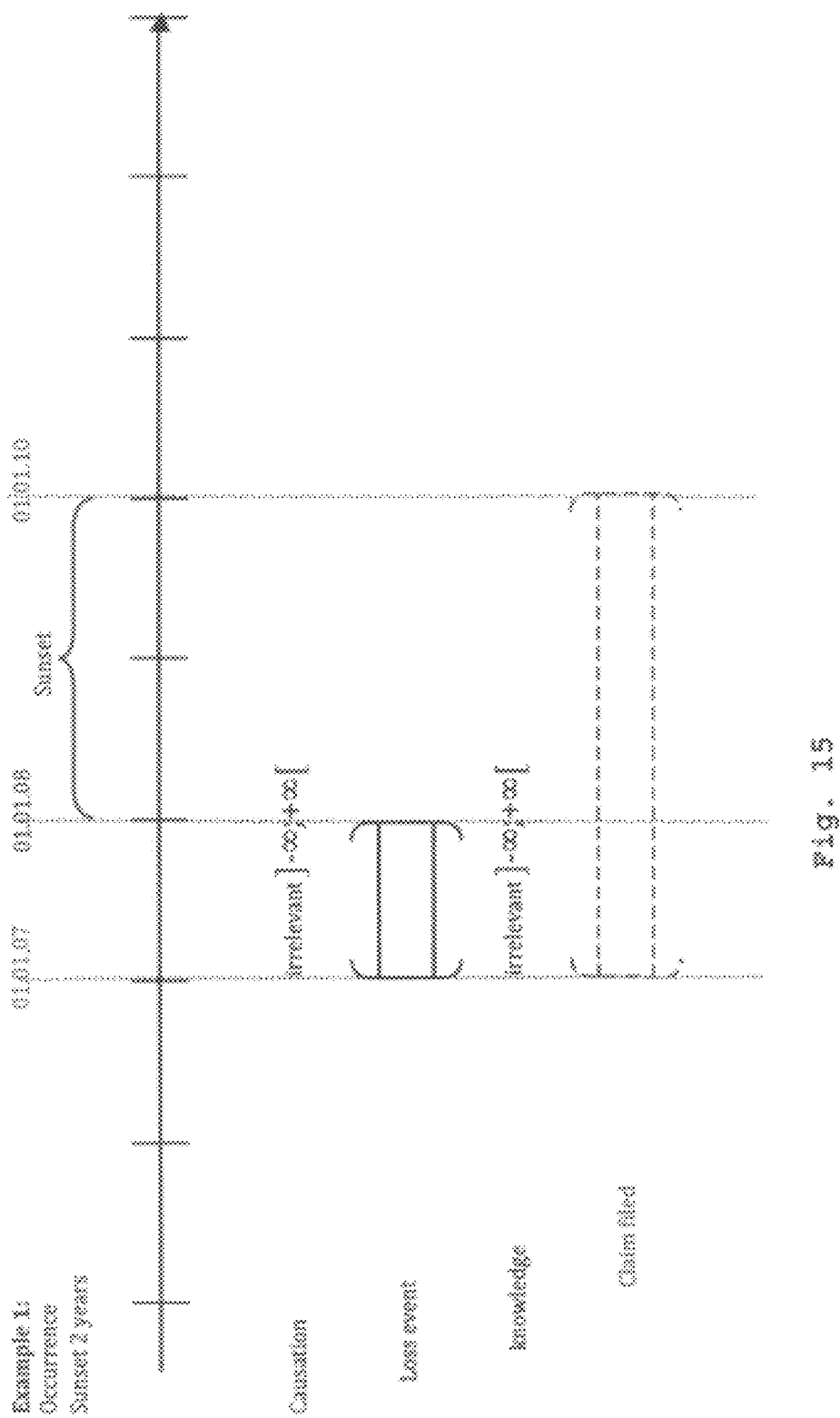
FIGS. 15-18 show examples according to an embodiment variant in which any trigger can be represented by the four time elements: causation (action committed), loss event (occurrence), knowledge (manifestation), claims filed (claims made).

The risk driver "nanotechnology" 311-313 generates the dependencies based upon the measure parameters as:

$$\tilde{f}_i = f_i \quad \text{for } 0 \le l \le 0.04$$

$$\tilde{f}_i = f_i \cdot b_{A,G}^{\frac{(l-l_A)}{l_A}} \quad \text{for } 0.04 < l \le 1$$

$$\tilde{s}_{i,j} = s_{i,j} \quad \text{for } 0 \le l \le 0.04$$

$$\tilde{s}_{i,j} = s_{i,j} \cdot b_{A,G}^{\frac{(l-l_A)}{l_A}} \quad \text{for } 0.04 < l \le 1$$

whereas l is the innovation factor, $l_A$ is the innovation factor's average (=0.04), $f_i$ is the frequency of scenario loss model i, and $s_{ij}$ is the severity of loss component j. The values for the parameter $b_{A,G}$ have been determined assuming no impact for values of innovation factor ≤4% and an increase of 50% and 25% in loss frequency and severity for innovation factor=30%. For the embodiment variant, it can be observed that the value of 30% of the innovation factor is regarded as an upper limit for the innovation factor (even if there is no limit for the possible values that the innovation factor may assume). FIG. 14 illustrates the characteristics of the innovation factor, as generated by the control unit controller 10. As shown in FIG. 14, the values obtained are $b_{A,G}$=1.064 (amber in FIG. 14) and $b_{A,G}$=1.035 (green in FIG. 14). In FIG. 14, the multiplying factor is equal to $$b_{A,G}^{\frac{(l-l_A)}{l_A}}.$$

Figure 9:
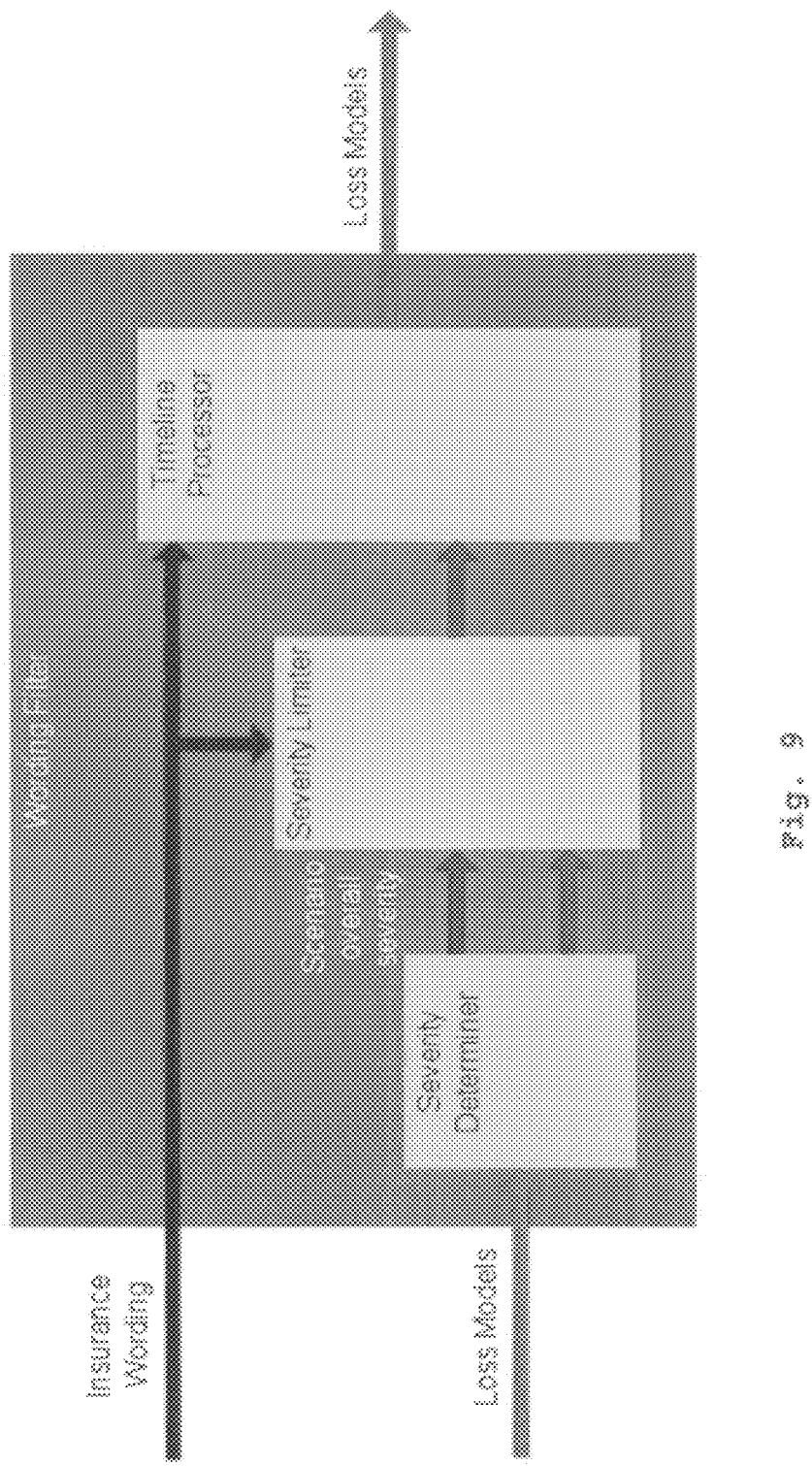
FIG. 9 shows a block diagram illustrating schematically an exemplary structure of the wording filter 134. The diagram illustrates the modules containing appropriate functional components, whereas the modules mirror the modeled operational realization. The wording filter 134 can be broken down into three components which are the severity determiner, the severity limiter and the timeline processor. The severity determiner combines the scenario loss model severity components into one overall severity distribution per scenario. The severity limiter applies the wording limits and deductibles to the scenario loss model overall severity distribution and modifies the severity components accordingly. The timeline processor adjusts the scenario loss model frequency according to the claims trigger conditions.

According to FIG. 5, the wording filter 134 can be assigned to the conceptual object: Which part of the loss is covered by the insurance? FIG. 9 shows schematically a possible realization of the structure of the wording filter 134 in more detail. The wording filter 134 filters the elements of loss scenarios according to the wording inclusions, exclusions and limitations. The input loss scenarios reflect the losses as they happened, the output loss scenarios reflect the losses as they are covered and likely to be claimed. The wording filter 134 input and output parameters are: (a) Loss scenarios as described above. Both input and output loss scenarios are represented in monetary units. (b) Insurance wording risk drivers included in the wording filter 134 are the limits and deductibles and the claims-/loss-trigger. All the above-described components before the wording filter 134 comprise the potential losses independently of a possible intervention by the loss resolving unit 40, i.e. a potential cover of them. The wording filter 134 can explicitly apply the insurance conditions on the loss scenario: (a) It adjusts the severity components according to limits and deductibles. (b) It adjusts the frequency according to the claims trigger conditions. (c) It also will take into account some wording exclusions in a future version. The way risk drivers 311-313 influence the loss frequency or severity in the wording filter 134 requires risk drivers 311-313 in the modulation engine 133 to be considered as intensive quantities. With an increasing level of knowledge accumulation by the system about the risk driver 311-313 influence, some of the risk drivers 311-313 in the wording filter 134 might be moved to the scenario generator 131.

The following liability risk drivers 311-313 are e.g. traced and selected by the driver selector 15 for the wording filter 134 herein referenced as (i) "claims-/loss-trigger" and (ii) "limits and deductibles". In this example, the risk driver 311-313 referenced as claims-/loss-trigger reflects the mechanisms according to which the time elements of a claim are taken into account to tell whether it qualifies to be filed under the policy. There are universal triggers used in casualty business. These are: (i) action committed, (ii) occurrence, (iii) manifestation, (iv) claims made. Furthermore there are buffer dates/periods such as (i) retroactive date; (ii) sunset; (iii) extended reporting period. These can substantially modify the scope of application of the policy, which can be considered in this system as additional parameters.

However, in the wording filter 134, the terminology used is not limited to these triggers and/or may refer to partial elements of the trigger. This is due not only to language inaccuracy but also to the fact that wordings can be subject to interpretation. A simple example is the case of the French 'Loi sur la sécurité financiére' that is often referred to as 'French claims made'. In fact the time element referred to in the unlimited retroactive period is meant to be 'occurrence' but the French word 'fait dommageable' actually means 'causation'. Strictly speaking this trigger is not equivalent to a 'claims made' for which the retroactive date normally refers to the occurrence. Thus the wording filter 134 must be able to scope with such interpretational problems. For the present embodiment variant of the control unit controller 10, it is assumed that any claim trigger at large (i.e. including all time buffer) can be accurately represented through a combination of several time windows in which specific claims characteristics have to fall in order to qualify for the claim to be filed under the policy. For example an occurrence claims made trigger with 2 years sunset clause can be represented by a loss event time window and a claim filed window. Each window can be defined by two tabulators: (a) the entry tabulator (in-tab) that is the earliest date after which the characteristic has to take place; (b) the exit tabulator (out-tab) that is the latest date by which the characteristic has to take place. As an embodiment variant, any trigger can e.g. be represented by the four time elements: causation (action committed), loss event (occurrence), knowledge (manifestation), claims filed (claims made). FIGS. 17-20 show examples according to this embodiment variant. Based on the above graphs, the shape of the loss burden curve is determined. On the same principle that any trigger can be depicted by the position of the four a.m. tabs, it is determined whether the loss burden curve has the same shape regardless of the trigger. The loss burden for the whole time bar is the sum of all potential claims to happen, whether these qualify to be filed under the policy or not. The loss burden for a policy is the sum of all potential claims to happen and be legitimately filed under the policy. Using the time tabulators is like cutting off the tails of the loss burden for the whole time bar. If it is assumed that the time elements of a claim are independent we can say that the loss burden for a policy is the sum of all potential from the different time elements. While all elements may lie in the considered year, the past exposure is only represented by the causation and the occurrence elements as only these can lie in the past before it comes to a claim under the policy. Similarly the future exposure is only represented by the manifestation and the claim filed elements as only these can lie in the future.

Figure 21:
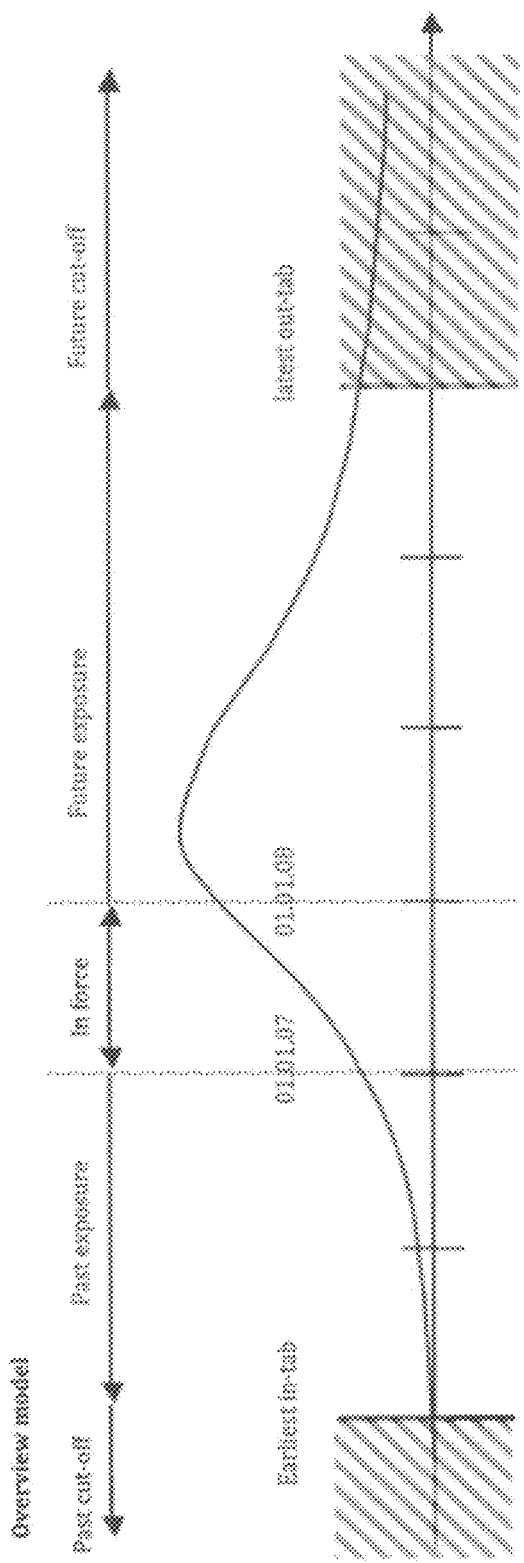
FIG. 21 illustrates the overview curve according to FIGS. 21 and 22. The loss burden is the result of the development of the in-force year. The years far ahead will bring fewer claims than the nearer ones—whereas the in-force year has not yet developed its full potential. There is no accumulation of years. The curve has the same shape as for claims made but with other parameters.
Figure 22:
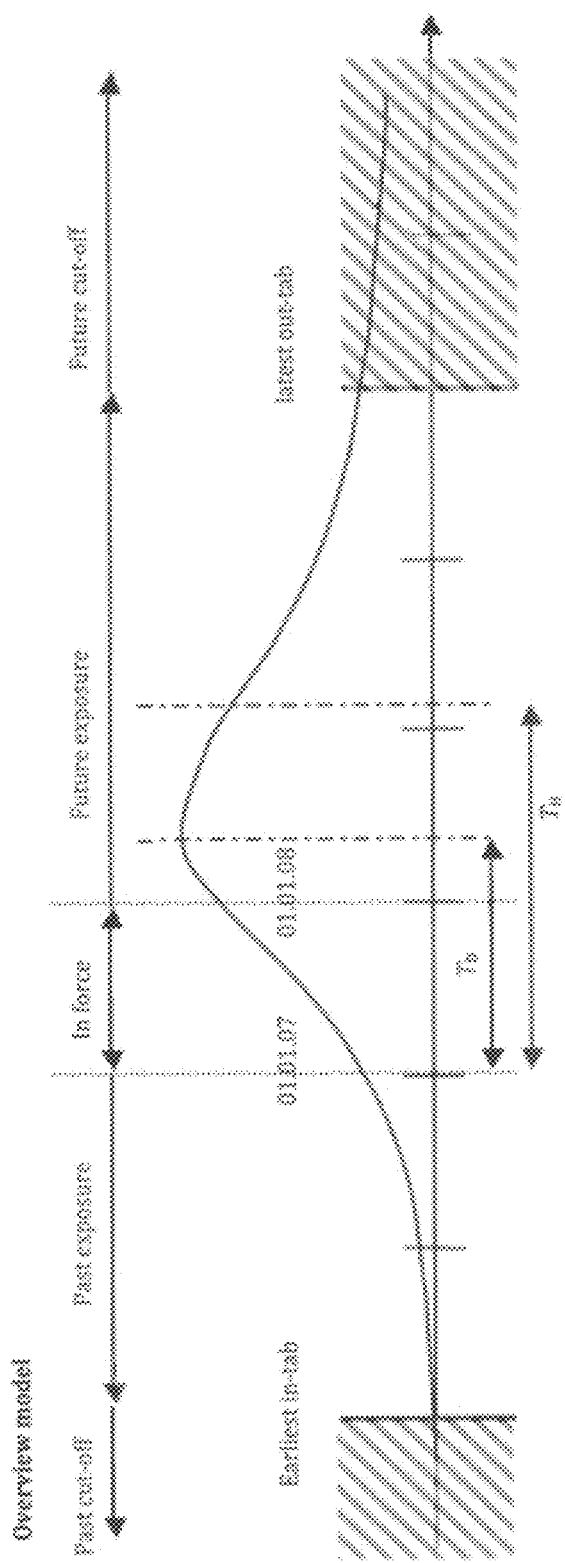
FIG. 22 shows the values of the parameters of the liability risk driver 311-313 referenced below as "claims-/loss-trigger", which are chosen by means of the control unit controller 10 as half-life time $T_H$ and development time $T_D$ which is the time for a time element to make it to a claim (geometrically the distance between the start and the peak of the bell).
Figure 23:
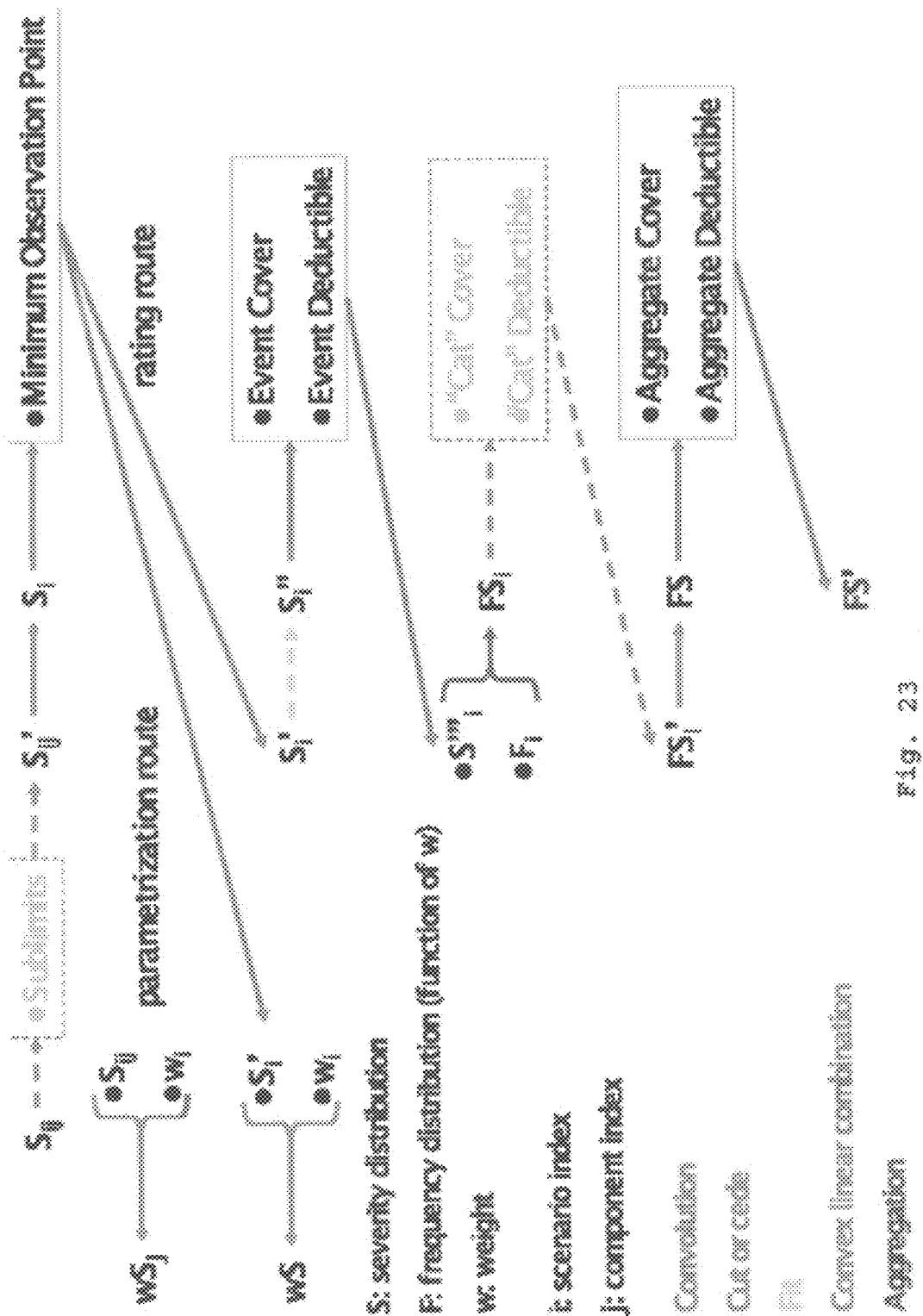
FIG. 23 illustrates an embodiment variant in which the aggregator 135 generates the expected loss by (1) using the allocated volume of each scenario to determine the first moment of the Poisson frequency distribution for that scenario; (2) creating log-normal distributions from the first two moments of the severity components of each scenario (discrete or fitted) and apply some limits and deductibles; (3) combining the individual loss severity component distributions for each scenario to produce an overall loss severity distribution for that scenario; (4) aggregating the frequency and severity distributions to calculate losses for each scenario; (5) combining the aggregate loss distributions of each scenario to calculate one loss distribution; and (6) applying the reinsurance structure to the total aggregated loss distribution to produce an expected loss cost. The (re)insurance structure component is the last component. It contains the (re) insurance structure (limits, deductibles, etc.) according to the loss resolving unit 40 which is applied at a scenario level and/or at an aggregate (adding all scenarios together) level.

The loss burden is the result of (1) the development of the past causation and loss event years. The oldest years bring fewer claims than the youngest ones—whereas very young years have not yet developed their full potential; (2) the attenuation of the in-force loss event year (no exposure for the years afterwards as the expiry cuts off loss events) in the light of the time window set by the knowledge and claim filed tabs. The old years can be depicted/added up as shown in FIG. 21. The future years are the result of the development of the in-force year and the tails of the past years. It can be illustrated as shown in FIG. 22. The overview curve can be represented as shown in FIG. 23. The loss burden is exclusively the result of the development of the in-force year. According to the above comment on claims made, the years far ahead will bring fewer claims than the nearer ones—whereas the in-force year has not yet developed its full potential. There is no accumulation of years. In other words, the curve has the same shape as for claims made but with other parameters.

The following properties about the curves are known thus far by the liability risk driver 311-313 referenced herein as "claims-/loss-trigger": (i) the area beneath the curve represents the loss burden regardless of the triggers (i.e. the tabs) chosen; (ii) since the loss burden is not infinite they must be decreasing asymptotically faster than $x^{-1}$; (iii) according to expert judgment an occurrence policy (with no sunset, i.e. with no future cut-off—except statute of limitation) bears a higher risk than a claims made policy. The curve on the left-hand side has to diminish faster than the curve on the right-hand side. It is self-evident that the time elements causation, occurrence, manifestation, claim filed are subsequent. To make it relevant to the loss resolving unit 40 a causation needs to make it to an occurrence, an occurrence needs to make it to a manifestation and a manifestation needs to make it to a claim. For the signal processing of the liability risk driver 311-313 claims-/loss-trigger, as few parameters as possible are used to fully describe the curve. The values of these parameters are chosen by means of the control unit controller 10 as half-life time $T_H$ and development time $T_D$ which is the time for a time element to make it to a claim (geometrically the distance between the start and the peak of the bell). This is illustrated by FIG. 24. As quantity source for the input of the wording filter 134, the claims-/loss-trigger as liability risk driver 311-313 is an input property to the wording filter 134. For the output, the claims trigger acts directly on the loss scenario frequency distribution. The effect on the severity is indirect. $t_m$ is the time measured by the system between the end of the in-force period and either the in-tab or the out-tab (depending on the timeframe) of timeframe m. The risk driver 311-313 can e.g. be based upon:

$$F(t) = 1 + \frac{T_H}{\ln 2}\left[e^{-\ln 2 \frac{T_D}{T_H}} - e^{-\ln 2 \frac{t}{T_H}}\right]$$

The function F fulfils the basic requirements subject to some constraints on $T_D$. The functions $F_m(t_m)$ for the four timeframes m are multiplied by the scenario loss model frequency. As illustrated in FIG. 9, the wording filter 134 can be broken down into three components, which are (a) the severity determiner, (b) the severity limiter and (c) the timeline processor. The severity determiner (a) combines the scenario loss model severity components into one overall severity distribution per scenario. This distribution currently is a Pareto distribution. The severity determiner works in the same way as the corresponding component of the aggregator 135. The severity limiter (b) applies the wording limits and deductibles to the scenario loss model overall severity distribution and modifies the severity components accordingly. The severity limiter cuts off the parts of the loss scenario overall severity distribution which are not covered due to wording limits and deductibles. It modifies the scenario loss model severity components at the lower and the upper end of the expected severity range such that the ratio between the sum of the resulting severity component mean values and the incoming severity component mean values equals the ratio between the covered and the full overall severity. The timeline processor (c) adjusts the scenario loss model frequency according to the claims trigger conditions. The timeline processor translates the claims trigger wording into four (country-specific) timeframes within which the loss must have been the time of the (i) causation (action committed), (ii) loss event (occurred), (iii) knowledge (manifested), and (iv) claim (claim filed) must fall for a loss to be covered by the insurance policy under consideration.

Figure 10:
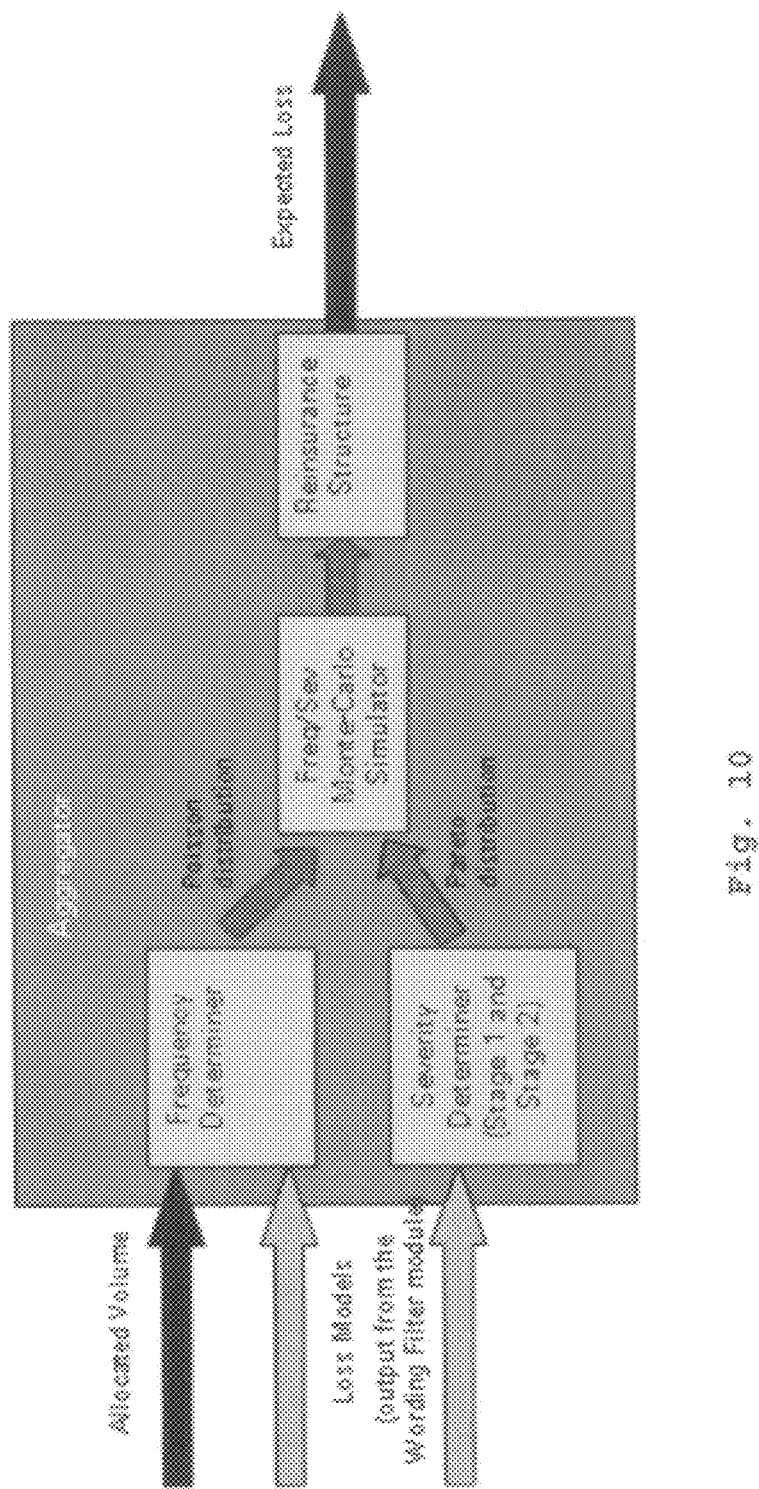
FIG. 10 shows a block diagram illustrating schematically an exemplary structure of the aggregator 135. The aggregator 135 comprises the components frequency determiner, severity determiner, Freq/Sev Monte-Carlo simulator and the structure module of the automated loss resolving unit or automated loss resolving unit respectively insurance/reinsurance unit 40. The frequency determiner is responsible for determining the Poisson parameter for each scenario. The severity determiner is responsible for combining the loss severity components for a scenario to produce one overall loss severity distribution for that scenario. The Monte-Carlo Simulator component combines the Poisson($\lambda_j$) and Pareto ($\hat{c}_j, \hat{\alpha}_j$) distributions to form a compound distribution for each scenario. In an another embodiment variant, as illustrated by FIG. 23, the aggregator 135 generates the expected loss by (1) using the allocated volume of each scenario to determine the first moment of the Poisson frequency distribution for that scenario; (2) creating log-normal distributions from the first two moments of the severity components of each scenario (discrete or fitted) and apply some limits and deductibles; (3) combining the individual loss severity component distributions for each scenario to produce an overall loss severity distribution for that scenario; (4) aggregating the frequency and severity distributions to calculate losses for each scenario; (5) combining the aggregate loss distributions of each scenario to calculate one loss distribution; and (6) applying the reinsurance structure to the total aggregated loss distribution to produce an expected loss cost. The (re)insurance structure component is the last component. It contains the (re) insurance structure (limits, deductibles, etc.) according to the loss resolving unit 40 which is applied at a scenario level and/or at an aggregate (adding all scenarios together) level. In the technical structure of the data selection and data generation/formula framework, the component consists of two stages, i.e. stage 1 and stage 2. Stage 1 comprises: (i) Each scenario has several scenario loss severity components. (ii) Each loss severity component from the wording filter 134 is characterized by its own severity distribution in terms of monetary amount units. This monetary amount is the 'mean' of the severity distribution. (iii) For each component of each scenario, there is a ratio between the standard deviation and the mean value of the loss severity component distribution. (iv) Each loss severity component is assumed to have a log-normal distribution which is fully determined by the mean and the standard deviation. The log-normal was adopted at this stage because of its mathematical tractability. Moreover, log-normal is not an unreasonable distribution to adopt as a single component severity distribution. This topic will be revisited in later revisions. Stage 2 comprises: (i) The objective to combine the severity component distributions of each scenario to one overall distribution of that scenario. (ii) In one embodiment variant, this can be achieved stochastically, in accordance with a Monte Carlo simulation (as illustrated below). In another embodiment variant, the components are combined using a convolution, implying that the components are independent from each other.
Figure 11:
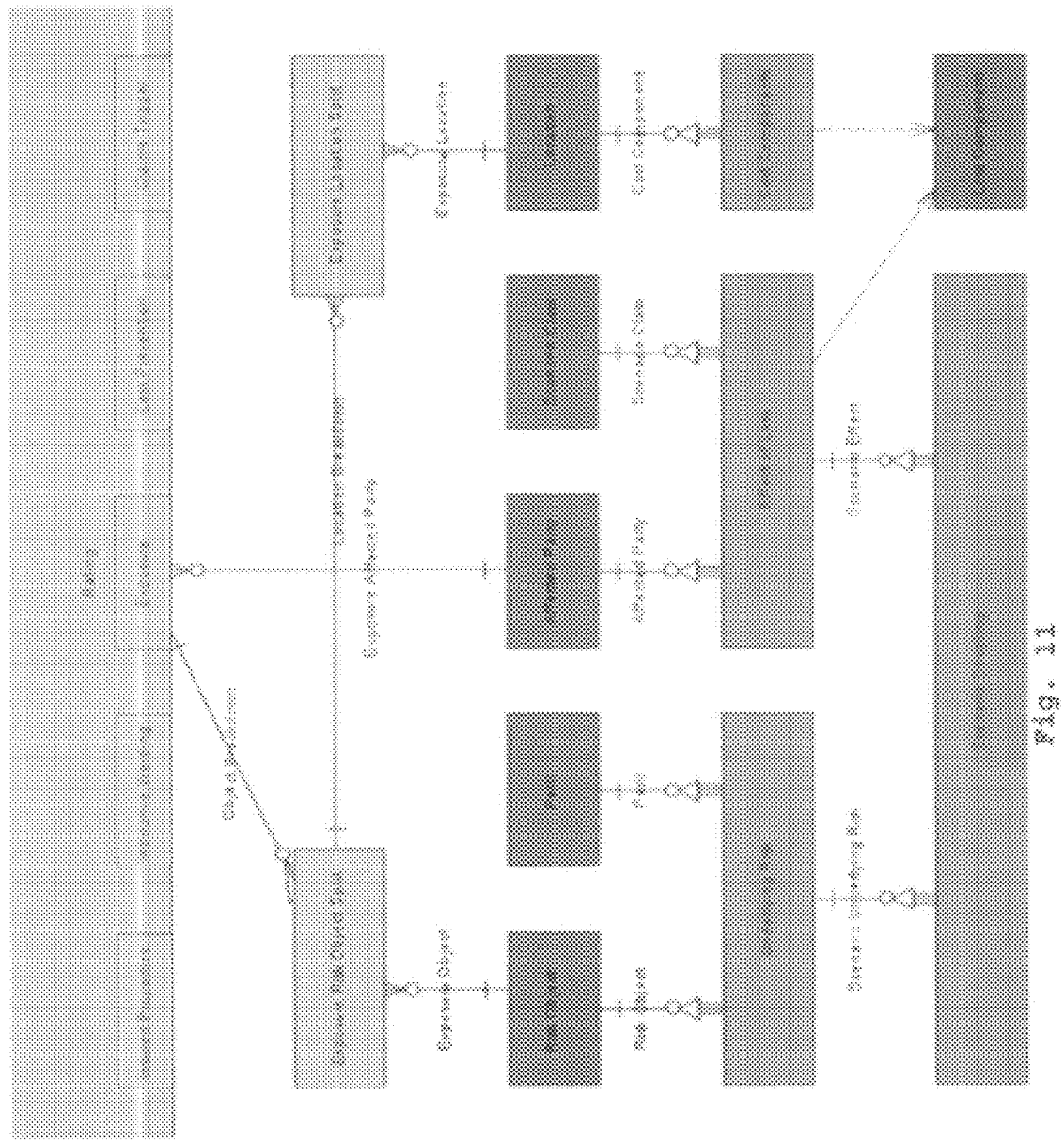
FIG. 11 shows a block diagram illustrating schematically how the realization of the inventive system mirrors the structure of the outside world. Therefore, the system maps a normalized picture of the outside world.

As shown in FIG. 5, the aggregator 135 is the final operational unit in this sequence splitting. The aggregator 135 combines several loss scenarios to produce an expected loss. FIG. 10 shows schematically a possible realization of the structure of the aggregator 135 in more detail. The aggregator 135 generates the expected loss from several loss scenarios as described above. The input signals into the aggregator 135 are the loss scenarios (output) from the wording filter 134. These loss scenarios (output) from the wording filter 134 reflect the losses which are covered and likely to be claimed. The aggregator 135 then combines these loss scenarios to produce one expected loss across all scenarios. In general, the aggregator 135 produces the expected loss by (i) using the allocated volume of each scenario to determine the first moment of the Poisson frequency distribution for that scenario; (ii) combining the individual loss severity components for each scenario to produce an overall Pareto loss severity distribution for that scenario; (iii) using the Poisson and Pareto distributions to simulate losses for each scenario; and (iv) applying the reinsurance structure to the simulated losses to produce an expected loss cost.

In one embodiment variant, the driver selector 15 identified selected the following liability risk drivers 311-313 (LRD) to be used by the aggregator 135.

| LRD Cluster | LRD Member | LRD Quantity |
| --- | --- | --- |
| Insured Characteristics | Geographical Extension of Activity | Income by Market |
| Insured Characteristics | Geographical Extension of Activity | Wages per country divided by median income |

The quantity definitions of the liability risk driver 311-313 referred to as "Geographical Extension of Activity" comprises the geographic scope of activities defining the spread of activities by country and/or regions. The following quantities are used to characterize the human factor: (a) Sales per country (geographic split of sales divided by corresponding PPP): this quantity is taken as the exposure (volume) in case of product liability. In this embodiment variant, the risk was not captured that a product may be sold on from one country to the other. (b) Wages per country in median income (the amount of salaries paid in a country divided by the median income of this country): this quantity is taken as the exposure (volume) in case of premises liability. The median income takes out the distortion caused by costs of living in a country. There are quantities describing the geographic extension of activity which are modulators and can also become relevant to the modulation engine 133. In this embodiment variant, sales per country are used as exposure (volume) for commercial general liability as well. As input quantity source, the exposure (volume) is used by the system. The output generates the operation on the loss model components. By definition, the exposure (volume) directly determines the frequency. The technical framework on exposure (volume) allocation is given with the price tag engine 132 defined above and the technical framework on volume-frequency relationships is given with the aggregator 135.

According to FIG. 10, the aggregator 135 comprises the components frequency determiner, severity determiner, Freq/Sev Monte-Carlo simulator and the structure module of the loss resolving unit 40. The frequency determiner and the severity determiner components operate independently of each other. The frequency determiner is responsible for determining the Poisson parameter for each scenario. In the following, $RefVol_i$ refers to the reference volume for scenario i. The reference volume can be predefined by means of the system. $AllocVol_i$ refers to the allocated volume for scenario i. The allocated volume can be generated in the price tag engine 132. Note that the risk drivers 311-313 described above are not used in the aggregator 135. They are, however, used in the price tag engine 132 in order to calculate the $AllocVol_i$, which is then used in the aggregator 135. $\epsilon_i$ refers to the predefined frequency rate for scenario i based on the reference volume for scenario i. $\epsilon_i$ is the 'number of claims per unit of time per unit of reference volume' based on the reference volume for scenario i. $\lambda_i$ refers to the Poisson parameter for scenario i based on the allocated volume for scenario i. $\lambda_i$ is related in the aggregator 135 as $$\lambda_i = \frac{\epsilon_i}{RefVol_i} \times AllocVol_i$$

Therefore, $\lambda_i$ is proportional to allocated volume. However, it would have been just as appropriate to have assumed that $\lambda_i$ is proportional to some sort of function of the allocated volume [i.e. $F(AllocVol_i)$ where F is a relation representable as a function]. Note that in the case of a non-linear volume-frequency relationship, frequency additively is not naturally given. In this embodiment variant, a linear function [i.e. $F(x)=x$] is adopted. The output from the frequency determiner is a Poisson distribution with parameter $\lambda_i$ for each scenario.

According to FIG. 10, the severity determiner is responsible for combining the loss severity components for a scenario to produce one overall loss severity distribution for that scenario. The severity determiner consists of two stages—stage 1 and stage 2. For stage 1, recall that each scenario has several loss severity components. Each loss severity component from the wording filter 134 is characterized by its own severity distribution in terms of monetary amount data. This monetary amount is the 'mean' of the severity distribution. For each scenario, there is a different but predefined ratio, which applies to the 'mean' of each loss severity component for that scenario. The ratio is defined as (standard deviation/mean). In other words, multiplying the ratio to the 'mean' gives us the standard deviation for the loss severity components. As an embodiment variant, each loss severity component is assumed to have a log-normal distribution. Hence, given the 'mean' and the ratio, the log-normal distribution would be fully specified. However, it would have been just as appropriate to have assumed distributions other than log-normal. The log-normal was adopted at this stage because of its mathematical tractability. Moreover, log-normal is not an unreasonable distribution to adopt as a severity distribution. Let the loss severity component for a particular scenario i be represented by integers 1 to $i_m$, where the subscript m denotes the total number of loss severity components in scenario i. $i_j$ refers to the $j^{th}$ loss severity component of scenario i. Note that $j \le i_m$. Let $\mu_{ij}$ denote the 'mean' of the loss severity component j for scenario i (recall that each scenario can have multiple loss severity components). $\xi_i$ refers to the predefined ratio for scenario i. Let $\sigma_{ij}$ denote the standard deviation of the scenario loss severity component j for scenario i. Then $\sigma_{ij} = \xi_i \times \mu_{ij}$. At the end of stage 1, log-normal($\mu_{ij}, \sigma_{ij}$) distributions are produced for every combination of i and j. Note that m is not necessarily the same for each scenario. For example, it is possible for scenario 1 to have 3 loss severity components (i.e. m equals 3), but scenario 2 could have 2 loss severity components (i.e. m equals 2).

In Stage 2, the objective of the severity determiner is to combine the log-normal ($\mu_{ij}, \sigma_{ij}$) so that one overall Pareto distribution is produced for each scenario. In other words, for a given scenario i, Stage 2's objective is to determine a Pareto distribution that best describes the combination of log-normal ($\mu_{ij}, \sigma_{ij}$) for j: 1 to $i_m$. As an embodiment variant, the Pareto can be adopted as the overall distribution for each scenario because of its slow, monotonically decreasing tail. This is achieved through the use of a severity simulator. Given a scenario i, the simulator simulates losses across all loss severity components (j:1 to $i_m$) from the log-normal ($\mu_{i,j}, \sigma_{i,j}$) distributions. n refers to the number of losses simulated for each and every loss severity component. This means that, for each scenario, there will be $ni_m$ (n times $i_m$) total simulated losses.

The next step of the severity determiner is to fit appropriate Pareto distributions using these simulated losses. The parameters for the 'best-fitting' Pareto distributions are derived using maximum likelihood estimation. $X_1, \ldots, X_{ni_m}$ refers to the simulated losses from scenario i. c refers to the threshold parameter for the Pareto distribution for scenario i. $\alpha_i$ refers to the shape parameter for the Pareto distribution for scenario i. It can be shown that the maximum likelihood estimator for $c_i$ is:

$$\hat{c}_i = \min_k X_k \text{ where } k = 1 \ldots ni_m$$

The maximum likelihood estimator for $\alpha_i$ is:

$$\hat{\alpha}_i = \frac{ni_m}{\sum_{k=1}^{k=ni_m} X_k}$$

Hence the output from Stage 2 is a Pareto distribution with parameters ($\hat{c}_i, \hat{\alpha}_i$) for each scenario. The severity simulator can e.g. use seeding to ensure that results remain consistent. However, the user can be allowed to vary or to seed in order to test other random simulations. The user can also be allowed to vary the number of simulations (i.e. n). The Monte-Carlo Simulator component, as shown in FIG. 10, combines the Poisson ($\lambda_i$) and Pareto ($c_i, \alpha_i$) distributions to form a compound distribution for each scenario. The simulator first simulates the number of claims for scenario i from Poisson ($\lambda_i$). Then, for each simulated claim, the simulator simulates the loss severity from Pareto ($c_i, \alpha_i$). The process is repeated for each and every scenario. As an embodiment variant, the simulator can use seeding to ensure that results remain consistent. However, the user can be allowed to vary or to seed other random simulation combinations. The user can also be allowed to vary the number of simulations. Finally, the (re) insurance structure component, according to FIG. 10, is the last component. It contains the (re)insurance structure (limits, deductibles, etc.) of the loss resolving unit 40 which is applied at a scenario level and/or at an aggregate (adding all scenarios together) level. The result is the expected loss to the (re) insurance structure.

Figure 16:
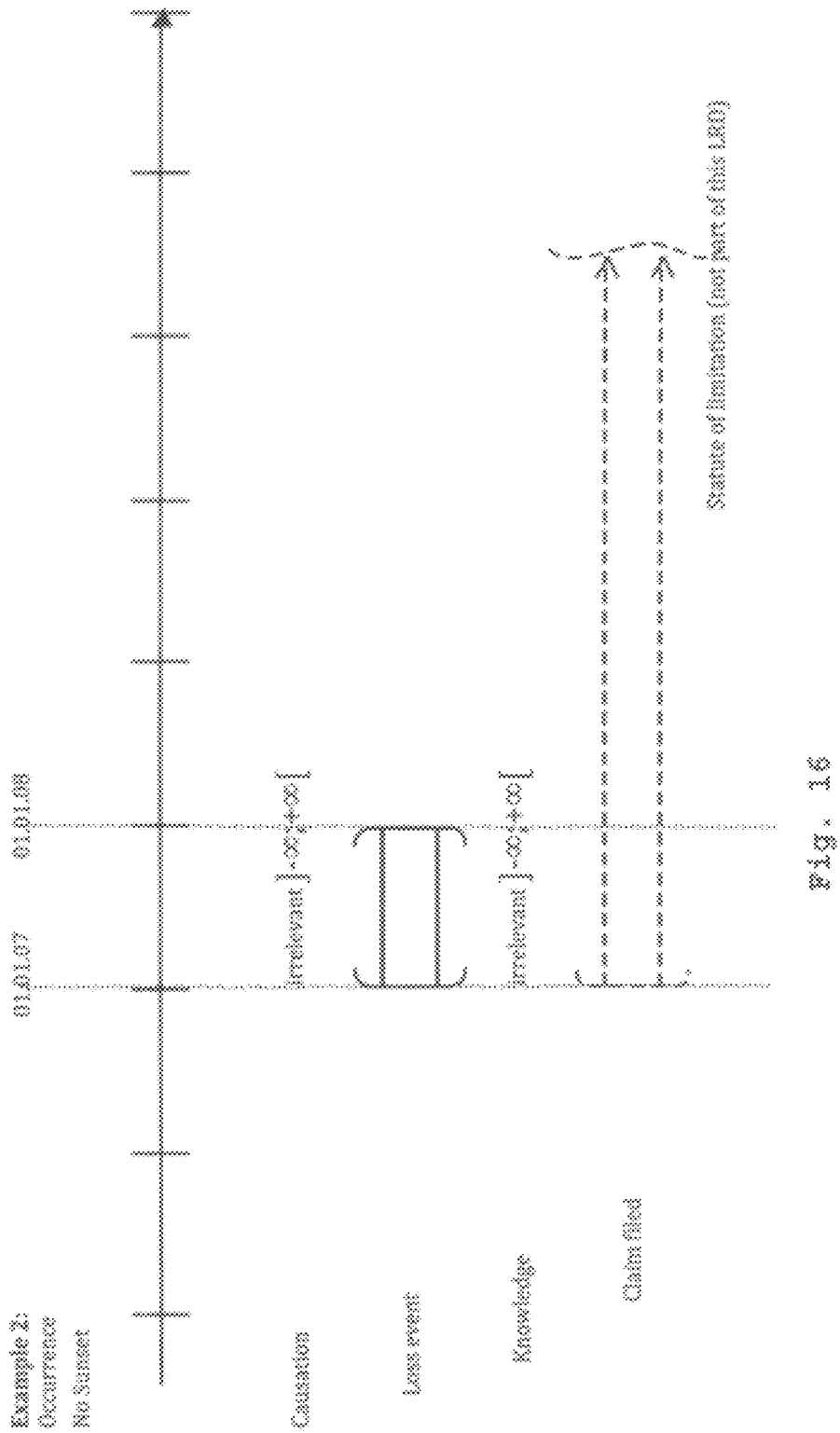
Figure 17:
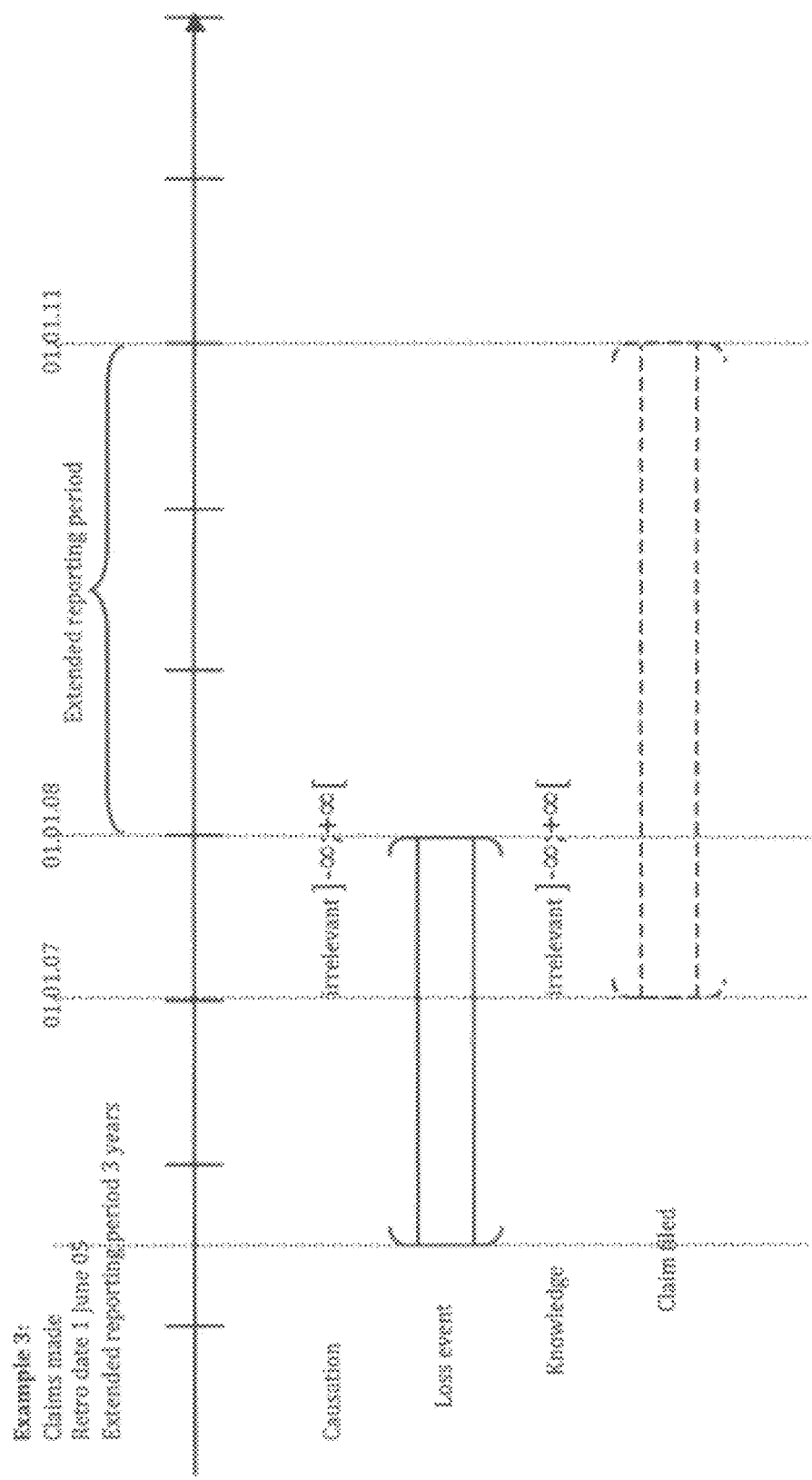
Figure 18:
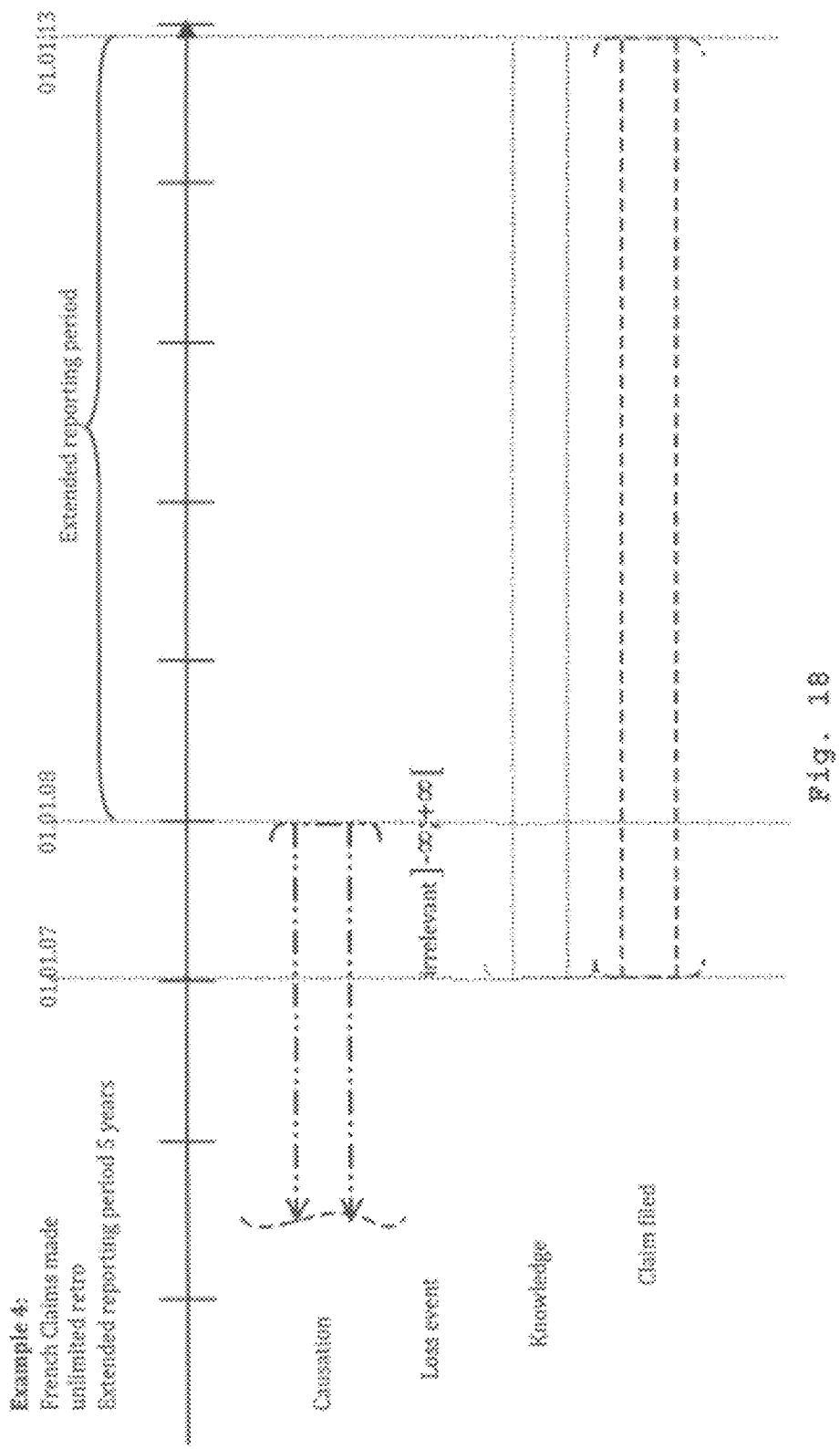
Figure 19:
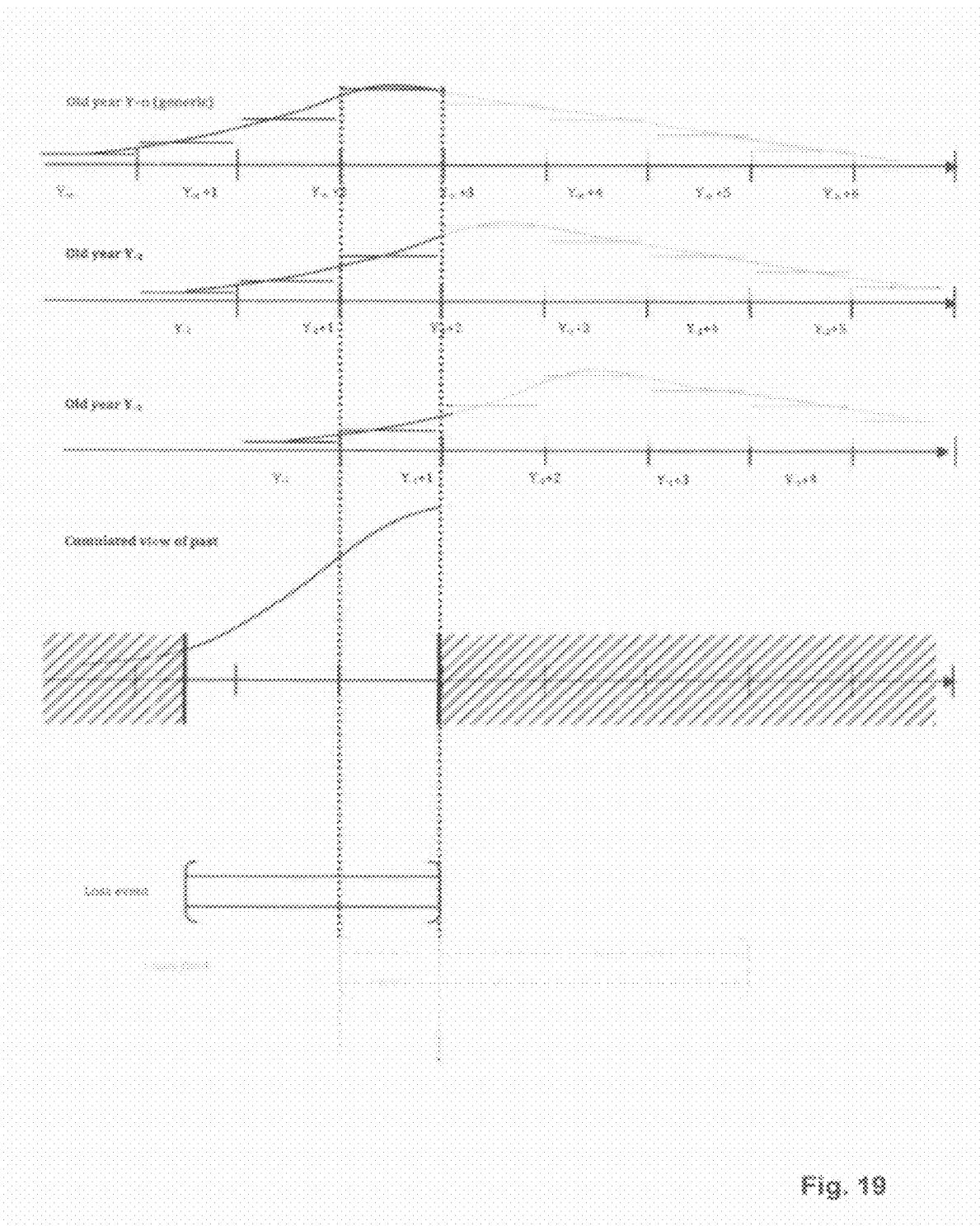
FIG. 19 shows a diagram illustrating the adding-up of the old years, whereas the loss burden is the result of (i) the development of the past causation and loss event years and (ii) the attenuation of the in-force loss event year in the light of the time window set by the knowledge and claim filed tabs.
Figure 20:
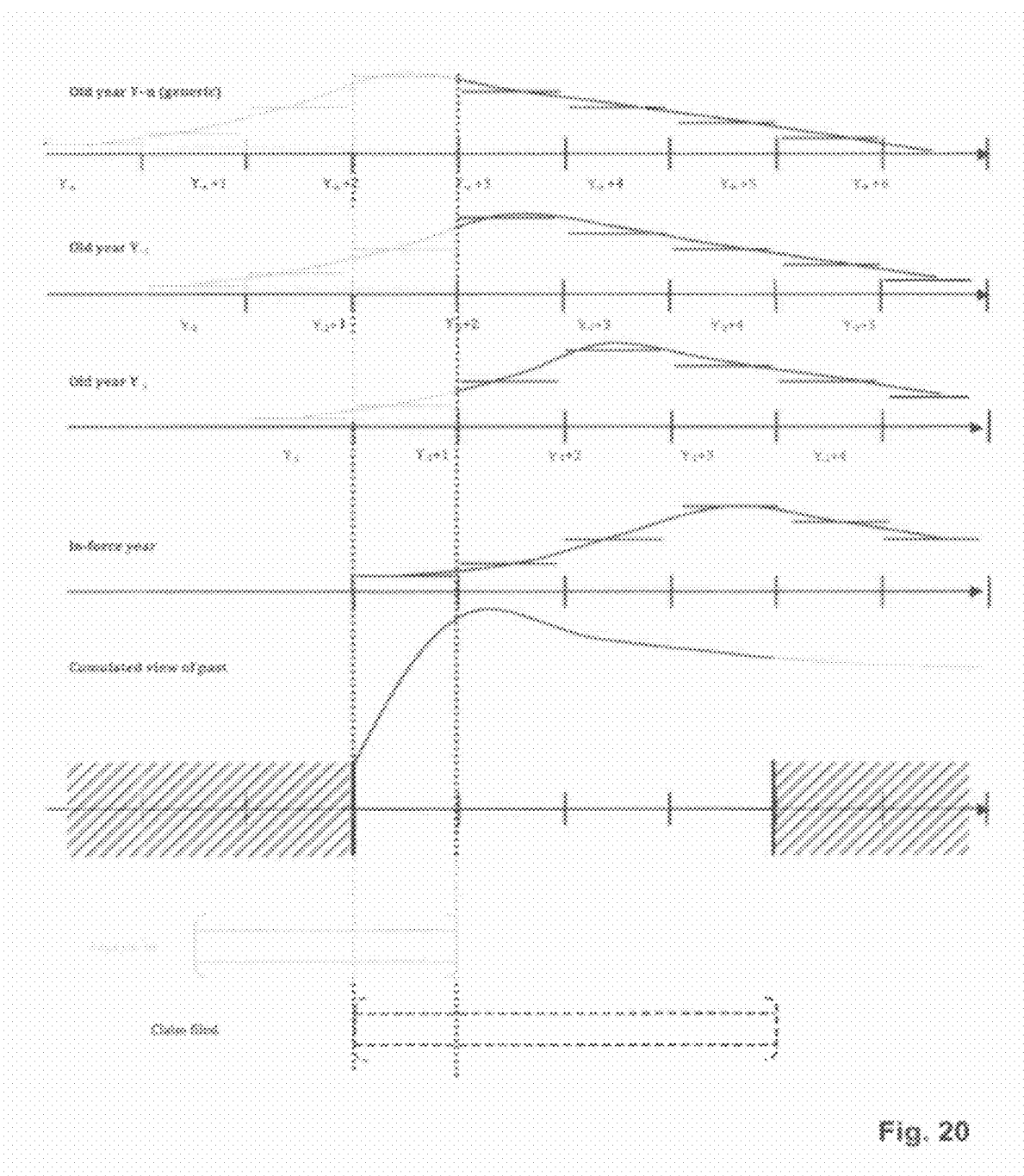
FIG. 20 shows a diagram illustrating the future years as the result of the development of the in-force year and the tails of the past years, whereas again the loss burden is the result of (i) the development of the past causation and loss event years and (ii) the attenuation of the in-force loss event year in the light of the time window set by the knowledge and claim filed tabs.

The control unit controller 10 needs to be calibrated. This activity can be pursued by the system by means of severity curves at various level of granularity which have been determined e.g. by the liability risk drivers 311-313 for one or a plurality of pilot markets such as e.g. Australia, Germany and Spain. As illustrated schematically in FIG. 16, extensions to the model allowing a calculation of the expected loss after reinsurance risk transfer are easy to implement in the inventive system. Additionally, for instance, the calculation of the risk capital requirements using event-set based simulations is possible without the need for additional parameters or a model redesign. This is not possible with the prior art systems.

Figure 2:
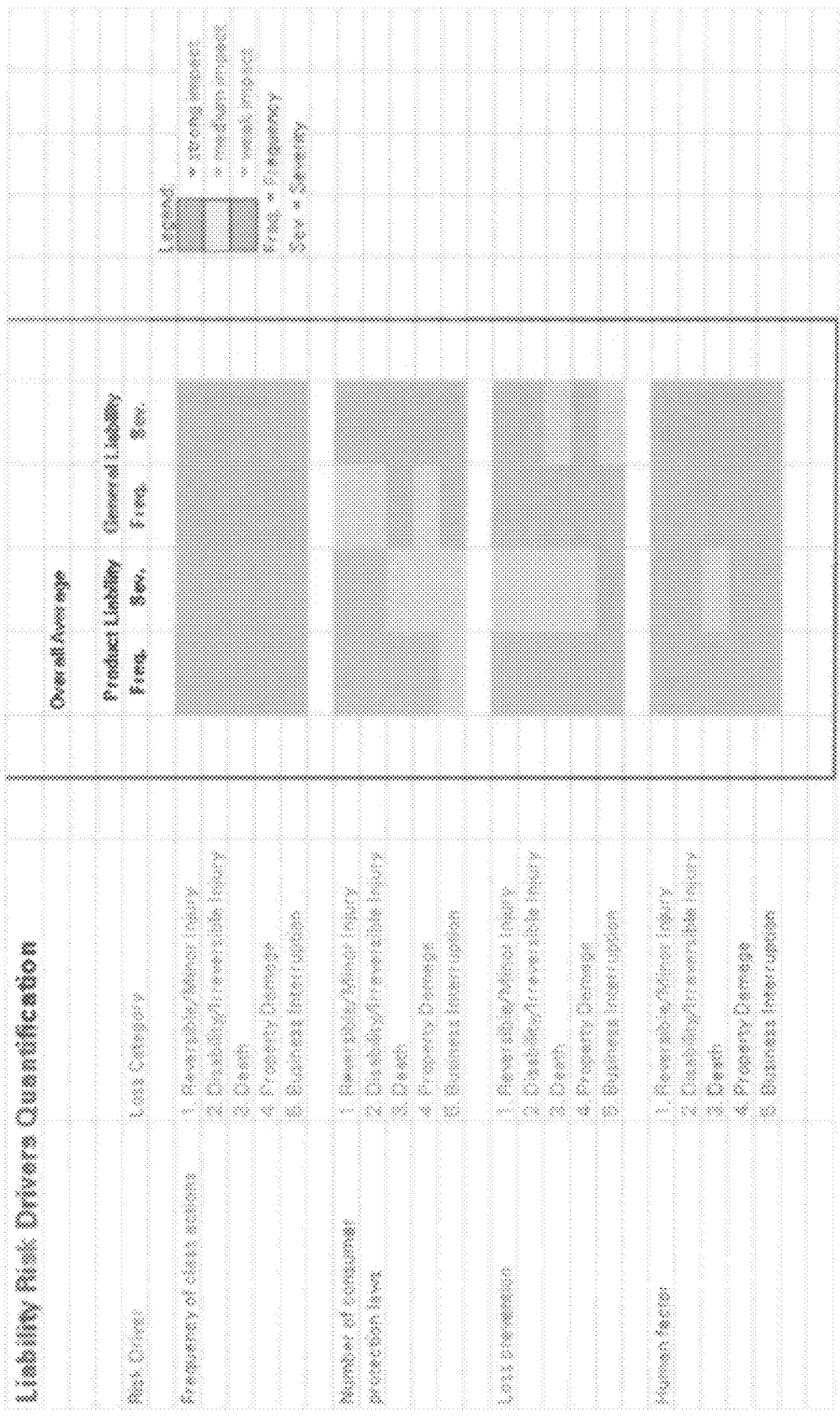
FIG. 2 shows a block diagram illustrating schematically an exemplary recognition of risk drivers and clustering of risk drivers. Clusters can be prioritized by the system and a first quantification of the impact of the risk drivers is performed based on their detected loss frequency and severity.

FIG. 2/9 shows a diagram illustrating an exemplary recognition of risk drivers and clustering of risk drivers. Clusters can be prioritized by the system and a first quantification of the impact of the risk drivers is performed based on their detected loss frequency and severity. The example of FIG. 9 is based on a set of eleven risk drivers that were prioritized by the driver selector 15. The system can be divided into five functional modules. In the example of FIG. 5, the chain of modules reflects the sequence: (i) cause of a potential loss, effect of the potential loss (scenario generator 131); (ii) cost of the effect of a potential loss (price tag engine 132), (iii) influence of various factors on the loss cost (modulation engine 133); (iv) insurance coverage of the potential loss (wording filter 134); (v) total expected loss (aggregator 135). The modules are connected by a definable scenario loss model representation. Each module accommodates a number of risk drivers and takes the input information from the scenario loss models and the exposure. The scenario loss models are modified and passed to the next module. The choice of how to measure the risk drivers and the quantification of their impact on frequency and severity is achieved by means of the system, as described below. Furthermore, the system needs to be calibrated. This operation is pursued by the use of severity curves at various level of granularity which can also be performed in a first step restricted to exemplary region or markets.

Quantification for type of loss has to be achieved by the control unit controller 10 or the driver selector 15. As an embodiment variant, this can be achieved by means of the mentioned scenario generator 131 generating samples of loss scenarios. The control unit controller 10 estimates how the total loss generated by each scenario is distributed among the various types of loss (bodily injury, property damage, financial loss). In the next step, the selectable risk drivers are prioritized by the control unit controller 10 or the driver selector 15. Prioritization comprises prioritizing the clusters and identifying the most important risk drivers within each cluster. In the next step, the control unit controller 10 provides a first preliminary estimate of the impact on loss frequency and severity of the most significant risk drivers for a given set of loss types. The preliminary selection can be based upon the value of a definable threshold value. The preliminary selection can be used as starting set for the inventive adaption and optimization of the system. In the example of FIG. 9, the selection comprises eleven risk drivers.

As mentioned, the control unit controller 10 comprises a trigger module to scan measuring devices 201, . . . , 261 assigned to the loss units 20, . . . , 26 for measure parameters and to select measurable measure parameters capturing or partly capturing a process dynamic and/or static characteristic of at least one liability risk driver 311-313 by means of the control unit controller 10. That is to say, for each risk driver, the system selects the most representative measureable indicator. In one embodiment variant, the system conducts self-testing based upon cross-country or cross-risk consistency. FIG. 8 shows an example of the triggered measurable quantity for the risk driver "human factor" according to FIG. 2/9. The tracing of measurable quantities representing the risk driver shows the relation of the human factor to the measure parameter characterized by the turnover per employee. This measure parameter turn-over per employee can be triggered or measured by the system. The curve based on the system tracing shows that the turnover per employee can represent whether a firm has automated processes. The curve further indicates that a firm increasing its turnover per employee does not immediately mean a higher degree of automation. Far more it can be considered as putting more pressure on the employees by reducing the staff. Therefore, the measure parameter is not unambiguous for measurements of the human factor in this region. Only when the increase is significant enough can the system measure unambiguously that the process automation has been increased. As described above, FIG. 9 shows a block diagram illustrating schematically another exemplary recognition of risk drivers and clustering of risk drivers analogous to FIG. 2. Clusters are prioritized by the system and a first quantification of the impact of the risk drivers is performed based on their detected loss frequency and severity. The first preliminary recognition is generated to give the impact on loss frequency and severity of the most important traceable risk drivers for a given set of loss types. The number of top risk drivers is set in this example to 11 by the system. This risk driver set is used in this case to start the dynamic adaption and/or optimization.

As already described above, FIG. 10 shows another example of the triggered measurable quantity for the risk driver "nanotechnology factor" according to FIG. 9. The risk driver is allocated by the system along with the embedding in a module. FIG. 10 shows how the measure parameter "innovation factor" influences severity and frequency. The innovation factor is the measure parameter selected by the system according to its traceable relation to the liability risk driver referenced "nanotechnology". The measure parameter innovation factor equals investment in research and development expressed in percentage of turnover. The amber curve shows the relation for medium impact, while the green curve shows the relation for weak impact. The measuring devices 201, . . . , 261 can comprise a trigger module to trigger variation of the measure parameters and to transmit detected variations of one or more measure parameters to the control unit controller 10. Additionally, the control unit controller 10 can comprise an interface module 14 to transmit periodically a request for measure parameter update to the measuring devices 201, ... , 261 in order to detect dynamically variations of the measure parameters. As an embodiment variant, the control unit controller 10 can comprise a switch unit to generate measure parameters of at least one of the liability risk drivers 311-313 of the set 16 based on saved historic data of a data storage 17, if one or more measure parameters are not determinable and/or scannable for the liability risk driver of the operating unit 30 by means of the control unit controller 10.

The control unit controller 10 comprises a driver selector 15 to select a set 16 of liability risk drivers 311-313 parameterizing the liability exposure 31 of the operating unit 30. A liability exposure signal of the operating unit 30 is generated based upon measuring the selected measure parameters by means of the measuring devices 201, ... , 261. The driver selector 15 comprises means to dynamically adapt the set 16 of liability risk drivers 311-313 varying the liability risk drivers 311-313 in relation to the measured liability exposure signal by periodic time response, and adjusts the liability risk driven interaction between the loss resolving unit 40 and the operating unit 30 based upon the adapted liability exposure signal. If the loss resolving unit 40 is activated by the control unit controller 10, the loss resolving unit 40 can comprise a switch unit to unlock an automated repair node assigned to the loss resolving unit 40 by means of appropriate signal generation and transmission to resolve the loss of the loss unit 20, . . . , 26. To weight the generated liability exposure signal, a dedicated data storage 18 of the control unit controller 10 can comprise region-specific historic exposure and loss data assigned to a geographic region, and the control unit controller 10 can comprise additional means to generate historic measure parameters corresponding to the selected measure parameters and to weight the generated liability exposure signal by means of the historic measure parameters.

The present liability risk driven system meets the following objectives, which cannot be achieved by the prior art systems, as known up to now. The inventive system can explicitly take into account the risk-driving properties of the underlying risk. All risk-driving aspects of the legal or societal environment are explicitly and automatically incorporated by means of the system. The system is easily adaptable to future extensions (e.g. simulation of risk accumulation by applying event sets). A further advantage is that only a minimum set of parameters is required with the inventive system and, among the other advantages, the inventive system is also able to anticipate the effect of legal or societal changes on the expected loss by means of the liability risk drivers and the driver selector of the system. Additionally, the inventive system/method is capable of automated signal generation based upon the expected loss in areas with insufficient historic loss information and no tariffs. No other system known in the prior art is able to achieve the explained objective in this way.

Another advantage is that the technical assembly and structure of the system mirrors the outside world. It can easily be verified to systematics and errors. The approach in the prior art systems is based upon the investigation into solving the questions (i) What is the expected loss compared to past loss experience? and (ii) How much premium do I need to get? Though the method is self-adapting, the inventive system is based on the questions: (i) What can go wrong?, (ii) How likely is it to go wrong?, (iii) How much will it cost if something goes wrong? Thus, the system becomes much more transparent. Through the ongoing process of adaption, loss history is rather used to calibrate the system parameters. In this way, the inventive system is also less vulnerable to systematics and/or missing data. The system starts from a simple structure and gradually extends it. The more data become available, the more the system moves to finer granularity. In all process states, the system stays modular and transparent. The system selects automatically the right variables (meaning straightforward variables) at the right place. This further improves the stability against errors and the transparency. For example, the direct consequence of a loss is injured people, damaged property, etc., rather than cost. By tracing the measure parameters, the system chooses the right measure parameters. This is a further big advantage over the systems known in the prior art.

REFERENCES

10 Control unit controller
  11 Signaling module
    111 Signal generation and transmission
  12 Interaction between loss resolving unit and operating units
  13 Central processing device
    131 Scenario generator
    132 Price tag engine
    133 Modulation engine
    134 Wording filter
    135 Aggregator
  14 Signal transmission interface
  15 Driver selector
  16 Sets of liability risk drivers
  17 Data storage with historic data
  18 Data storage with region-specific data
20-26 Loss units
  201, ... , 261 Measuring devices
30 Operating unit
  31 Liability exposure (real world)
    311-313 Liability risk drivers
  31' Liability exposure based on the risk drivers 311-313 of the controller 10
  32 Signal transmission interface
40 Automated loss resolving unit
  41 Signal transmission interface

The invention claimed is:

1. A method for forecasting frequencies associated with future loss and loss distributions for individual risks associated with a plurality of operating units, each of the plurality of operating units having at least one measurable liability exposure, comprising:

dynamically selecting, by a hardware control unit controller, a subset of measure parameters and measurable parameters transmitted by measuring devices assigned to loss units, the measuring devices dynamically scanning for the measure parameters and the measurable measure parameters, which capture at least one of a dynamic process and a static characteristic of at least one of a plurality of liability risk drivers, when a loss is incurred by at least one of the loss units;

dynamically assigning, by the hardware control unit controller, the subset of the measure parameters and the measurable parameters to the at least one of a plurality of liability risk drivers;

selecting a set of the plurality of liability risk drivers, by a driver selector of the hardware control unit controller, that parameterizes the at least one measurable liability exposure for at least one of the plurality of operating units and generating a liability exposure signal for the at least one of the plurality of operating units, by the hardware control unit controller, based on the selected subset of measure parameters and measurable parameters;

dynamically adapting, by the driver selector, the set of liability risk drivers by varying the liability risk drivers based on periodic changes in the generated liability exposure signal; and automatically tuning, by the hardware control unit controller, liability risk driven interaction between a loss resolving unit and the at least one of the plurality of operating units based on the adapted set of liability risk drivers.

2. The method according to claim 1, wherein the measure parameters are generated based on saved historic data from a data storage, when one or more of the measure parameters are not scannable, by the hardware control unit controller, for the at least one of the plurality of liability risk drivers, which is associated with the at least one of the plurality of operating units.

3. The method according to one of claims 1 and 2, wherein historic exposure and loss data assigned to a geographic region are selected from a dedicated data storage including region-specific data, and historic measure parameters are generated corresponding to the selected measure parameters, and the generated liability exposure signal is weighted by the historic measure parameters.

4. The method according to one of claims 1 and 2, wherein the measuring devices each comprise a trigger module that triggers a variation of the measure parameters and transmits detected variations of one or more of the measure parameters to the hardware control unit controller.

5. The method according to one of claims 1 and 2, wherein the hardware control unit controller periodically transmits a request for measure parameter update to the measuring devices to dynamically detect variations of the measure parameters.

6. The method according to one of claims 1 and 2, wherein, when the loss resolving unit is activated by the hardware control unit controller, the loss resolving unit unlocks an automated repair node assigned to the loss resolving unit by generating a specified signal and transmitting the specified signal to resolve the loss incurred by at least one of the loss units.

7. A system for forecasting frequencies associated with future loss and loss distributions for individual risks of a plurality of operating units, each of the plurality of operating units having at least one measurable liability exposure, comprising:

measuring devices that dynamically scan for, measure, and transmit measure parameters to a hardware control unit controller, the hardware control unit controller dynamically assigning the measured measure parameters to at least one of a plurality of liability risk drivers, wherein the hardware control unit controller includes:

a trigger module that scans the measuring devices, which are assigned to the loss units, for the measure parameters and that selects a subset of the measure parameters, the measure parameters capturing at least one of a dynamic process and a static characteristic of at least one of a plurality of liability risk drivers, and a driver selector that selects a set of the plurality of liability risk drivers that parameterize the at least one measurable liability exposure at least one of the plurality of operating units, and that generates a liability exposure signal of the operating unit based upon the selected subset of measure parameters, the driver selector further including means to dynamically adapt the set of liability risk driver by varying the liability risk drivers based on periodic changes in the generated liability exposure signal, and to automatically tune the liability risk driven interaction between a loss resolving unit and the at least one of the plurality of operating units based on the adapted set of liability risk drivers.

8. The system according to claim 7, wherein the hardware control unit controller further comprises a switch unit to generate the measure parameters of at least one of liability risk drivers in the set based on saved historic data from a data storage, when one or more of the measure parameters are not scannable for the at least one of the liability risk drivers in the set, which is associated with at least one of the plurality of operating units.

9. The system according to one of claims 7 and 8, wherein the hardware control unit controller includes a dedicated data storage that comprises region-specific historic exposure and loss data assigned to a geographic region, and the hardware control unit controller comprises additional means to generate historic measure parameters corresponding to the selected measure parameters and to weight the generated liability exposure signal by the historic measure parameters.

10. The system according to one of claims 7 and 8, wherein the measuring devices each comprise a trigger module that triggers a variation of the measure parameters and transmits detected variations of one or more of the measure parameters to the hardware control unit controller.

11. The system according to one of claims 7 and 8, wherein the hardware control unit controller includes an interface module that periodically transmits a request for measure parameter update to the measuring devices in order to dynamically detect variations of the measure parameters.

12. The system according to one of claims 7 and 8, wherein when the loss resolving unit is activated by the hardware control unit controller, the loss resolving unit comprises a switch unit to unlock an automated repair node assigned to the loss resolving unit by a generating a specified signal and transmitting the signal to resolve the loss incurred by at least one of the loss units.

* * * * *